US012456091B2

(12) United States Patent
Rivalto et al.

(10) Patent No.: US 12,456,091 B2
(45) Date of Patent: Oct. 28, 2025

(54) AUTOMATED PACKAGE DELIVERY SYSTEM

(71) Applicant: SmartMart, Inc., Memphis, TN (US)

(72) Inventors: Michael A. Rivalto, Memphis, TN (US); Jason Fisher, Germantown, TN (US)

(73) Assignee: Smart Mart, Inc.

( * ) Notice: Subject to any disclaimer, the term of this patent is extended or adjusted under 35 U.S.C. 154(b) by 1647 days.

(21) Appl. No.: 16/211,490

(22) Filed: Dec. 6, 2018

(65) Prior Publication Data

US 2019/0108476 A1 Apr. 11, 2019

Related U.S. Application Data

(63) Continuation of application No. 15/915,684, filed on Mar. 8, 2018, now Pat. No. 10,181,113.

(60) Provisional application No. 62/469,008, filed on Mar. 9, 2017.

(51) Int. Cl.

| | |
|---|---|
| ***G06Q 10/08*** | (2024.01) |
| ***G06Q 10/087*** | (2023.01) |
| ***G06Q 20/20*** | (2012.01) |
| ***G07F 7/08*** | (2006.01) |
| ***G07F 11/16*** | (2006.01) |
| ***G07F 17/12*** | (2006.01) |
| ***G07G 1/00*** | (2006.01) |
| ***G07G 1/14*** | (2006.01) |

(52) U.S. Cl.
CPC ......... *G06Q 10/087* (2013.01); *G06Q 20/202* (2013.01); *G07F 7/08* (2013.01); *G07F 11/165* (2013.01); *G07F 17/13* (2020.05); *G07G 1/0036* (2013.01); *G07G 1/14* (2013.01)

(58) Field of Classification Search
None
See application file for complete search history.

(56) References Cited

U.S. PATENT DOCUMENTS

| | | | | |
|---|---|---|---|---|
| 6,422,417 B1 * | 7/2002 | Rawlins | G07F 11/04 221/124 |
| 2001/0045150 A1 * | 11/2001 | Owens | B26D 7/0625 83/425.3 |
| 2003/0057058 A1 * | 3/2003 | Iwasa | B65G 47/082 198/465.1 |

(Continued)

*Primary Examiner* — Ariel J Yu

(57) ABSTRACT

An automated package delivery system for receipt, storage and delivery of packages to customers. A facility unit body provides secure internal storage for an automatic package receiver and a distributor service module. Individual packages have package specific identifying information. The service module is in two-way communication with higher level components via a computing device. Higher level components include a cloud server and an external database. The computing device receives and transmits the package specific identifying information to the external database via the cloud server for storage in the external database, receives an input for delivery of a package, retrieves package specific identifying information from the external database via the cloud server, uses the retrieved information to retrieve the package, and releases the selected for pick-up by or delivery to a customer. Methods of using the system to deliver packages to a customer for pick-up are provided.

19 Claims, 42 Drawing Sheets

(56) References Cited

U.S. PATENT DOCUMENTS

| | | | | |
|---|---|---|---|---|
| 2004/0245070 | A1* | 12/2004 | Fallas | B65B 61/28 198/459.8 |
| 2010/0237091 | A1* | 9/2010 | Garson | G07F 9/026 221/226 |
| 2011/0132727 | A1* | 6/2011 | Takens | B65G 47/5131 198/602 |
| 2012/0118910 | A1* | 5/2012 | Pinney | G06F 19/3462 221/133 |
| 2013/0261792 | A1* | 10/2013 | Gupta | G06Q 10/08 700/232 |
| 2016/0300187 | A1* | 10/2016 | Kashi | G06Q 10/0836 |
| 2018/0005177 | A1* | 1/2018 | Wilkinson | G06Q 10/083 |
| 2018/0165639 | A1* | 6/2018 | Wilkinson | G07C 9/00896 |

* cited by examiner

FIG. 3S
21
23
408
smartmart®
Welcome to the Remote Order Retrieval Portal
351
Enter Your Remote Order #: [PRESS HERE]
350
[PRESS HERE] to Retrieve Your Order by Customer # or See Other Options
607

FIG. 3T
21
23
501
SmartMart®
Welcome to the Package
Retrieval & Drop Off Portal
612
610
607
Enter Your Tracking Number:[PRESS HERE]
[PRESS HERE] to Retrieve Your Package by
Customer # or See Other Options
[PRESS HERE] to Drop Off a Package

FIG. 3U
21
23
502
124
Smartmart®
Welcome to the Package
Retrieval & Drop Off Portal
Your Package Has Been Retrieved!
Please Take Your Package from Port ##

AUTOMATED PACKAGE DELIVERY SYSTEM

CROSS REFERENCE TO RELATED APPLICATIONS

This application claims the benefit of the following applications. This application is a continuation of U.S. patent application Ser. No. 15/915,684 filed Mar. 8, 2018, which is pending. U.S. patent application Ser. No. 15/915,684 claimed the benefit of U.S. Provisional Patent Application 62/469,008, filed Mar. 9, 2017, which is expired. The foregoing applications are incorporated herein by reference in their entireties.

FIELD OF THE INVENTION

The present invention is generally directed toward package delivery, and more specifically to automated systems and methods for storing, dispensing and delivering packages.

BACKGROUND OF THE INVENTION

Product dispensing machines offer convenience to consumers by providing one or more types of goods or products. The type(s) of goods or products available at any given vending machine are generally based on consumer demand and location. The convenience of these devices lies in the speed of transaction, which is facilitated by an automated process (mechanical dispensing without human cashier) and being in a physical proximity to usual consumer traffic. However, there is no available customer service for such devices if an error occurs in a transaction.

The selection of goods and products available at retail brick-and-mortar store fronts follows the same criteria as that of vending machines. So-called “convenience stores” provide faster transactions for certain consumable goods by offering limited selections in smaller spaces than larger retail grocers or other retail stores. In 1937, Clarence Saunders sought to build on the vending machine model with his automated grocery store, The Keedoozle (see U.S. Pat. No. 2,820,591), which expanded product selection to grocery items and provided a savings in labor and other costs compared to the traditional grocery store. This in turn allowed a cost-savings benefit for the consumer. The brick-and-mortar Keedoozle also offered limited customer service with a cashier onsite. However, the Keedoozle still presented the same hassles and inconveniences for modern consumers that exist with all brick-and-mortar stores.

The inventor addressed some of these problems in U.S. Pat. No. 5,482,139 (Rivalto), which is incorporated herein by reference. The automated drive-up retail facility disclosed in U.S. Pat. No. 5,482,139 provided a leap forward in automated vending facilities. The original Rivalto automated drive-up retail facility remains in service to this day by providing the convenience of a cashier-less vending machine with the customer expectations of a retail goods selection for a convenient store-type location in an urban setting. However, combining such goods in an automated manner presents many challenges for the efficient automated dispensing of certain types of goods without an employee being physically located at the facility.

The inventor also addressed systems for automoated package pickup and delivery in U.S. Pat. No. 6,690,997 (Rivalto), which is incorporated herein by reference.

There is a need in the field for an improved automated retail facility that addresses the foregoing and other challenges.

OBJECTS AND SUMMARY OF THE INVENTION

It is an object of the invention to provide improved automated package delivery systems for receipt, storage and delivery of packages to customers.

It is another object of the invention to provide improved automated package delivery systems that incorporate the use of cloud servers and external databases.

It is yet another object of the invention to provide improved delivery systems for delivering products from facility unit bodies.

The foregoing and other objectives and advantages are achieved by providing a system for receiving, storing and delivering packages to customers, together with methods of accessing and operating the system, having the features described herein.

In embodiments of the automated package delivery system for receipt, storage and delivery of packages to customers, the system includes a facility unit body providing a secure internal storage for an automatic package receiver and a distributor service module. The service module comprises at least one package receiving port for receiving a plurality of individual packages into the facility unit body, the package receiving port accessible from an exterior of the facility unit, a package storage area for securely storing the packages in the facility unit body, a package discharge access point accessible from the exterior of the facility unit body, the access point positioned for all customers and height compliant with disabled person laws and regulations, and a package delivery mechanism for moving packages between the at least one package receiving port, the package storage area and the package discharge access point. Each of the individual packages has package specific identifying information. The service module is in two-way communication with higher level components via a computing device, the higher level components including a cloud server and an external database. The computing device is configured to receive and transmit the package specific identifying information to the external database via the cloud server for storage of the package specific identifying information in the external database, receive an input for delivery of a selected individual package, retrieve package specific identifying information for the selected individual package from the external database via the cloud server, use the retrieved package specific identifying information for the selected individual package to retrieve the selected individual package from the package storage area, and release the selected individual package to the package discharge access point for pick-up by or delivery to a customer.

In embodiments, upon delivery of an individual package into the facility unit body, the system notifies an interested party via the higher level components that the individual package has been dropped off at the facility unit body for pick-up and records information about the drop-off in the external database via the cloud server. Upon pickup of an individual package from the facility unit body, the system notifies an interested party via the higher level components that the individual package has been picked up and records information about the pick-up in the external database via the cloud server. The interested party can be a customer, a courier, an Internet retailer, or a local brick-and-mortar retailer. The computing device can be a computer in the facility unit body.

In embodiments, the package delivery mechanism includes a movable platform. The package delivery mechanism can include a pusher for selectively delivering packages to the movable platform. A sensor on the movable platform sends a successful delivery message to the computing device for delivery to the higher level components for processing and storage on the external database.

In embodiments, the system records date and time-stamped entries and photographs of the packages, users, and returned items. Upon pickup of an individual package, a sensor associated with the package access discharge point sends a successful delivery message to the computing device for delivery to the higher level components for processing and storage on the external database. The cloud server unlocks the package discharge access point based upon identifying information of the customer of the particular individual package, the identifying information of the customer obtained via the higher level components. The package receiving port can be a public receiving port for receiving a drop-off package by a customer for pick up by a courier service.

In embodiments, the facility unit body has insulation and a cooling system for maintaining packages at controlled temperatures. The facility unit body can be configured to maintain multiple climate zones, the multiple climate zones including a frozen zone, a refrigerated zone, and a room temperature zone.

Methods of delivering packages to a customer for pick-up are provided. The method includes receiving an order from a customer, preparing a package containing the order, the package having package specific identifying information; delivering the package into a facility unit body, transmitting the package specific identifying information to the external database via the cloud server for storage of the package specific identifying information in the external database, receiving an input for delivery of the package from the facility unit body, retrieving package specific identifying information for the package from the external database via the cloud server, using the retrieved package specific identifying information for the selected individual package to retrieve the selected individual package from the package storage area, and releasing the selected individual package to the package discharge access point for pick-up by or delivery to a customer. The facility unit body provides a secure internal storage for an automatic package receiver and distributor service module. The service module includes at least one package receiving port for receiving a plurality of individual packages into the facility unit body, the package receiving port accessible from an exterior of the facility unit, a package storage area for securely storing the packages in the facility unit body, a package discharge access point accessible from the exterior of the facility unit body, the access point positioned for all customers and height compliant with disabled person laws and regulations, and a package delivery mechanism for moving packages between the at least one package receiving port, the package storage area and the package discharge access point. The service module is in two-way communication with higher level components, the higher level components including a cloud server and an external database.

In embodiments, the method includes notifying an interested party via the higher level components that the individual package has been dropped off at the facility unit body for pick-up and recording information about the drop-off in the external database via the cloud server. The method can include notifying an interested party via the higher level components that the individual package has been picked up and recording information about the pick-up in the external database via the cloud server. The interested party can be a customer, a courier, an Internet retailer, or a local brick-and-mortar retailer.

In some uses of the method, the package delivery mechanism includes a movable platform. The package delivery mechanism can include a pusher for selectively delivering packages to the movable platform. The service module can record date and time-stamped entries and photographs of the package, an individual who delivered the package, and an individual who picked up the package. A sensor on the movable platform can send a successful delivery message to the higher level components for processing and storage on the external database. Upon pickup of an individual package, a sensor associated with the package access discharge point sends a successful delivery message to the higher level components for processing and storage on the external database. The method can include the cloud server unlocking the package discharge access point based upon identifying information of the customer of the particular individual package, the identifying information of the customer obtained via the higher level components. The package receiving port can be a public receiving port for receiving a drop-off package by a customer for pick up by a courier service. Delivering of the package to the facility unit body can be performed by a courier service. Picking up the package from the access point can be performed by an interested party. The interested party can be a courier service or the customer.

In embodiments of the system, a facility unit body provides a secured internal storage and dispensing area, the facility unit body having insulation and a cooling system for maintaining products at controlled temperatures, and one or more dispensing locations for delivering products to said purchasers. A plurality of inventory dispensing units are arranged within the facility unit body, the inventory dispensing units comprising trays configured to store and selectively dispense products, each inventory dispensing unit having a stocking end and a dispensing end. A product delivery apparatus is provided in the facility unit body, the product delivery apparatus operatively connected between the inventory dispensing units and the one or more dispensing locations. A plurality of lockable inventory access ports are provided to the facility unit body, each lockable inventory access port providing selective access to one or more associated inventory dispensing units. The inventory dispensing units are configured to selectively slide substantially out of the facility unit body through an associated inventory access port in a suspended relationship with the facility unit body for ease of inspection and stocking of products prior to reinsertion of the inventory dispensing unit back into the facility unit body for dispensing of products. An inventory management vehicle is provided, the inventory management vehicle configured for positioning adjacent to a side of the facility unit body, the inventory management vehicle configured for use in selectively accessing the inventory access ports for secure inspection and stocking of the inventory dispensing units with products.

The inventory management vehicle can be a truck comprising a driving cab portion and an inventory supply and restocking portion. The inventory supply and restocking portion may be climate controlled. The driving cab portion may communicate with the inventory supply and restocking portion such that an inventory manager can safely enter the inventory supply and restock portion without leaving the inventory management vehicle. The inventory supply and restocking portion may further comprise side inventory doors for selective access to access ports containing products, and a first and a second side shield, the first and second side shields on opposing sides of the inventory side doors. The side shields are extendable between the inventory supply and restocking portion and the facility unit body to provide security and privacy during transfer of products from the inventory supply and restocking portion to the inventory dispensing units of the facility unit body. The inventory management vehicle can further comprise a raised platform that allows convenient access to both high and low positioned inventory dispensing units of the facility unit body.

In embodiments, the plurality of inventory dispensing modules includes goods dispensing trays configured to store and dispense small products. The goods dispensing trays are configured to slide out of the facility unit body such that the stocking end is suspended at an angle of suspension below the dispensing end, the angle of suspension facilitating ease of inspection and stocking of products prior to reinsertion of the inventory dispensing unit back into the facility unit body for dispensing of products. In embodiments, the angle of suspension maybe between about 0 degrees to about 60 degrees. In embodiments, the angle of suspension is between about 40 to about 50 degrees, such as about 45 degrees.

In some embodiments, the goods dispensing trays include a pair of support rails on opposing sides thereof, each support rail having a rail wheel rotatably mounted adjacent a dispensing end thereof. The support rails and rail wheels are mounted in an associated front support hanger track of the facility unit body for use in sliding the goods dispensing tray from the facility unit body in the suspended relationship. Each of the front support hanger tracks has a first and a second stopper on opposing ends thereof, to thereby retain the support rail in the front support hanger track during stocking and dispensing of products.

In embodiments, the plurality of inventory dispensing modules includes rolling rack dispensing units configured to store and selectively dispense heavy or fragile products to the product delivery apparatus via gravity. In some embodiments, the rolling rack dispensing units are positioned below the goods dispensing trays, and dispensing ends of the rolling rack dispensing units are adjacent to the product delivery apparatus to facilitate safe delivery of heavy or fragile products. In embodiments, each of the rolling rack dispensing units comprises a conveyor platform formed by a plurality of transversely mounted freely spinning rollers substantially along a length thereof, the conveyor platform fixedly declined at a dispensing angle from a stocking end toward the dispensing end for dispensing a stock of products to the product delivery apparatus via gravity, and a roller gate mechanism adjacent the dispensing end configured for selectively releasing one of the stock of products to the product delivery apparatus upon selection by a purchaser while retaining the stock of products, the roller gate release being actuated by an electric or pneumatic mechanism. The dispensing angle may be between about 20 to about 40 degrees. In embodiments, the dispensing angle is between about 25 to about 30 degrees, such as about 27 degrees.

In some embodiments, the roller gate mechanism comprises a pair of rotating brackets rotabably positioned on opposing sides of the dispensing end of the rolling rack dispensing unit, the roller gate mounted between the brackets so as to retain the stock of products when roller gate is in a storage position. The roller gate mechanism may further comprise a stopping gate mounted between the pair of rotating brackets for retaining the stock of products when the roller gate is in a dispensing position. The roller gate may comprise a freely spinning roller and the stopping gate may comprise a freely spinning roller, the stopping gate configured to provide one of the plurality of freely spinning rollers when the roller gate is in a storage position, and the roller gate configured to provide one of the plurality of freely spinning rollers when the roller gate is in a dispensing position. In embodiments, the roller gate mechanism is air actuated to the dispensing position and is normally retained in the storage position by a spring mechanism, the spring mechanism preventing the inadvertent delivery of the stock of products in the event of loss of air.

The product delivery apparatus can comprise a conveyor belt apparatus having a dual cantilevered conveyor belt bed configured to create a V-track space between opposing cantilevered bed portions, and a belt component having a V-belt member on a lower side thereof, wherein the V-belt member is configured to run in the V-track space between the opposing cantilevered bed portions, the arrangement providing a resilient bed and belt arrangement for receipt of products. The V-belt member and corresponding V-track space maintain the belt member in alignment in the conveyor belt apparatus. The cantilevered bed portions have a spring-like resilience for cushioning products dropped onto the belt component. The V-belt member may comprise a single tooth having a wide end positioned at the lower belt member surface and a narrow end positioned to enter the V-track space. The V-belt member can be configured to be engaged by a motor for operating the belt member in either direction.

The system can include at least one user interface module for use by said purchasers in selecting products from the inventory dispensing units. The system can further include at least one automated payment module for use by said purchasers in paying for products selected from the inventory dispensing units. In some embodiments, when an inventory dispensing unit is slid out of the facility unit body for stocking the inventory dispensing unit with products, the system automatically takes the inventory dispensing unit out of inventory, such that said purchasers cannot select or purchase products from the inventory dispensing unit during stocking.

The automated retail system can include a means for remotely managing a local client of the automated retail system and a remote operator client of the automated retail system, the means in bidirectional communication with the local client and the remote operator client; a means for remotely managing a product dispensing unit, the product dispensing unit in indirect bidirectional communication with the means for remotely managing the local client and the remote operator client; and a means for remotely managing a customer interface module, the customer interface module in indirect bidirectional communication with the means for remotely managing the local client and the remote operator client.

A method to dispense a product is provided comprising: receiving a process initiation signal from a customer interface module; capturing a photograph via a customer interface camera of the customer interface module; receiving an aisle selection signal from the customer interface module; receiving a product selection signal from the customer interface module; receiving a payment authorization validation signal from a payment gateway module; sending a signal to activate a device actor corresponding to the product selection; the device actor sending a signal to a dispensing unit corresponding to the product selection; and conveying the product to a dispensing chute, the signals, collectively, processed by a remote server in indirect communication with the customer interface module, the payment gateway module, the device actor and the dispensing unit.

A remotely managed automated retail facility may comprise a remote server, a local client, a remote operator client, an automated retail facility body capable of storing and dispensing a plurality of goods to a customer, a customer interface module, a payment gateway module, a plurality of device actors, and a plurality of dispensing units, the plurality of device actors in direct bidirectional communication with the local client and with the plurality of dispensing units, the remote server in indirect bidirectional communication with the local client and with the plurality of dispensing units. The remotely managed automated retail facility may include an automatic package receiver/distributor service module.

A system of managing inventory may comprise a supervisor portal in communication with a control processor for hosting operator actions within the system and establishing one or more connections to a remote network; an administrative client application hosted by the supervisor portal for managing operator actions within the system; an administrative interface comprised of single page apps generated by the administrative client application for inputting and viewing inventory data; and a database for storing inventory, the database in communication with the supervisor portal via the one or more connections to the remote network. The system can further comprise a handheld inventory management device hosting an inventory management application in communication with the supervisor portal via the one or more connections to the remote network for remotely managing inventory data.

BRIEF DESCRIPTION OF THE DRAWINGS

Further advantages of the invention will become apparent by reference to the detailed description of preferred embodiments when considered in conjunction with the drawings:

FIG. 1A shows a top plan view of a representative schematic drawing of an automated retail facility in communication with remote computer components. FIG. 1B shows a front elevation view of a representative schematic drawing of an automated retail facility with inventory dispensing modules exposed. FIG. 1C shows an interior elevation view of a representative schematic drawing of an automated retail facility. FIG. 1D is a side elevation view looking down the long axis of the conveyor belt, and it provides a detailed view of a conveyor belt configuration with a V-belt track and underlying double-cantilevered bed to lessen product impact thereon when dropped from an inventory dispensing module.

FIG. 8A (Inventory Management Controls), FIG. 8B (Unit Controls), FIG. 8C (Item Control), and FIG. 8D (Mechanical).

FIG. 9C provides details of an arrangement in which the inventory management vehicle is configured to internally receive opened doors of the store.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1A:
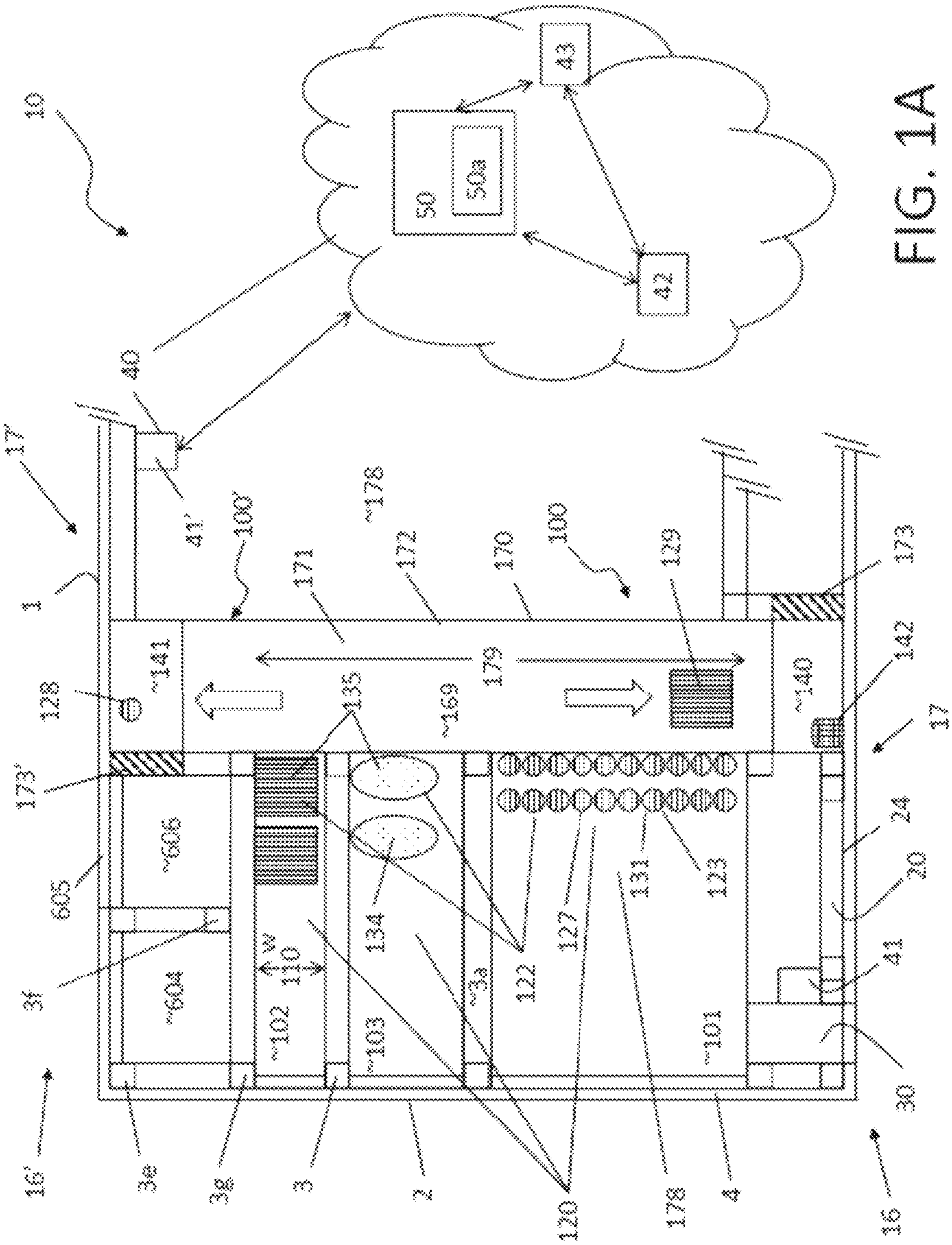
FIGS. 1A-1D depict schematic representations of an exemplary embodiment of an automated retail facility of the present invention with inventory dispensing modules, user interface modules, automated payment modules, and product dispensing and delivery modules.
Figure 1B:
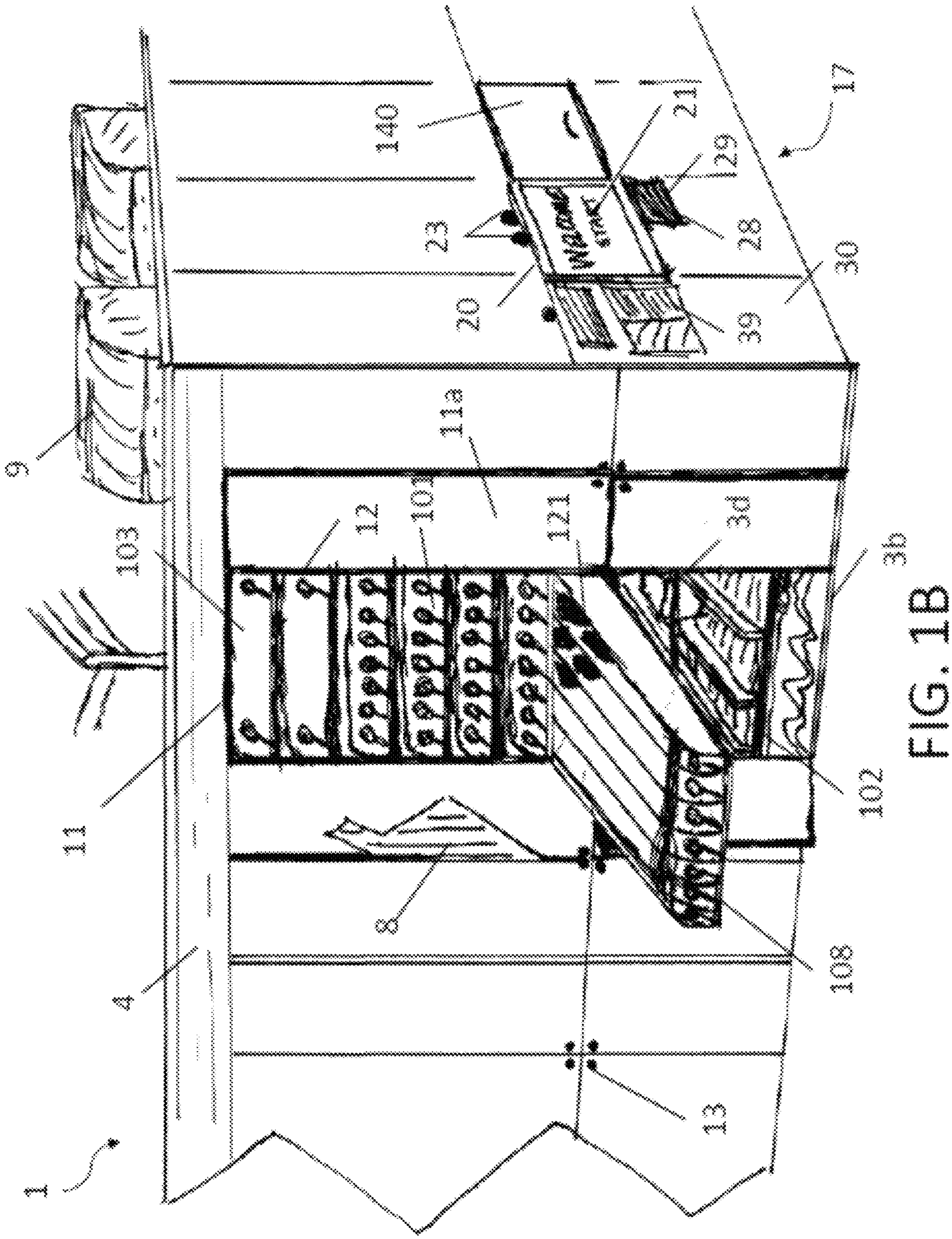
Figure 1C:
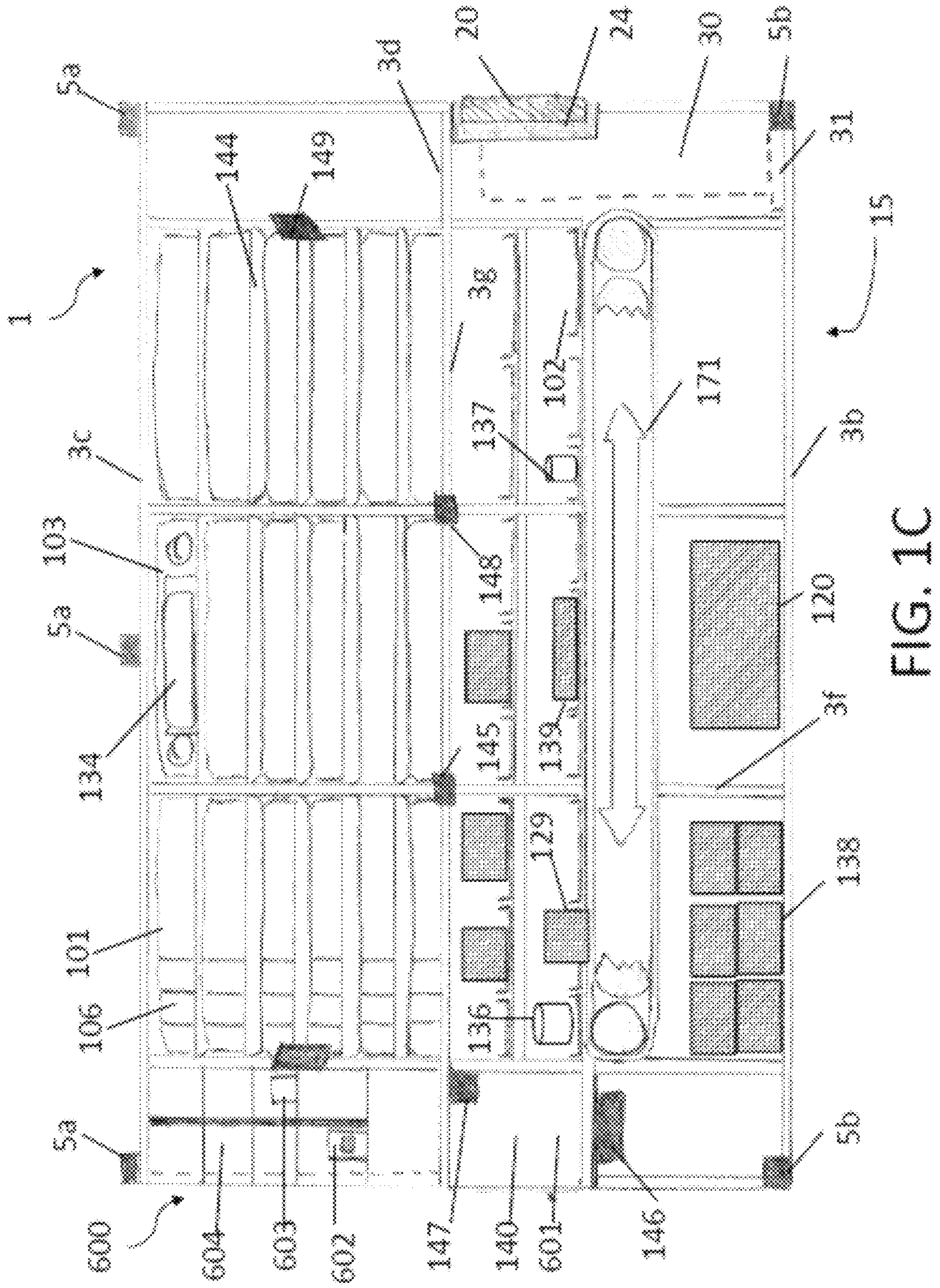

Referring to the drawings, FIGS. 1A-1C & 2 depict schematic representations of exemplary embodiments of an automated retail facility and system 10 of the present invention. In one embodiment, the automated retail facility 10 comprises an automated retail facility unit 1 with facility unit body 2, a plurality of inventory dispensing modules (shown schematically as inventory dispensing modules 101 & 102), at least one user interface module 20, at least one automated payment module 30, at least one product dispensing and delivery module 100 (including at least one conveyor belt system 170 and dispensing chute or dispensing location 140), as well as a management controller 50, a set of system computer components 40 comprising a local computer 41, a remote database server 42, and a remote cloud server 43. While only two inventory dispensing modules 101 & 102 are shown in FIGS. 1A & 1B, it should be understood that this is for brevity and that any usable form of dispensing and configuration/arrangement of dispensing modules 101 and/or 102 may be used within the scope of the invention, unless otherwise noted. In a preferred embodiment, the management controller 50 is comprised of at least one processor 50*a* in communication with the remote cloud server 43, which is in bidirectional communication with the local computer 41 and the remote database server 42 such that the local computer 41 and the remote database server 42 are in indirect bidirectional communication with each other through the remote cloud server 43 as an intermediary. It should be understood that other configurations may also be implemented, such as, for example, the remote database server 42 may be one and the same with the remote cloud server 43, which also houses the main processor 50*a*. The management controller 50 may be in direct or indirect bidirectional communication with the system computer components 40 via any known method of connecting two computing devices (whether remote from each other or in closer proximity), including wired or wireless access to a remote network (e.g., the Internet or a secured intranet). Thus, the automated retail facility and system 10 can be controlled conceptually as an internet of things (IoT) architecture. Accordingly, preferred embodiments of the automated retail facility and system 10 will be configured with at least one local computer 41 on site, while the remote cloud server 43 with management controller 50 and the remote database server 42 are located remotely from the automated retail facility and system 10. However, it should be understood that the automated retail facility and system 10 can also be configured to have all system computer components 40 located on site.

In a particularly preferred embodiment, the automated retail facility unit 1 comprises two user interface modules 20 & 20', two automated payment modules 30 & 30', two local computers 41 & 41', and two product dispensing and delivery modules 100 & 100' (preferably, the modules 100 & 100' share a conveyor belt system 170 with bidirectional conveyor belt apparatus 171). It should be understood that other embodiments may contain more or less than two of these modules and/or individual components thereof. Each of the above modules/components is separately associated to form a port 17, such that this described preferred embodiment has two independent ports (17 & 17'). In embodiments comprising more than one product dispensing and delivery module 100, certain components of this module may be shared, such as a bidirectional conveyor belt apparatus 171, for internal movement of products 122 as they are dispensed and delivered to a customer. Generally, the automated retail facility unit and system 10 is configured to be modular in its construction and components. The modular nature of both aspects of the automated retail facility unit 1 and computer system components 40 provides great flexibility in construction, including, but not limited to the size of each automated retail facility unit 1 as well as the types and amount of various products 122 stored as inventory 120. While the term "product" 122 is used throughout this description, it is done so for brevity, and it should be understood that a "product" 122 may be understood in some contexts to be a "good" 123 and in other contexts to be a "service" 124, and in still other contexts to be either a good 123 or a service 124 that may be purchased or obtained by a customer/user of the automated retail facility and system 10. By way of example only, and not limiting in any way, a service 124 may include purchasing an access code for a carwash, access or activation of an air pump for vehicle tires, and/or access or activation of a vacuum associated with the automated retail facility and system 10. Other exemplary services 124 which may be purchased or obtained at the automated retail facility unit 1 are discussed further below. Goods 123, as used herein, are any moveable and purchasable item that can be stored and dispensed from the automated retail facility unit 1. Other exemplary products 122/goods 123 include packages 603 for delivery to a customer/user, especially in association with the automatic package receiver/distributor service module 600 described in detail below. The packages 603 for delivery to a customer/user, as described below, may include packages sent via a postal service, a courier service, an associated retail store (such as a specialty ordered good, a purchase for store pick-up good, a prescription drug order or refill, etc.). In some preferred embodiments, the automated retail facility unit 1 is configured to be mobile, which provides great flexibility in the ultimate deployment setting (location) for a given unit. In more preferred embodiments, the automated retail facility unit 1 is configured to have a width (arrow line "W") dimension 14 that is equal to or less than a standard width of a flatbed trailer, thus making the automated retail facility unit 1 readily and conveniently transportable by road, rail, or other modes of transport. The deployment setting (location) of the automated retail facility units 1 may include, without limitation, traditional storefront convenient store locations (albeit on a much more economical real estate foot print), gas stations, parking lots and parking garages, schools and institutions of high education, associated retail stores, transportation ports and hubs (e.g., train stations, airports, and public transportation stops), apartment complexes, hotels, highway rest stops, and any other location frequented by potential consumers in vehicles or by foot.

The facility unit body 2 is generally cuboid in shape and preferred embodiments are rectangular cuboid to facilitate the modular aspects discussed in more detail below. The facility unit body 2 is comprised of two primary components: frame members 3 and a protective covering 4. The facility unit body 2 is configured to provide a secured internal storage and dispensing area, the secured internal storage and dispensing area including inventory storage areas 178 and product dispensing areas 179. The frame members 3 may be constructed of any known construction materials and provide rigid strength to the facility unit body 2 during transport and in its deployment setting (location), which may include parking lots and other close vehicular traffic. The frame members 3 may be structural or non-structural in nature. The frame members 3 may include both structural horizontal 3*a* and structural vertical 3*e* frame members meeting at the vertices of the facility unit body 2. Additional structural horizontal 3*a* and structural vertical 3*e* frame members may be included as needed between vertices to provide adequate structural support to the facility unit body 2, depending on unit dimensions 14. Non-structural horizontal 3*d* and vertical 3*f* frame members (also referred to herein collectively as modular support frame members 3*g*) may be included as needed to provide adequate support for the inventory dispensing modules 101 and/or 102 within the facility unit body's 2 inventory storage areas 178. The facility unit body 2 also contains internal structural frame members 3 and non-structural frame members **3*d* & 3*f*. The array of external (those forming the outer "cage" structure of the facility unit body 2) and internal structural and non-structural frame members defines the interior spaces of the facility unit body 2. The center most interior space 15 is the product dispensing area 179 disposed immediately above the conveyor belt apparatus 171 and, preferably, between two inventory storage areas 178 that contain/hold the plurality of inventory dispensing modules 101 and/or 102**.

The lowest horizontal structural frame members **3*b* and the highest horizontal structural frame member 3*c* are generally of larger dimensions to provide foundational and rigidity support for the facility unit body 2. The lowest horizontal frame structural members 3*b* and the highest horizontal structural frame member 3*c* include on one or more outwardly facing sides a plurality of transport facilitation points 5*a* that are configured to mate with appropriate large object movers (including, but not limited to, forklift forks, crane attachment hooks, and other well-known heavy equipment machines, not shown). Alternatively, or in addition to the plurality of transport facilitation points 5*a*, the lowest horizontal structural frame members 3*b* include on the bottom facing side a plurality of mobility facilitation points 5*b*** that are configured to mate with heavy-duty casters or other load-bearing rollers.

To facilitate the deployment of the inventory dispensing modules 101 and/or 102 within the facility unit body 2, the structural frame members 3 and non-structural frame members **3*d* & 3*f* are configured to provide attachment points 6 for the various inventory dispensing modules 101 and/or 102. In some embodiments, the attachment points 6 are thru-holes 6*a* for fasteners 7 (e.g., bolts, screws, rivets, or other fasteners) that provide attachment support for the various inventory dispensing modules 101 and/or 102 to the structural frame members 3. While any fastener known in the construction arts may be used, removable fasteners 7 are preferred to allow adjustment, removal, repair, or providing additional inventory dispensing modules 101 and/or 102 within the facility unit body 2, as needed or desired. In preferred embodiments, the attachment points 6 are channels 6*b* disposed within one or more sides of the structural frame members 3. The attachment points 6 also may be used to introduce modular support frame members 3*g*, for example, when such are needed to provide support for inventory dispensing modules 101 and/or 102 (including, but not limited to, a rolling rack dispenser 102, described in more detail below) that have different dimensional (arrow line "w") widths 110. As will be appreciated by a person of ordinary skill in the art, the channels 6*b* are particularly advantageous for the modular aspects of the automated retail facility unit 1, by allowing efficient adjustment of inventory dispensing modules 101 and/or 102 within the facility unit body 2 into a nearly infinite number of possible configurations of deployment within an automated retail facility unit 1**.

The protective covering 4 of the facility unit body 2 provides a barrier on all sides to the elements for the products and other sensitive equipment within the automated retail facility unit 1. The protective covering 4 is preferably laminar to provide a contained insulation 8, but it should be understood that any appropriate insulating materials 8 may be disposed within the facility unit body 2 in any known manner to maintain the desired internal temperature (see FIGS. 1B & 10D). One or more climate control systems 9 are provided to cool or heat the internal temperature within the automated retail facility unit 1 as needed by the goods 123 kept in inventory 120. In a preferred embodiment, the one or more climate control systems 9 are configured with the unit 1 to create different climate zones. Climate zones can be created for frozen goods, refrigerated goods, and room temperature goods. In some embodiments, accuracy of a temperature within a climate zone may be controlled directly by an administrator. The unit 1 may be internally divided with insulated "internal walls" held in place using the frame members 3. In a particularly advantageous embodiment, the automated retail facility unit 1 provides accurate climate zones for storing different wines at appropriate temperatures. The protective covering 4 also includes at least one inventory access port 11. Preferably the automated retail facility unit 1 comprises a plurality of inventory access port 11 to facilitate managing inventory 120, including restocking and physical audits, as well as adjusting the inventory dispensing modules 101 and/or 102 within the facility unit body 2 and any necessary repairs. The inventory access ports 11 may advantageously extend in a single door from the lowest possible placement of an inventory dispensing modules 101 and/or 102 to the highest possible placement of an inventory dispensing modules 101 and/or 102. Alternatively, the inventory access ports 11 may also be modular to provide access to a set of inventory dispensing modules 101 and/or 102 within a given space. Preferably, the inventory access ports 11 are configured to be disposed such that inventory dispensing modules 101 and/or 102 located between two vertical frame members 3 are entirely accessible for connection/disconnection to attachment points 6 thereon. In some preferred embodiments, the inventory access ports 11 may be hinged 12 to open on their vertical axis. This configuration is particularly preferred for combined use with an inventory management vehicle 126 (see FIG. 9A), discussed in further detail below). However, it should be understood that other opening modes (by way of example only, such as rolling or roll-up panel doors) may be employed. The inventory access ports 11 preferably include insulating materials 8 in order to best serve a modular design and to avoid extra access steps. Inventory access ports 11 include one or more locking mechanism(s) 13 to inhibit unauthorized entry, tampering, or theft. Likewise, the protective covering 4 is made of strong, lightweight material, such as sheet steel or similar alloy or material which may include a laminate corrugated interior to provide further strength and rigidity to the facility unit body 2.

User Interface

The automated retail facility and system 10 receives direct customer input at the user interface module 20, which is securely fixed to the facility unit body 2. The user interface module 20 is configured to provide a large visually interactive screen 21 to facilitate product selection. While preferred embodiments include a touchscreen 22, it should be appreciated that other manners of data input may be employed within the scope of the present invention, including, but not limited to, keyboards, mice, touchpads, voice controlled interaction, etc.

The user interface module 20 also includes one or more customer facing cameras 23 (which may include visible light and/or IR wavelength cameras), one or more audio speakers 26, a microphone 27, a printer 28, and a scanner 29 for scanning driver's licenses or other photo identification of a customer when appropriate. In preferred embodiments, the scanner 29 is also capable of functioning as optical reader 36 to scan/copy such items as marketing collateral, gift cards, loyalty cards, food stamps, rewards programs identification, etc. Optionally, the user interface module 20 may also include a keyboard hardware 25. Preferably, the user interface module 20 is modular in design as a self-contained unit 24 to facilitate efficient removal for replacement, upgrade, or repair of the user interface module 20, as needed. Preferably, the user interface module 20 includes the local computer 41. The self-contained unit 24 is advantageously configured to be fixed by removable fasteners between two vertical frame members structural 3*e* and/or non-structural 3*f* Preferably, access to the removable fasteners is gained from the interior 15 of the facility unit body 2. The user interface module 20 is in indirect bidirectional communication with the cloud server 43 for receiving single page apps or other relevant display screens to be displayed on the visually interactive screen 21. Through the cloud server 43, the user interface module 20 is in direct bidirectional communication with the local computer 41 and in indirect communication with the other computer system components 40, such as database server 42 and device actors 47 that control each of the locally disposed components that require a computer for communication over a network (e.g., the customer facing cameras 23 and the card reader device 33) of the automated retail facility unit 1, for display of customer-facing input and output information as single page applications ("SPA") (or SPAs that are Web apps that load a single HTML or other appropriate format page that is further dynamically updated as a customer/user interacts with the application or "app"). Importantly, and as discussed below, each of the customer interface displays (screens or pages) at each step in the procedures below are SPAs generated by the computer system components 40, and not a locally running application at the individual facility local computers 41. This system architecture provides the ability to remotely manage and manipulate the automated retail facility and system 10 with seamless operations.

A customer may initiate an interaction by contacting the touchscreen 22 and then browse the products 122 available in virtual product aisles/categories 72 displayed on the visually interactive screen 21. When ready to make a final purchase, the visually interactive screen 21 provides a single page app display with instructions to the customer to select a payment type 220. The automated retail facility and system 10 receives the selected payment type and related processed information, which may include, without limitation, cash, cryptocurrency (such as Bitcoin), credit/debit card, associated store credit card, customer account tab/balance, contactless payment devices (such as RFID, NFC, mobile payment/digital wallet services, etc.), or other known methods of physical or electronic payment. If such selection includes cash, card, other electronic payment form, or some combination thereof, an automated payment module 30 accepts the payment. The user interface module 20 further comprises a printer 28 to print a receipt for the transaction after payment has been validated and confirmed by the automated retail facility system 10. In the event that one or more products were not dispensed for any of a variety of reasons, the payment and receipt will reflect cash refund or appropriate credit charged to the customer/user. The error and refund processes are discussed in more detail below. Alternatively, the automated retail facility system 10 may send an electronic receipt via email or text message to the customer. The automated payment module 30 is securely fixed to one or more structural frame members 3 to provide added security for the automated payment module 30. However, it should be appreciated that the automated payment module 30 is preferably fixed by removable fasteners for the removal of the entire module 30 for upgrade, repair, or other need by an authorized person or service. In some embodiments, an automated payment module platform 31 is constructed into the foundational lowest horizontal structural frame members 3*b*, and preferably at a vertex of the foundational lowest horizontal structural frame members 3*b*. The automated payment module 30 may be in direct bidirectional communication with the cloud server 43, and thereby in indirect communication with other system computer components 40 (such as the user interface module 20 and database server 42) and payment/banking networks, as needed to validate certain payment methods. Importantly, the automated payment module 30 has two separate operating locking mechanisms. A first electronically controlled locking mechanism 18, such as a magnetic lock by way of a non-limiting example, is provided in communication with the system 10. The cloud server 43 can send a control message to a Programmable Logic Controller (PLC) 51 for the locking mechanism 18 (as directed by an administrator, including an onsite administrator using a handheld inventory management device 84) to unlock the banknote and/or coin box 37 for removal, replacement, service/maintenance, replenishment, or other reason. A second locking mechanism 19 separately and independently locks the banknote and coin box 37 housed within the automated payment module 30 to provide further security for funds. The second locking mechanism 19 on the banknote and coin box 37 may be electronically controlled (IoT architecture like the preferred embodiment of first electronically controlled locking mechanism 18) or be a conventional or specialty lock with a physically entered passcode or bio- or physical key. Preferably, passcode and/or key access is limited to certain personnel or the appropriate financial institution for deposit of funds. This configuration greatly reduces the chance of theft of income from the automated retail facility unit 1, as the last person to directly handle the money prior to depositing with a bank or other financial institution is a customer. A more detailed interactive, in-person purchase process 200 is described in more detail below.

Product Dispensing and Delivery Module

The automated retail facility unit 1 further comprises a product dispensing and delivery module 100, which takes a good 123 from inventory 120 and presents it to a customer. The dispensing and delivery module 100 is primarily comprised of three key components: the inventory 120 stored within a plurality of inventory dispensing modules 101 and/or 102, a conveyor belt apparatus 171 for moving dispensed goods 129 toward the customer, and the dispensing chute or dispensing location 140. In a particularly advantageous embodiment, the dispensing chute 140 is at a height/level that is convenient for all customers, whether in a walk-up setting or a drive-thru setting, and is compliant with disabilities laws and regulations, such as ADA compliancy. The delivery platform includes an enclosed delivery platform 141 where the purchased goods 128 are accumulated for delivery to the customer. Preferably, access to the dispensing chute 140 is only granted once purchased goods 128 are dispensed and continues until all purchased goods 128 are accumulated. Sensors 145, discussed below, in the dispensing chute 140 can be configured to alert the system 10 once all purchased goods 128 are removed so that the lock on the dispensing chute 140 can be reengaged. Bags or sacks 142 may optionally be provided within or outside of the dispensing chute 140 to allow bundling of the purchased goods 128 for easier transport. In embodiments having two or more product dispensing and delivery modules 100, the preferred arrangement is to have these located at opposite sides (e.g., first customer interaction side 16 and second customer interaction side 16', see FIG. 1A) of the automated retail facility unit 1. This opposite end configuration allows efficient use of the conveyor belt apparatus 171, which can be configured to operate in both directions, as needed, to move dispensed goods 129 toward two or more dispensing chutes 140 located at the opposite sides 16 & 16' or in other physical arrangements around a facility unit body 2. This configuration also provides the most efficient use of space within the automated retail facility unit 1, as at least two customers can be purchasing goods 123 at the same time and allows for two storage areas 178 on either side for stocked inventory goods 120. For embodiments where an opposite side configuration is not possible or desirable, a secondary conveyor belt apparatus (173) may be located downstream of the primary conveyor belt apparatus 172 for moving dispensed goods 129 at an angle, preferably 90 degrees relative to the primary conveyor belt apparatus 172, toward each dispensing chute 140.

Conveyor Belt Apparatus

For reasons that will be made clear below, the conveyor belt apparatus 171 preferably comprises a resilient conveyor material that provides some cushion for dispensed goods 129 as they fall onto the conveyor belt apparatus 171. Added cushion is provided by a dual cantilevered conveyor bed 174 that is attached onto the frame members 3 on opposite sides (right and left relative to the long-axis of the conveyor belt 169) of the conveyor belt apparatus 171 (see FIG. 1D in a cross-section view down the long-axis of the conveyor belt 169). Each cantilevered bed half 174 (right/first half **174*a* and left/second half 174*b*) is made of a resilient material (e.g., sheet metal) fastened to one or more frame members 3 at a first end 175*a* opposite to one another. The second end 175*b* of each cantilevered bed half 174*a/b* is not attached or fastened to a frame member 3, but is instead free and angled or curved down relative to the conveyor belt 169 resting or placed on top of the dual cantilevered conveyor bed 174. The resilient cantilevered conveyor bed 174 acts as springs, like a diving board, as dispensed goods 129 fall onto the conveyor belt 169 such that the landing impact for heavy items is sufficiently reduced to prevent all breaks or harm to such goods 135. Furthermore, the conveyor belt 169 preferably comprises an underlying V-belt member 176 disposed on the bottom of the conveyor belt 169. In embodiments, the V-belt member 176 extends along the entire length of the underside of the belt 169. In an exemplary embodiment, the V-belt member 176 is made of laminate durable rubber material that fits into the V-track 177 created by the space between the two opposing cantilevered second ends 175*b* of the cantilevered bed halves 174*a/b*. The conveyor belt apparatus 171 motor will engage, directly or indirectly, the V-belt member 176, either from below the V-track 177 or as the continuous loop conveyor belt 169 wraps around underneath rollers and other mechanical equipment not shown in FIG. 1D. The motor may consist of a pair of roller motors (not shown), each roller motor positioned on opposing ends of the continuous conveyor belt loop so as to configure the roller motors to selectively rotate the conveyor belt 169 in either direction. Freely rotating roller tubes (not shown) may be provided under the conveyor belt 169 for intermediate support and tracking of the belt 169 and underlying V-belt member 176. The roller motor and roller tubes may be provided with centralized grooves to accommodate the V-belt member 176 of the conveyor belt 169 during rotation. This configuration allows for improved bidirectional tracking and movement of dispensed goods 129 on the conveyor belt apparatus 171 as a typical conveyor belt operating in both directions requires concerted maintenance to remain in proper alignment. It should be understood that failure of the conveyor belt 169 to be maintained in proper alignment will cause disruption in service and lost sales for a unit 1. In contrast, the V-belt member 176 running in the V-track 177 maintains the conveyor belt 169** in a perpetual state of proper alignment.

Figure 1D:
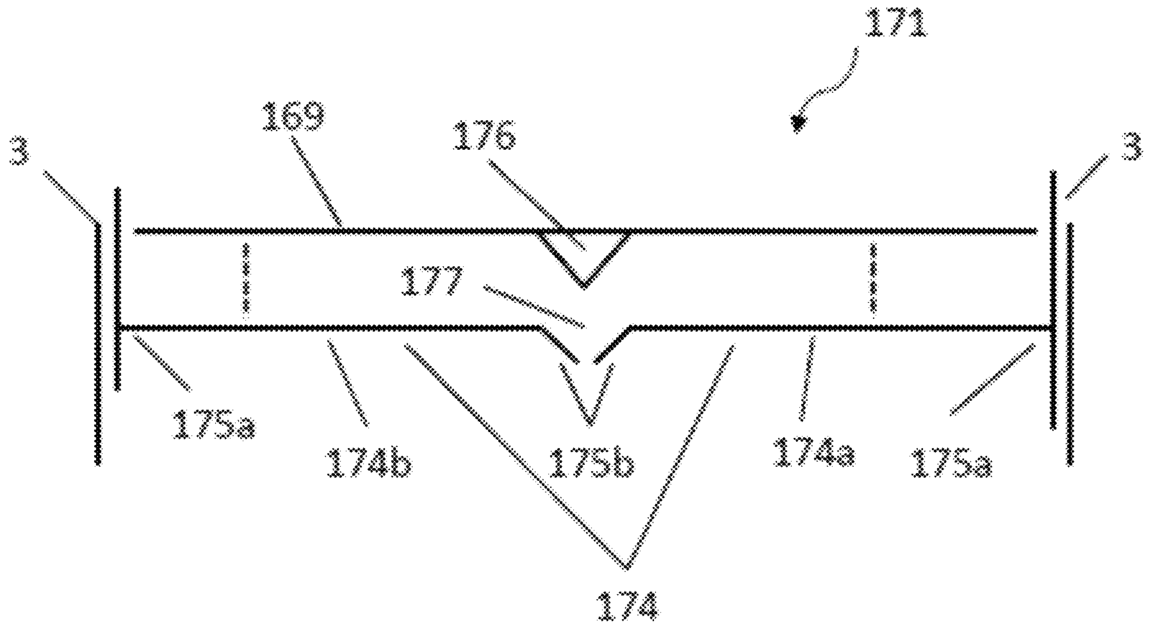
Figure 1E:
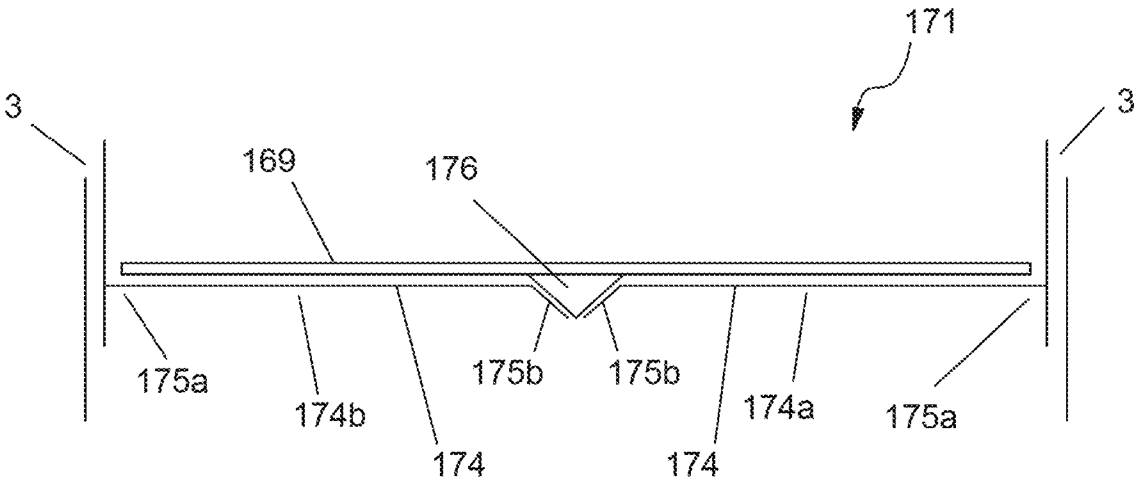
FIG. 1E is a side elevation view looking down the long axis of the conveyor belt, and it provides a detailed view of a conveyor belt configuration with a V-belt track and underlying double-cantilevered bed to lessen product impact thereon when dropped from an inventory dispensing module.

While the embodiment shown in FIG. 1D appears to show that the conveyor belt 169 is raised above the cantilevered conveyor bed 174, it is important to note that this presentation is made to better show the components and features of this innovation. In operation, the conveyor belt 169 will rest on top of the cantilevered conveyor bed 174 such that the V-belt member 176 is in communication with the V-track 177, as shown in FIG. 1E. In FIG. 1E, the V-belt conveyor member 176 is shown as having a flat lower surface between opposing tapered sides. The V-belt member 176 may be smooth or cogged.

Figure 1F:
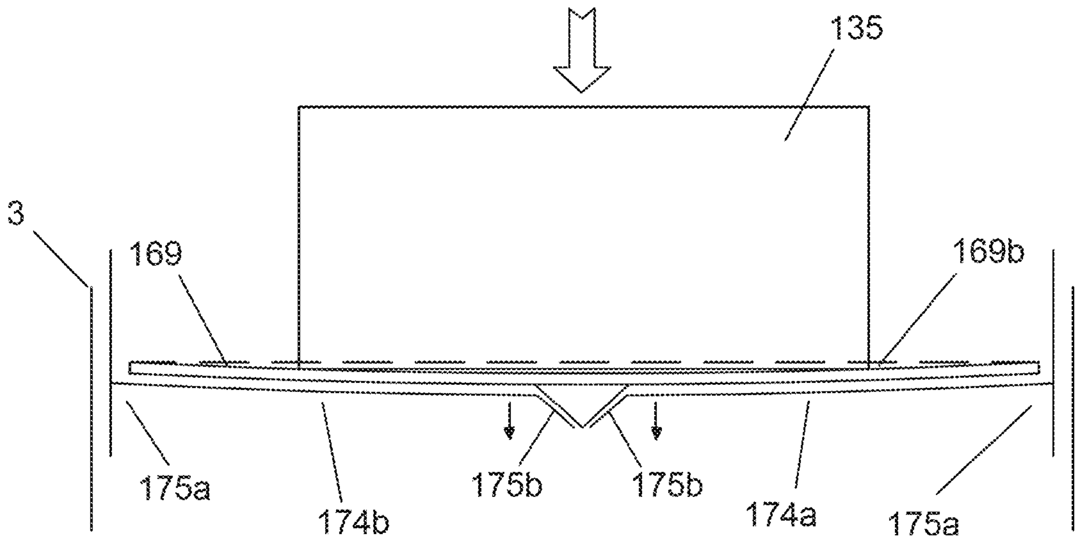
FIG. 1F is a side elevation view as in FIG. 1E but showing the conveyor belt and underlying cantilevered bed in a flexed condition upon receipt of a product for delivery to a purchaser.

FIG. 1F depicts the conveyor belt apparatus 171 in a resilient or cushioned condition upon receiving a product 135 dropped from an inventory dispensing module 101, 102. Dashed line **169*b* indicates the normal position of the first and second cantilevered beds 174*a*, 174*b* prior to receipt of the product 135. As can be seen in FIG. 1F, when a product 135 drops from an inventory dispensing module 101, 102 onto the conveyor belt 169, the weight of the product 135 forces the conveyor belt 169 and the underlying second unsupported cantelivered ends 175*b* of the cantilevered conveyor beds 174*a*, 174*b* to drop or depress. The resulting flexion of the cantilevered conveyor beds 174*a*, 174*b* absorbs and distributes the force of the fall, after which the conveyor beds 174*a*, 174*b* spring back to their normal configuration. The cantilevered beds 174*a*, 174*b* may be configured to provide selected degrees of resiliency. As noted herein, the dual cantilevered conveyor belt apparatus 171 is particularly suited for protecting fragile or heavy products 135 from damage during delivery to a purchaser. For fragile or heavy products 135, a give of about ¾ inches (2 cm) is sufficient to prevent damage to the products 135**.

The conveyor belt apparatus 171 will be of a selected length to efficiently use space within the facility unit body 2, and will generally be about the length of the facility unit body 2. For example, the conveyor belt apparatus 171 may be about 40 to 45 feet long, with the conveyor belt 169 and V-belt member 176 being about twice this length in order to provide a continuous conveyor loop.

Inventory Dispensing Modules

The inventory 120 is stored in and dispensed from a plurality of inventory dispensing modules 101 and/or 102. The inventory dispensing modules 101 and/or 102 come in a variety of forms, each of which may be for ordinary goods 131 or specially designed and configured for storing and dispensing special goods 135 that require more attention than ordinary goods 131. Ordinary goods 131 are those that are less prone to damage due to falling from a few feet or more onto the conveyor belt apparatus 171, and typically are not bulky or heavy. Such ordinary goods 131 may include, by way of example only and not intended to be limiting, cigarettes 132, gum and mints 133, breads 134, and other relatively lightweight items. Therefore, these ordinary goods 131 are generally disposed in the inventory dispensing modules 101 and/or 102 located in the tallest reaches of the inventory storage areas 178. Special goods 135, by way of example only and not intended to be limiting, include gallon milk jugs 136, carbonated beverages 137, multi-packs of beverages 138, eggs 139, and other heavy or fragile items. As described above, the inventory dispensing modules 101 and/or 102 are advantageously fastened to a set of structural

3 and/or non-structural frame members. It will be appreciated that inventory dispensing modules 101 and/or 102 may be fixed at an angle that allows gravity to aid in the energy of dispensing the goods 123 into the dispensing area 179. Depending on the support needed to hold the weight of a fully stocked inventory dispensing modules 101 and/or 102, more or fewer connections to the frame members 3 will be needed. A typical inventory dispensing module is a goods dispensing tray 101 for ordinary goods 131 (see FIG. 6) that requires four fastening connections (two for each support track 155 in communication with its corresponding support rail 151 and rail wheel 151a disposed on either side of the goods dispensing tray 101), each disposed on one of four parallel frame members 3. The goods dispensing tray 101 is preferably made with a standard width to facilitate placement between a set of similarly spaced vertical structural frame members 3. The goods dispensing tray 101 is comprised of a bottom plate 104 and two side barrier walls 105, which may optionally include bottom plate extension 104a and side barrier wall extensions 105a to customize the product stocking space depth of the goods dispensing tray 101. Between the side barrier walls 105, product lanes 106 are created by placing additional barrier walls 105b running parallel to the side barrier walls 105. Within each product lane 106 is a corkscrew inventory holder 107 powered by an electric motor 108 at the stocking or back end 154b of the tray 101 in communication with a PLC 51 as a connected device 45. Depending on the dimensions of each stocked product 127, the width 110 (arrow line "w"; see FIG. 1) of the product lanes 106 can be adjusted to accommodate larger or smaller products 122. An activated electric motor 108 turns a corkscrew inventory holder 107 for each activated product lane 106, which will turn any range of rotation (such as, but not limited to, 1/10, 1/9, 1/8. 1/7, 1/6, 1/5, 1/4, 1/3, 1/2, 2/5, 3/4, 4/5, or 1, 2, 3, 4, 5, 6, 7, 8, 9, and more rotations or any combination or fraction thereof) as needed for any given selected product 128 and programmed (controlled by a PLC 51 as instructed by the system for dispensation) to effectuate dispensing and to eject the selected product 128 from the goods dispensing tray 101 and into the inventory dispensing area 179 where it falls to the conveyor belt apparatus 171. Based on the angle of dispensing and the height traveled, horizontal baffles 144 disposed at the dispensing end 154a of an inventory dispensing module 101 on the oppositely located dispensing area may be required to prevent the dispensed good 129 from errantly landing in another, lower inventory dispensing module 101 and/or 102. Once a dispensed good 129 falls onto the conveyor belt apparatus 171, sensors 145 will detect and identify the dispensed good 129 as a quality control to ensure that the selected/purchased good 128 was dispensed. Sensors 145 may include one or more of the following: weight scale sensor 146, optical scanner sensor 147 for reading barcodes and the like, light curtain sensor 148 for measuring dimensions, photographic image recognition sensors 149 that compare the image of the actual dispensed good 129 with a stored image of the selected/purchased good 128, and combinations thereof.

Figure 6:
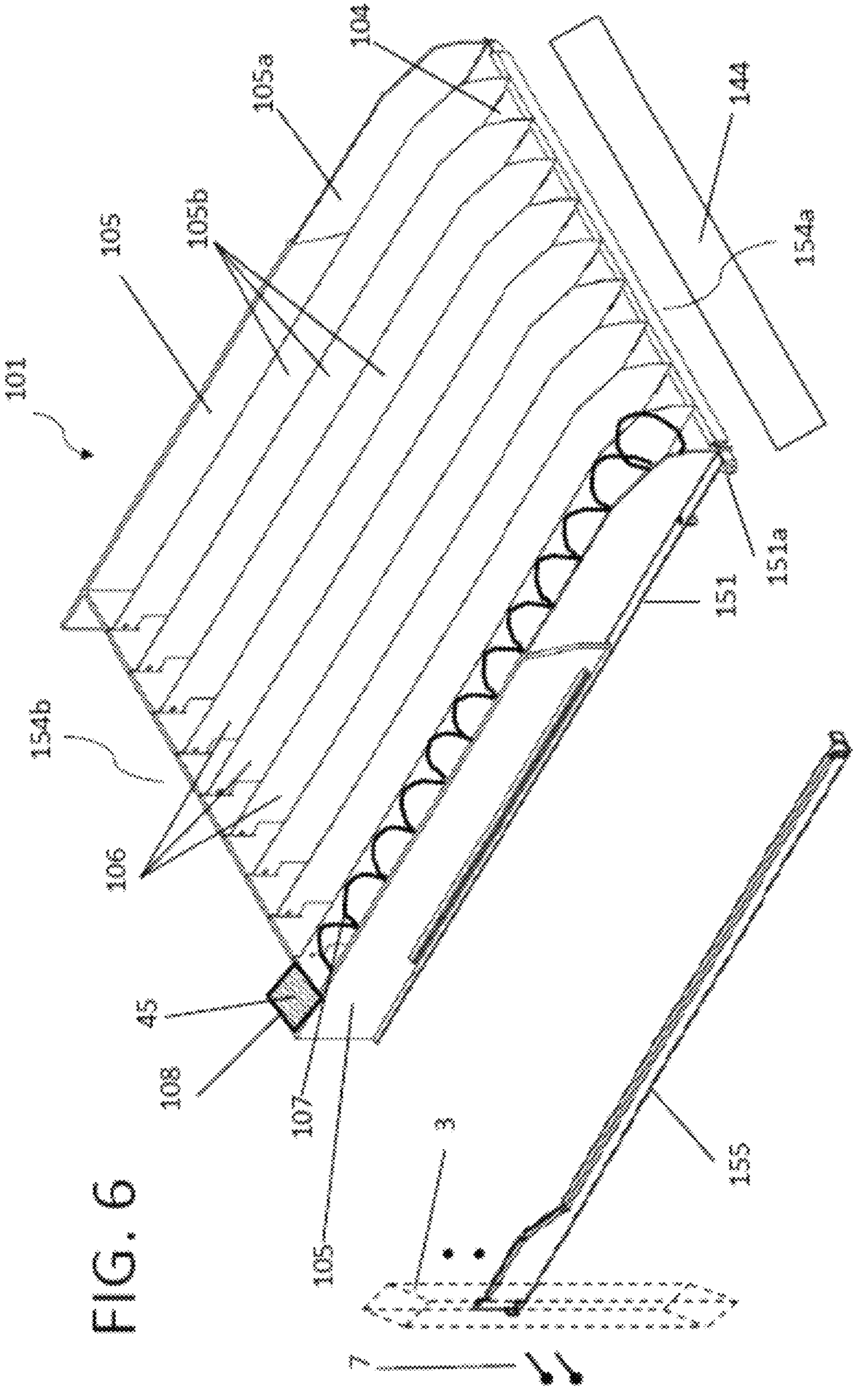
FIG. 6 depicts an exemplary embodiment of a goods dispensing tray for use as an inventory dispensing module of the present invention with mounted track and rail, as well as optional baffle that allows restocking from outside the store or optional restocking vehicle.

The majority of products can be stocked in a goods dispensing tray 101. To allow for restocking of goods, a goods dispensing tray 101 has front support hanger track 155 mounted on the bottom of the barrier wall 105 containing sides of the goods dispensing tray 101. At the dispensing end 154a of each extension there is located a rotatable wheel 151a that fits within a corresponding front support hanger track 155. As shown in FIG. 6, the front support hanger track 155 is fastenably attached, e.g., with removable fasteners 7, to the set of frame members 3 to support the goods dispensing tray 101, thus allowing the goods dispensing tray 101 to be slid out of the inventory storage area 178 substantially completely. To hold the goods dispensing tray 101 in the front support hanger track 155, a stopper 152 is located at each end of the front support hanger track 155. The complete sliding movement facilitates viewing of the entire goods dispensing tray 101 and all currently stocked inventory 121. However, the complete sliding movement also takes up a great deal of space for the inventory manager to contend with. Also, the highest placed goods dispensing tray 101 may be too high for convenient inspection and/or restocking. Having to restock from an elevated position may cause an unsafe condition for the restocking inventory manager. Therefore, we have found that positioning the goods dispensing tray 101 at a downward angle 158 when completely slid out in the restocking position solves both challenges and facilitates safe and efficient inspection and/or restocking.

Figure 6A:
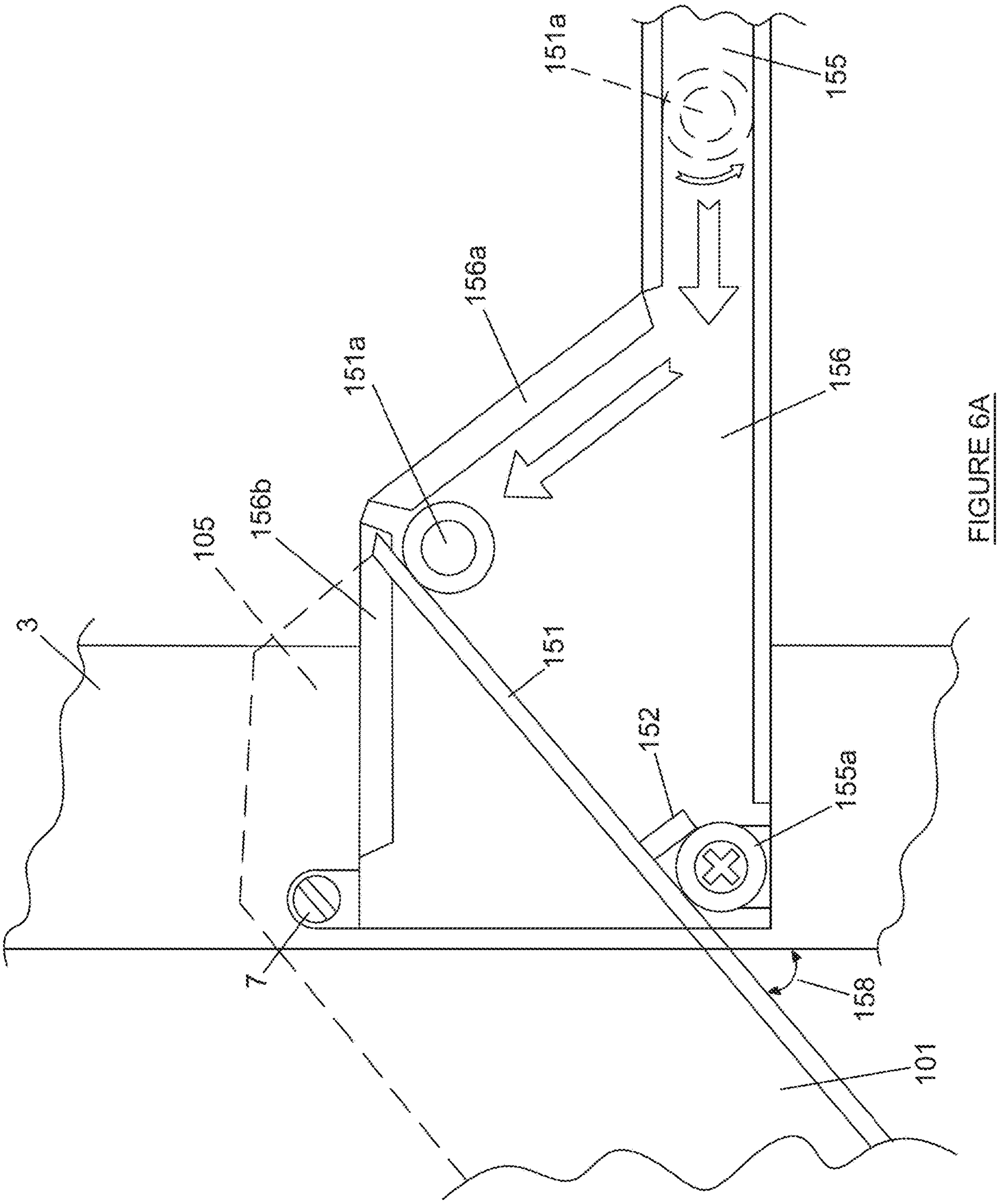
FIG. 6A shows an embodiment of a bracket arrangement for use in suspending a goods dispensing tray in a downwardly angled position to facilitate inspection and restocking.

FIG. 6A provides additional details about an embodiment for maintaining a goods dispensing tray 101 at a downward angle 158 during inspection and stocking. The support rail 155 includes an enlarged support rail bracket portion 156 formed on a stocking end of the support rail 155. The enlarged support rail bracket portion 156 includes an inclined rail 156a and an upper rail 156b, as well as an open (no rail) stocking end. A freely rotating wheel bearing 155a is fixedly positioned on a lower edge of the support rail bracket portion 156 adjacent the open stocking end. The rotating wheel bearing 155a is positioned to allow a lower surface of the support rail 151 of the goods dispensing tray 101 to translate along the rotating wheel bearing 155a during withdrawal and reinsertion of the tray 101 from the facility unit body 2. In this arrangement, the tray 101 is thus supported by two wheels: (1) the rail wheel 151a positioned on the dispensing end of the support rail 151 of the tray 101; and (2) the wheel bearing 155a of the support bracket 155. In FIG. 6A, a position of the rail wheel 151a in the track of the support bracket 155 is indicated in broken lines. As indicated by the flow arrows, as the tray 101 is withdrawn from the facility unit body 2, the rail wheel 151a rotates into the enlarged bracket portion 156, where it initially tracks against the inclined rail 156a as the stocking end of the tray 101 begins to drop relative to the dispensing end. When the stopper 152 abuts against the wheel bearing 155a, the rail wheel 151a comes to rest in abutment with the upper rail 156b. As can be seen in FIG. 6A, this arrangement temporarily maintains the tray 101 in a downward angle 158 during inspection and restocking. The downward angle 158 is determined by the width of the enlarged bracket portion 156, the position of the stopper 152 on the support rail 151, and diameters of the wheel bearing 155a and rail wheel 151a. As will be appreciated, mirror images of this arrangement are provided on opposing sides of the tray 101. When the stocker is finished stocking, the stocker lifts the stocking end of the tray 101, which causes the rail wheel 151a to drop out of the enlarged bracket portion 156 and back into the support track 155. Due to the foregoing arrangement, withdrawal and reinsertion of the tray 101 is accomplished with minimal physical effort on the part of the stocker.

Rolling Rack Dispenser

Figures 7A, 7B:
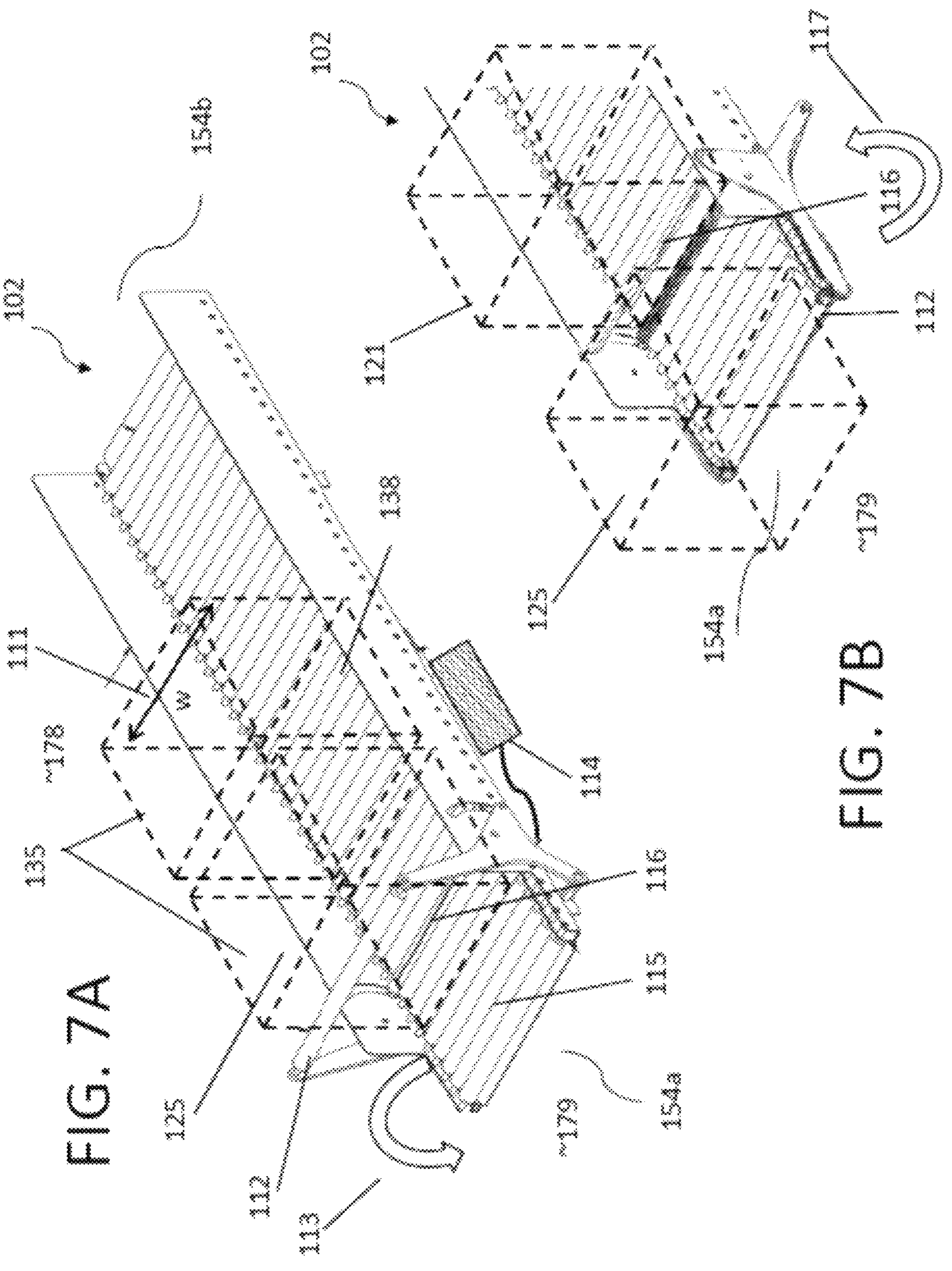
FIGS. 7A & 7B depict a rolling rack dispenser for use as an inventory dispensing module of the present invention in ready position (FIG. 7A) and in dispensing position (FIG. 7B).
Figure 8A:
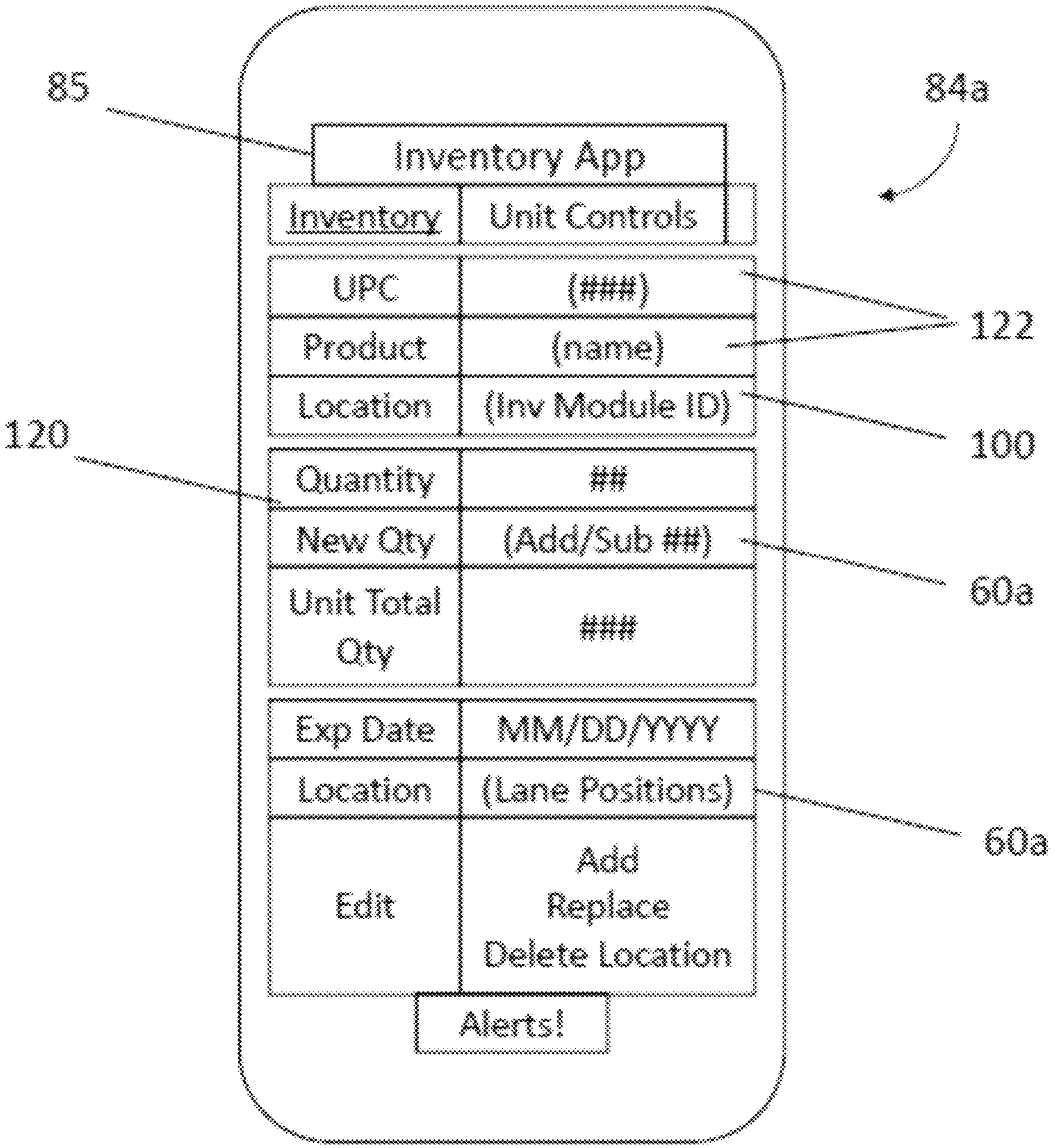
FIGS. 8A-8D depict a schematic representation of an exemplary embodiment of a handheld inventory management device and its functions.
Figure 8B:
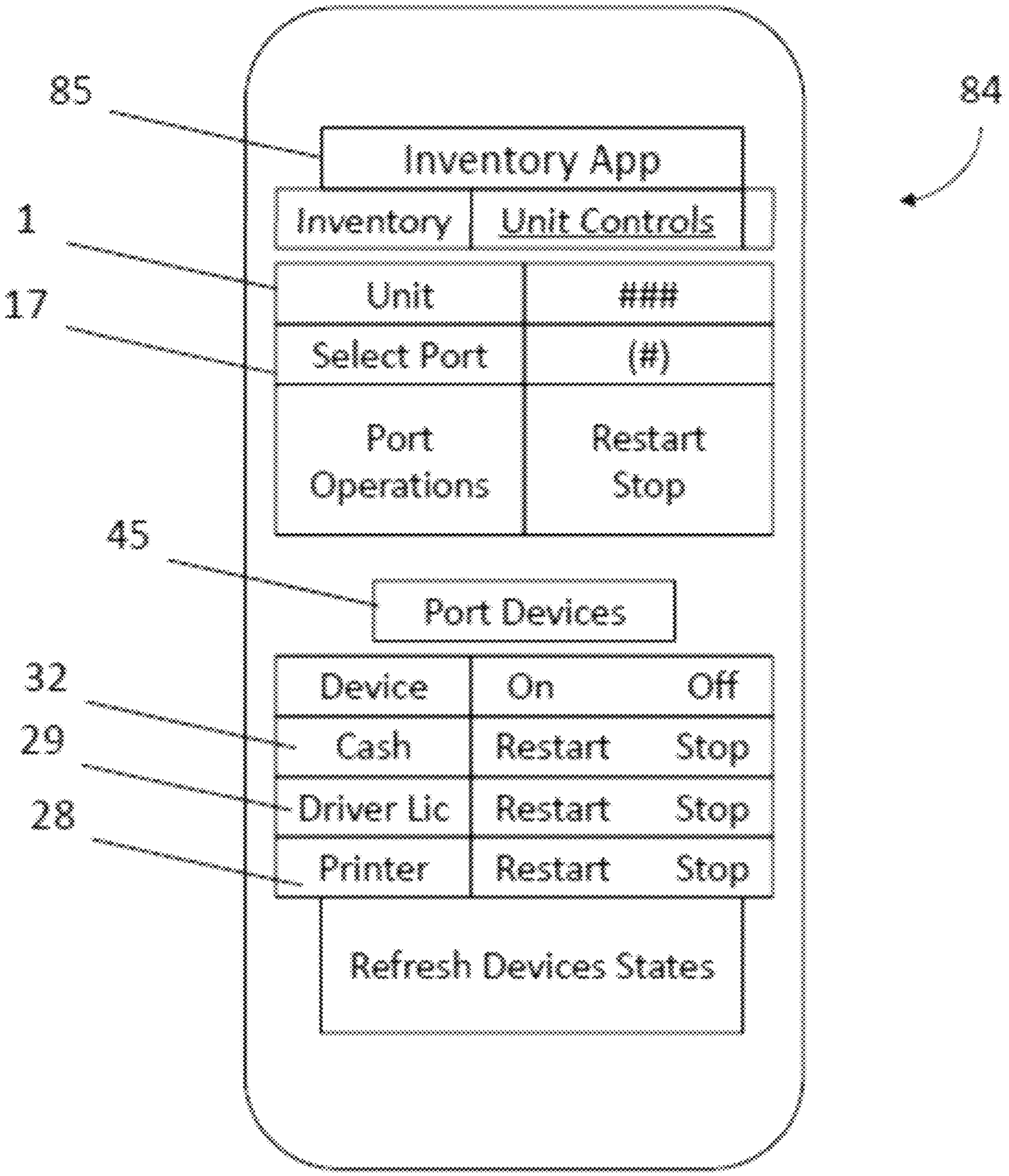
Figure 8C:
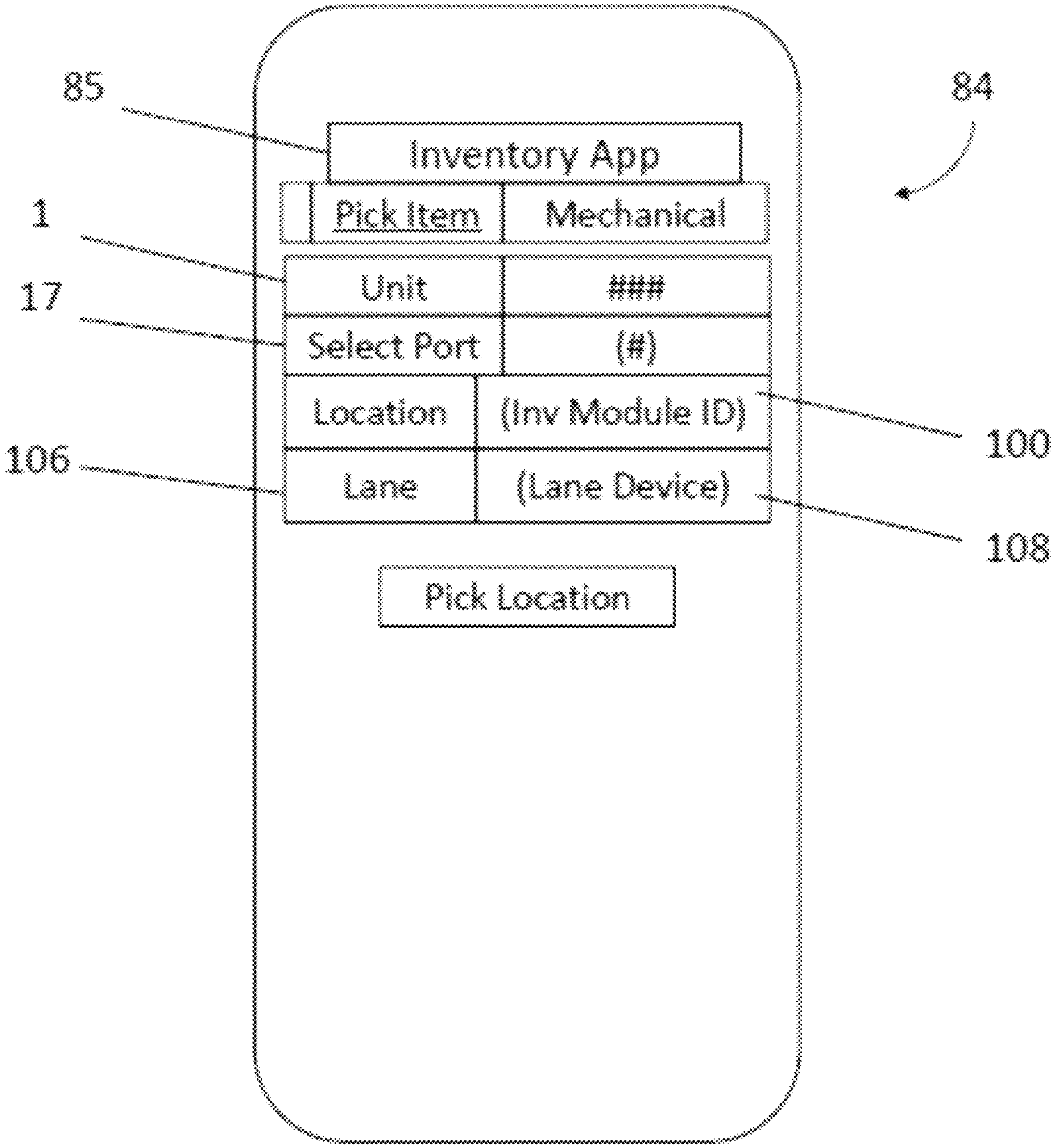
Figure 8D:
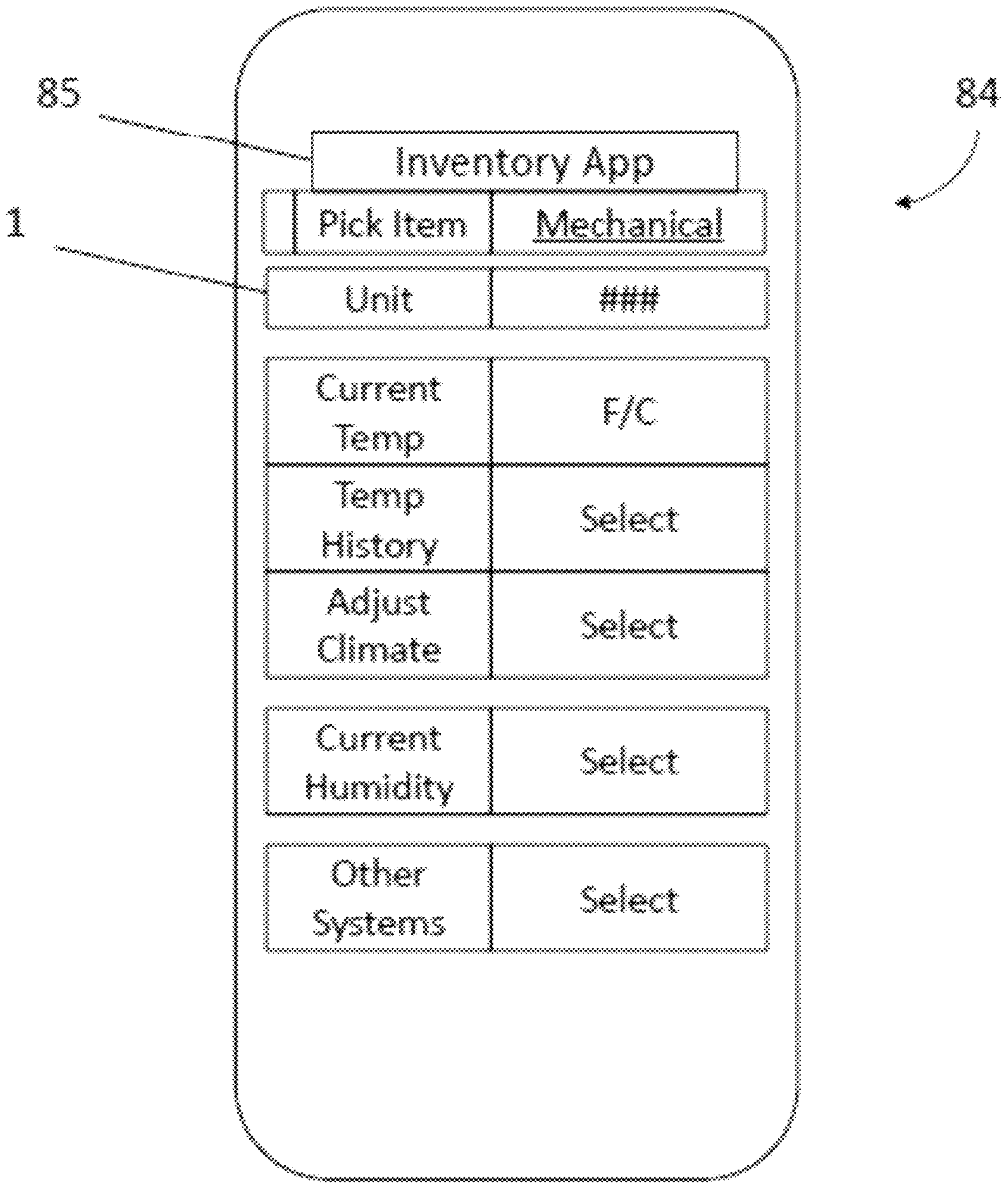

It has been found that special goods 135, and some delicate goods (e.g., breads 134), are best stocked and dispensed from inventory dispensing modules 101 and/or 102 specially designed and/or positioned for these goods 135. Heavy items or larger fragile items, such as gallon jugs of milk and multipacks of carbonated beverages, including beer and soda, are advantageously stocked and dispensed from a rolling rack dispenser 102 (shown in FIGS. 7A and 7B). Preferably, the rolling rack dispenser 102 is positioned in close proximity (height) to the conveyor belt apparatus 171 such that the special goods 135 thereon only drop from a relatively short height/distance to the conveyor belt 171. A rolling rack dispenser 102 may be configured to carry a particular special product 135, preferentially based on the product dimensions 111, so that a maximum number of such product 135 can be stored in inventory 120 on the rolling rack dispenser 102. Thus, the rolling rack dispensers 102 in a given automated retail facility unit 1 may contain different dimensional (arrow line "w") widths 110 (see FIG. 1B). The rolling rack dispenser 102 is attached to horizontal frame members 3*a* and/or 3*d* such that it is disposed at an angle for gravity to pull the mass of the product 135 down to facilitate dispensing onto the conveyer belt apparatus 171. The horizontal frame members may be structural 3*a* or non-structural 3*d* frame members. Alternatively, the rolling rack dispenser 102 is attached to vertical frame members 3*e* and/or 3*f* such that it is disposed at an angle for gravity to pull the mass of the product 135 down to facilitate dispensing onto the conveyer belt apparatus 171. The vertical frame members may be structural 3*e* or non-structural 3*f* frame members. Of course, the rolling rack dispenser 102 may be attached to both horizontal frame members 3*a* and/or 3*d* and vertical frame members 3*e* and/or 3*f*, as available. When a stocked product 127 in a rolling rack dispenser 102 is selected for dispensing, a roller gate 112 is lowered in a rotating motion 113 toward the dispensing area 179 (see starting position as FIG. 7A). The roller gate lowering action 113 may be powered by an electric or a pneumatic mechanism 114, or it may be powered by gravity and the weight of the inventory 120 stocked in the rolling rack dispenser 102 while being unlocked by an electric or a pneumatic mechanism 114. The lowering of the roller gate 112 allows all inventory 120 stocked in the rolling rack dispenser 102 to move forward as the rollers 115 freely turn under the weight of the stocked inventory 121. However, as the first in-line product 125 moves forward, a stopping gate 116 attached to the roller gate 112 is raised in an opposite rotating motion 117 behind the first in-line product 125. This effectively allows only one selected product 128 to complete the rolling path onto the conveyor belt apparatus 171 (see FIG. 1D). It should be appreciated that the open back end (end away from conveyor belt 171 and roller gate 112) is positioned for easy restocking from outside the unit 1 or from an optional restocking vehicle 126 (see, e.g., FIG. 1B).

It should be appreciated that the goods dispensing tray 101 can be modified to include one or more delicate product dispenser lanes, as well as utilizing any remaining space for creating product lanes 106 for ordinary goods 131, as described above, for efficient use of space. Also, a goods dispensing tray 101 can be configured to only dispense delicate goods, such as breads 134. Alternatively, a rolling rack dispenser 102 can be configured to dispense delicate goods, such as breads 134 or eggs 139.

Control System

Figure 2:
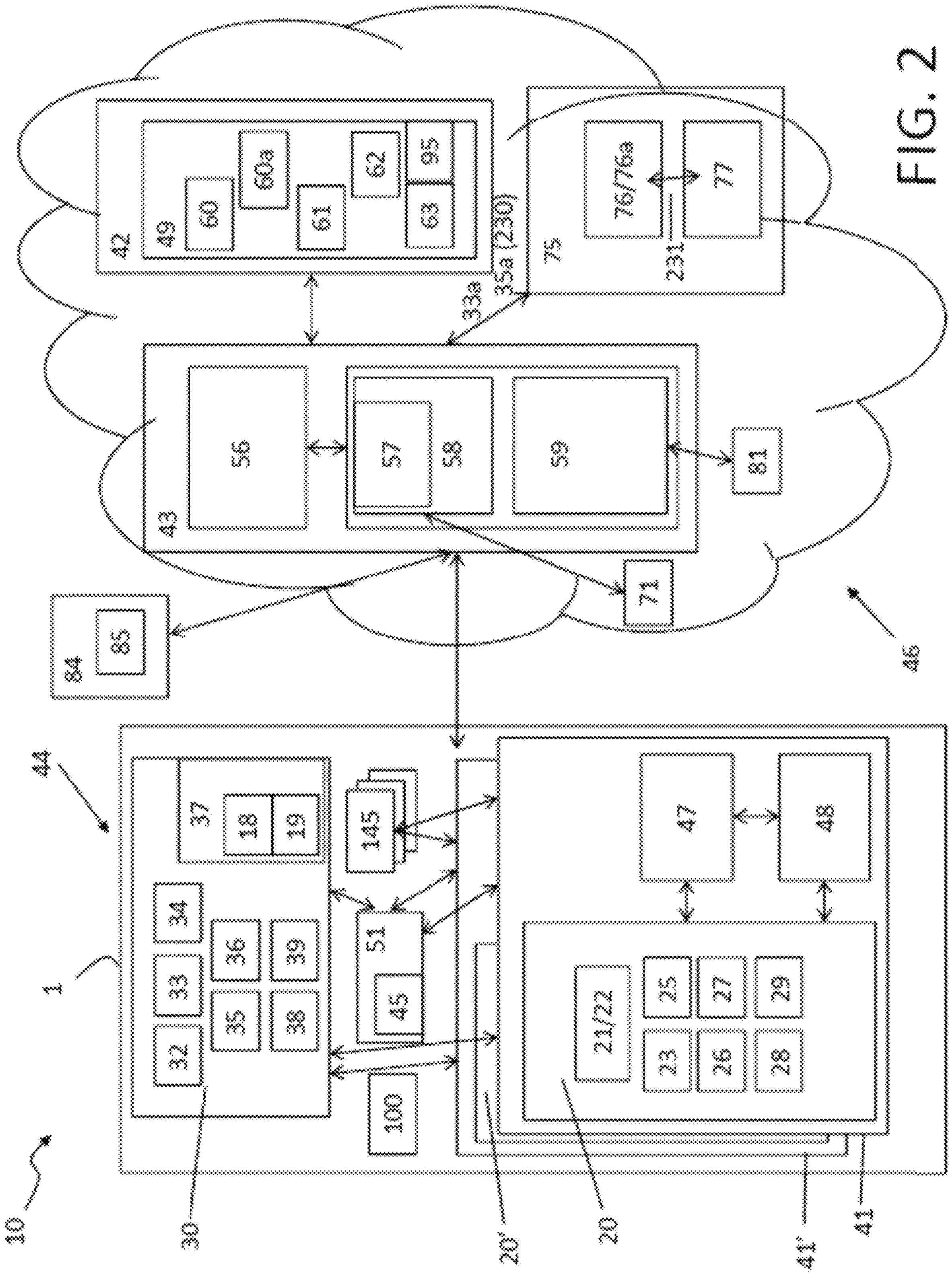
FIG. 2 is a block diagram schematic depicting an exemplary embodiment of the interactive and control systems of the present invention.

Referring now to FIG. 2, a representative schematic diagram of an exemplary embodiment of the control system of the present invention is shown. One key improvement of the present invention is the IoT architecture for remotely driven control of the automated retail facility and system 10. As can be appreciated in FIG. 2, the automated retail facility unit 1 comprises a local computer 41 as a low level component 44 in direct bidirectional communication with a cloud server 43, and the cloud server 43 is in direct bidirectional communication with a database server 42. It should be understood that the cloud server 43 could also incorporate one or more of the database server(s) 42. In turn, the local computer 41 is in indirect bidirectional communication with the database server 42 via the cloud server 43. Each constituent component (connected devices 45, such as an electric motor 108 that dispenses a product 122, pneumatic devices, actuators, or certain components of the cash machine module 32) at the automated retail facility unit 1 is in direct bidirectional communication with the local computer 41, but the local computer 41 obtains all instructions and display data for the connected devices 45 from the higher level components 46 (the cloud server 43 and the database server 42). A PLC 51 then controls the connected devices 45 through the bidirectional communication within the system 10. This novel IoT configuration allows seamless remote management and manipulation of each computer-connected device (system computer components 40) and mechanical component (connected devices 45) of the automated retail facility unit 1 via a remote network connection. PLC 51, thus, can be used to control all connected devices 45 (those devices that are capable of directly communicating over a network with a computing device). While certain devices are taught in this disclosure to be connected devices 45 in communication with PLC 51 (e.g., the magnetic locking mechanism 18, dispensing motors 108, and other mechanical devices), other components of the unit 1 that are taught to use a computer-connection for control (i.e., those devices requiring a device actor 47 computer connection to access a communication network) could have direct network connection and control by a PLC 51 if so configured now or in the future. Such design changes are contemplated to be within the scope of the present inventions. It should also be understood that PLC 51 could be a software component of the local computer 41 or a standalone device. While the automated retail facility unit 1 is associated with the "local computer 41" in this description, it should be understood that the cloud server 43, local computer 41, and database server 42 may each be in a single location (including at a single automated retail facility unit 1), but the possible configurations and IoT architecture of the computer system components 40 in communication with locally disposed mechanical components 45 allow for one or each of these three primary computer device components to be remote from one another or each of these various components. Also, each automated retail facility unit 1 may have more than one port 17 having its own local computer 41, such that each port 17 has its own local computer 41 associated with its own user interface module 20. Thus, as an example, in an automated retail facility unit 1 with two ports 17 & 17' (see FIG. 1), each local computer 41 may have a dedicated user interface module 20, automated payment module 30, and product dispensing and delivery module 100 at the automated retail facility unit 1, but the connected devices 45 for the inventory dispensing modules 101 and/or 102 in the automated retail facility unit 1 are preferably in direct bidirectional communication with the cloud server 43, which is in direct bidirectional communication with the first local computer 41 and the second local computer 41'.

Figure 4:
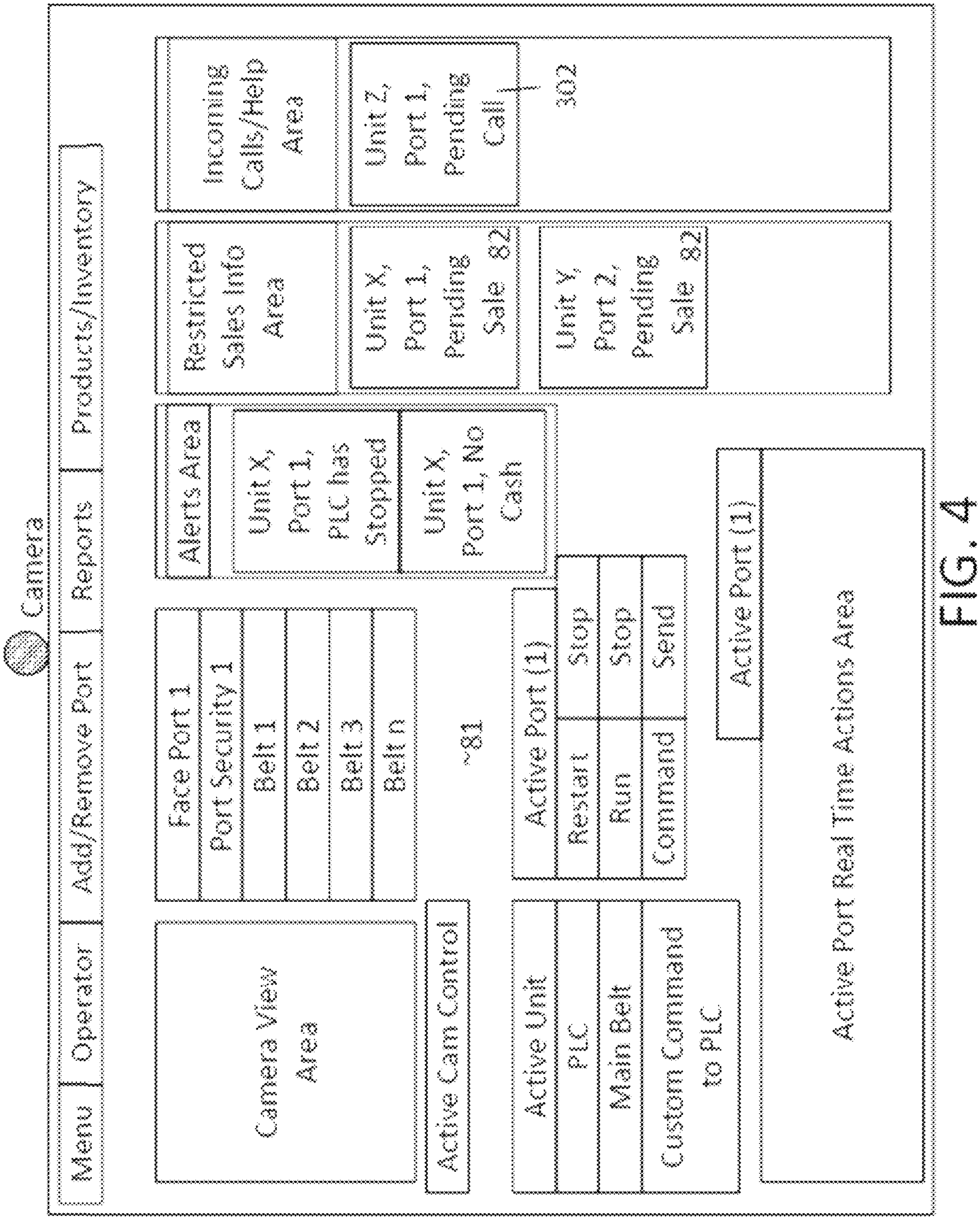
FIG. 4 is an illustration of a remote management interface of an exemplary embodiment of an automated retail facility of the present invention.

The cloud server 43 further comprises control modules for facility client 56 operations, supervisor client 58 operations, and administrative client 59 operations. Facility client 56 operations include, without limitation, the programmable logic controllers (PLC 51) that are in direct bidirectional communication with the local computer 41, which, in some embodiments, relays network communication messages to and from the PLC 51 and cloud server 43. Supervisor client 58 operations include, without limitation, remote manipulation of local facility components through the supervisor actors 48 (e.g., camera/video activation, printer restart, operate dispenser motor (via device actors 47) override or other commands of the connected devices 45 (via a PLC 51), etc.), validation of restricted product sales 82 via scanned government issued photo identification and/or video conference interaction with a customer, a "help" 83 procedure activated by customer, and others. Administrative client 59 operations include, without limitation, management of inventory data 60 stored in the database server 42 (preferably within a managed database 49), accounting management data 61 stored in the database server 42, update of product information 62 stored in the database server 42, run reports of error messages 63 stored in the database server 42, and others (see FIG. 4). The handheld inventory management device 84 (see also, FIG. 10A) and app 85 are capable of performing both supervisor client 58 operations and administrative client 59 operations based on user/operator credentials.

Under the primary (low) level are the underlying actor levels for the connected devices 45 and the computer-connected customer interactive devices (e.g., in modules 20 & 30). The device actors 47 control activation of and send operational reports for each computer-connected component such as most customer interactive devices of the unit 1, while a PLC 51 allows for direct network communication (albeit via the local computer 41 with internet access in some preferred embodiments) to components such as a dispensing unit/dispensing motor 108 and other connected devices 45, including the individual components of the product dispensing and delivery module 100. Thus, the normal operation of a rotary motor 108 for dispensing one or more of a stocked good 127 will receive its instructions from the PLC 51, which receives its activation instructions from the facility client 56 located at the higher, cloud server 43 level of the system. Before operation instructions are provided, the facility client 56 via the cloud server 43 will have confirmed with the database server 42 the location of the dispensing unit 108 for the selected product(s) 128 to be activated, as well as confirmed that the selected good(s) 128 is/are in sufficient quantity to satisfy or partially satisfy the requested purchase. Once the dispensing unit 108 has completed its operation, it will send a message indicating normal or error operation to the cloud server 43, which will in turn send the message up the system levels where it is recorded against stored inventory data 60 and/or error message data 63 in the database server 42. These messages from the connected devices 45, such as the dispensing unit 108, merely indicate normal operations or a failure (error) in operation (e.g., that the dispensing unit 108 rotary motor turned the appropriate amount or not. Sensors 145 (see above) located in the product dispensing area 179 and/or dispensing chute 140 may be used to confirm the dispensing of the selected product(s) 128 based on stored product information 62 in the database server 42.

When necessary, the dispensing units 108 and other connected devices 45 of the unit 1 can also be manipulated by the supervisor actors 48 (directly or indirectly), if error reports are generated or during physical inspection by an operator/inventory manager (a maintenance/troubleshooting operation and supervisor manipulation, with proper credentials of the operator, may conveniently be performed via a handheld inventory management device 84 through a remote network connection with the cloud server 43 and supervisor client 58). For example, a dispensing unit 108 will report any malfunction to the PLC 51, which may be at the local computer 41, and which will then relay the message up a level to the facility client 56 at the cloud server 43 level, which will then send the error information 63 to the database server 42 and the supervisor client 58. The PLC 51 will automatically instruct the appropriate connected device 45 to attempt dispensing the selected good 128 once again if an error occurred. The database server 42 will send a message to the administrative client 59 and/or supervisor client 58 (including display on appropriate administrative interface(s) 81 and/or supervisor interface(s) 71) for continued monitoring and/or noting the error. If an error persists, note is again made (stored) in the database server 42, and instructions are sent from the facility client 56 via the cloud server 43 for the PLC 51 to activate a second or subsequent dispensing unit 108 that contains the selected product 122 (in some circumstances, the same goods 123 may be stocked in inventory 120 in more than one product lane 106 with its own dispensing unit 108, which will be known to the automated vending facility system 10 via inventory data 60 stored on the database server 42). This operation will go through the same automatic restart and error recording/display process for the first dispensing unit 108. If additional/subsequent dispensing units 108 for the selected product 128 are available, they will likewise be activated in turn. In the unlikely event that a selected product 128 cannot be dispensed after a second or subsequent appropriate connected device 45 activation, the customer will be notified that the product is not available, which will also start a refunding process 74 (discussed in further detail below). It is important to note that the customer will not be notified of an error unless the selected product 128 is completely unavailable; otherwise, the customer will be none the wiser of any error in dispensing.

The supervisor client 58 can also be used to attempt a manual restart of the dispensing unit 108, but in most cases that will not be necessary due to the automated restart and reassignment of dispensing units 108 that occur at the lower level PLC 51 in communication with the facility client 56, as described above. As noted above, error messages 63 are received and stored in the appropriate databases 49 at the database server 42 as well as notifying the operator client 57. The operator client 57 includes the supervisor client 58 operations and the administrative client 59 operations. The supervisor client 58 operations can remotely shut down a faulty dispensing unit 108; however, the system 10 may be configured to automatically shut down a faulty dispensing unit 108 and send an error report 63 to the cloud server 43 to be processed, sent to appropriate monitoring clients (58 and/or 59), and then stored database server 42 for the faulty dispensing unit 108 to be inspected, replaced, and/or repaired at the next site visit by an inventory manager. If a selected product 128 cannot be dispensed from any dispensing unit 108, the customer will be alerted by a Dispensing Error Screen 235 (FIG. 3P), and, if necessary, will receive a refund and notification on a receipt.

For a payment transaction, the customer is alerted on the interactive screen 21 of the customer interface 20 as another single page app to select a method of payment via communication from the local computer 41. It should be noted that the information comprising what form of payment is acceptable or available at the port 17 is stored in the database server 42 and relayed to the cloud server 43 where the client 56 generates an appropriate single page app and transmits it to the local computer 41 for display. Without limitation, acceptable methods of payment are any known in the retail field, including, but not limited to, cash, credit/debit card, associated store credit card, customer account tab/balance, vouchers, customer loyalty program credits, contactless payment devices (such as RFID, NFC, mobile payment/digital wallet services, etc.), or other known methods of physical or electronic payment. The payment gateway 75 is then activated by a device actor 47 via instructions from the client 56 based on the selected payment method. Once payment is received, the selected payment actor (32, 33, 34) of the payment module 30 will report back to the local computer 41 of a message for a successful payment step or any errors during the process. The local computer 41 relays this received information to the client 56 at the cloud server 43, which also sends the information for storage at the database server 42. For payments requiring access to the remote network (for example, credit/debit card payments), the local computer 41 will send gathered card information (and input PIN, if required) and the connection request through the client 56 at the cloud server 43 where a secure connection is made thorough a payment gateway 75 to the appropriate credit card association 76 and/or issuing bank 77. The payment gateway 75 will send back the transaction approval, decline, and/or processing error(s) to the client 56 at the cloud server 43, which relays the information back to the local computer 41 and appropriate device actor 47. See below for exemplary processes for different payment and refund methods. If payment was accepted, the local computer 41 also receives the higher level instructions to begin dispensing. The client 56 PLC(s) 51 will activate the appropriate connected devices 45 for the purchased goods 128, which activates the appropriate dispensing units 108 (see above). As with all other information generated by each component of the system 10, payment success or error messages (and the details of the same) are reported to the database server 42 through the local computer 41 and the cloud server 43.

Figure 3A:
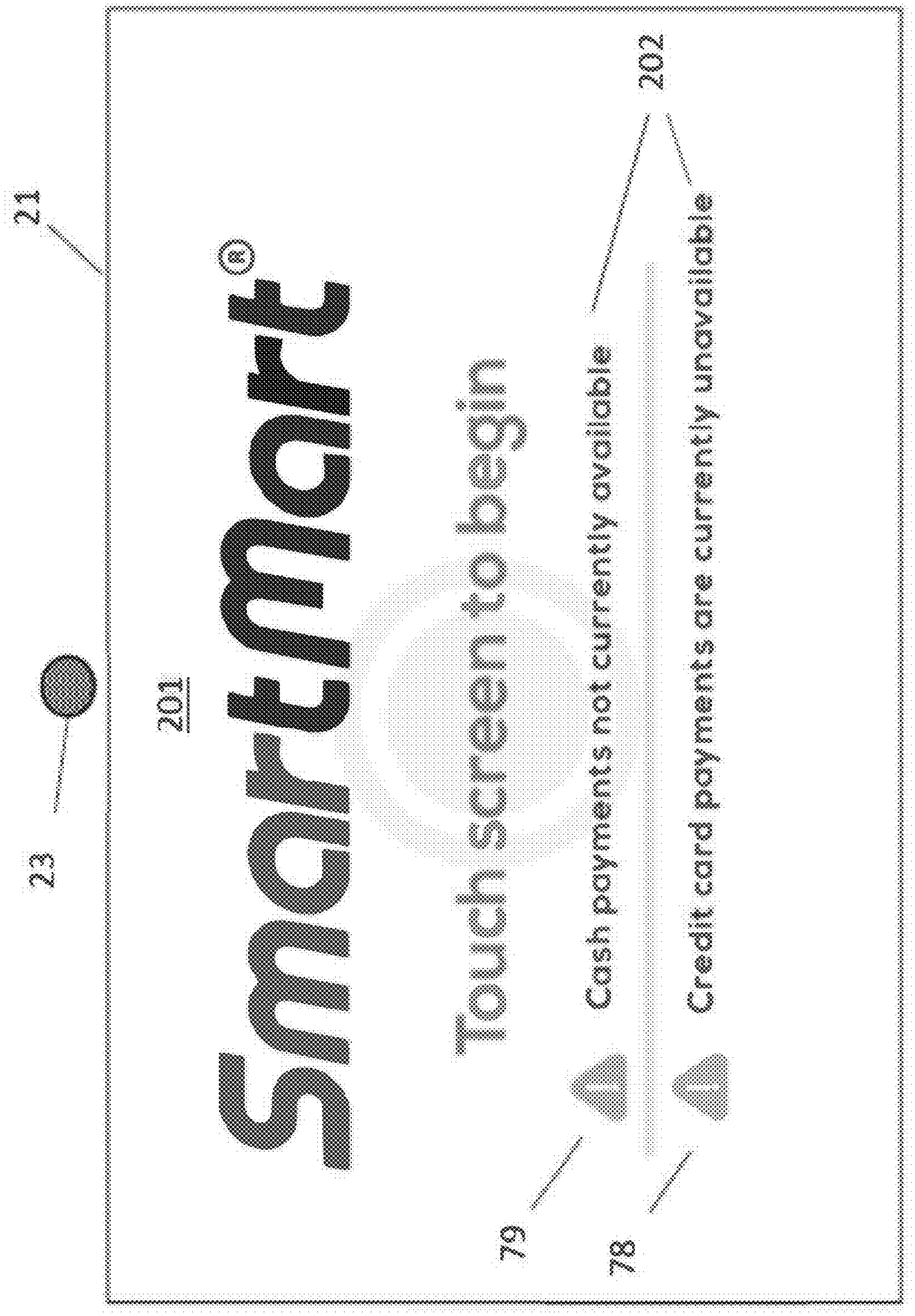
FIGS. 3A-3U are illustrations of a user interface of an exemplary embodiment of an automated retail facility.
Figure 3B:
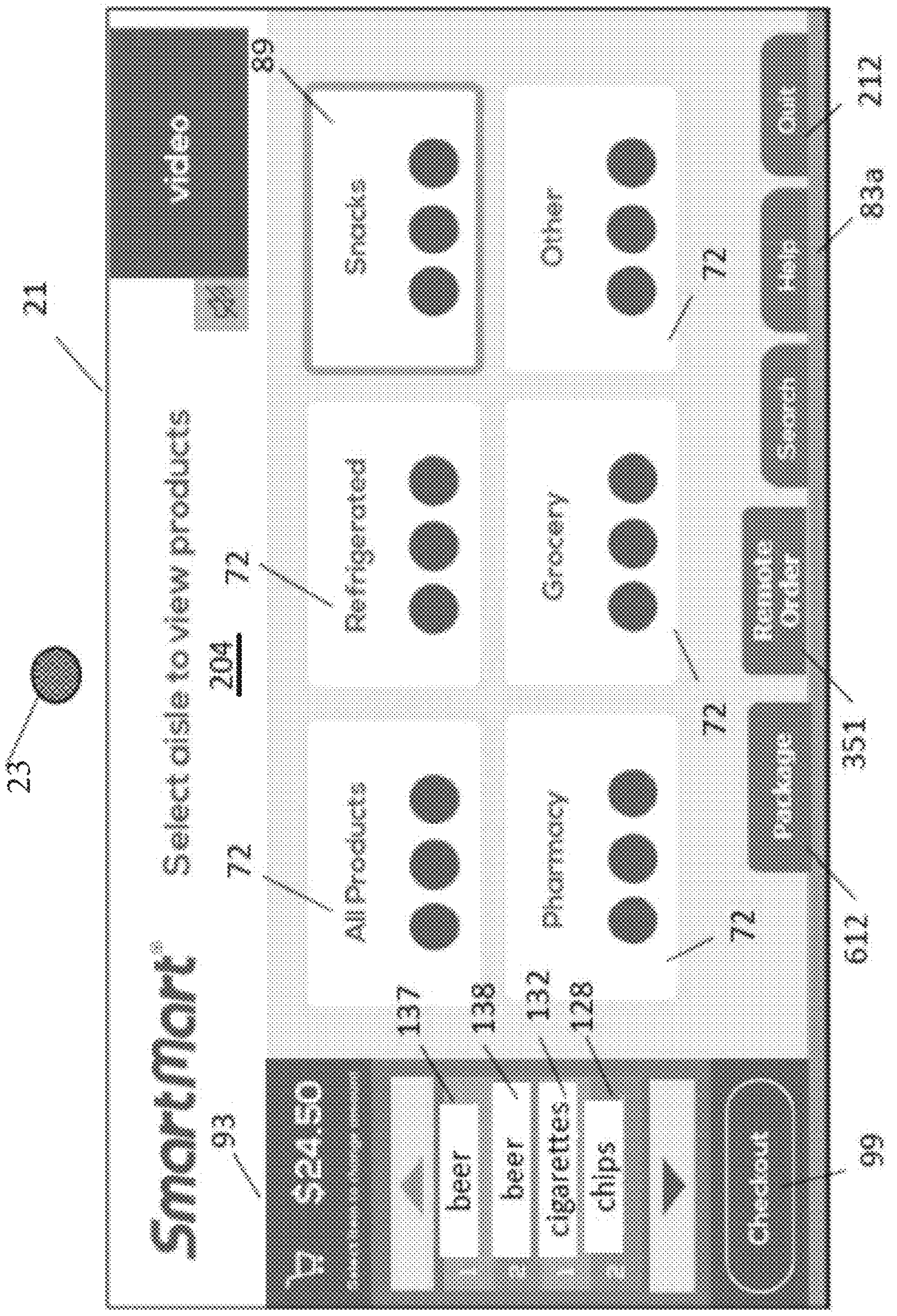
Figure 5A:
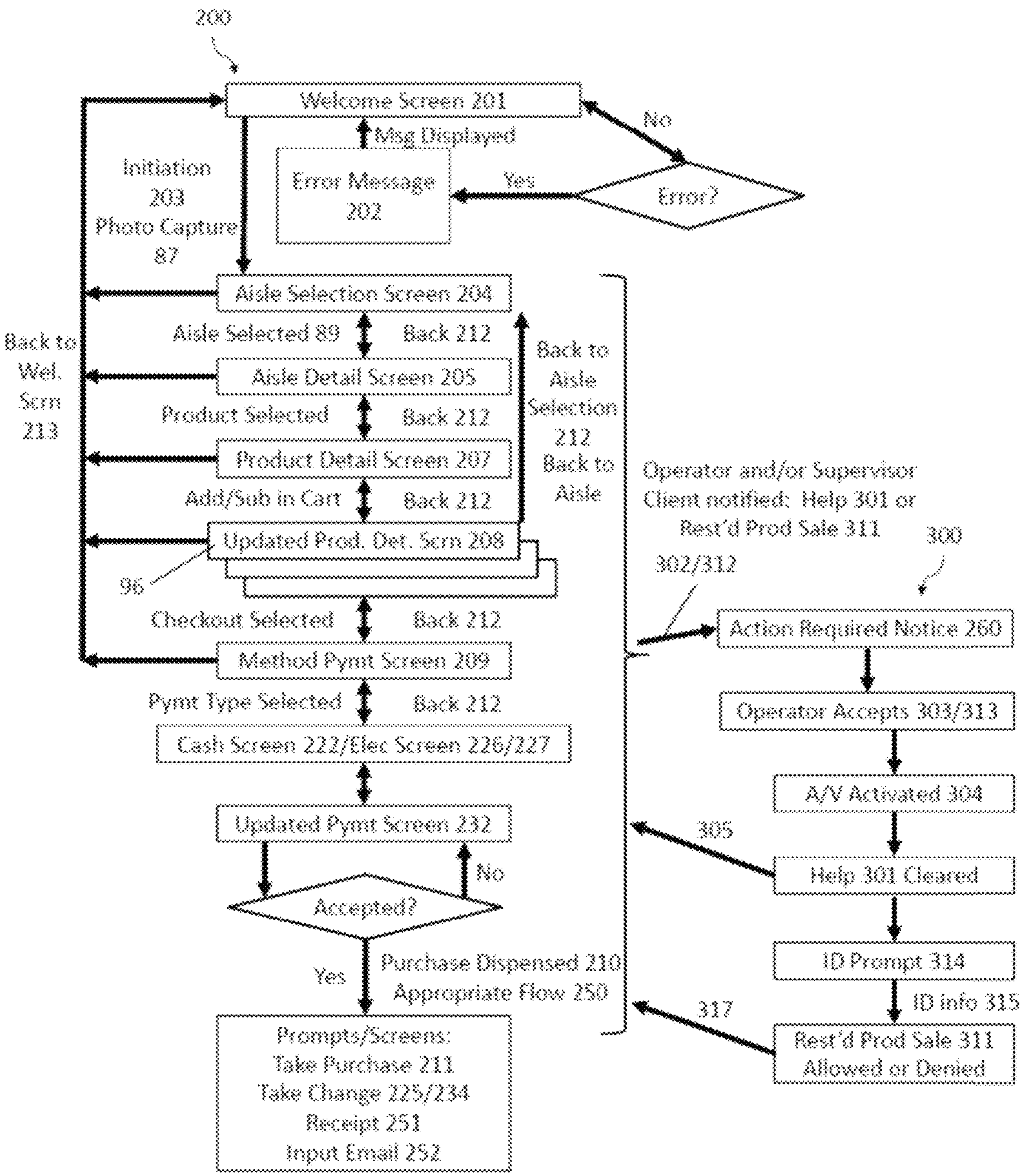
FIG. 5A is a flow chart depicting the operation of an exemplary embodiment of an automated retail facility of the present invention.

Now referring to FIG. 5A, it can be appreciated that an in-person operation 200 of the automated retail facility unit 1 with remote management and manipulation provides a seamless transaction for a customer that is complete with customer service as needed. It should be understood that the following discussion is only one embodiment of the operational method and interaction of the unit 1 and system 10 with a customer. The in-person operation 200 process begins at the Welcome Screen 201 displayed on the touchscreen device 21 of the customer interface module 20 (FIG. 3A). Each "screen" or "page" displayed to or seen by a customer at the customer interface module 20 is a single page app generated by the client 56 based on information available to the client 56 that is stored at the database server 42. For example, if one or more device actors 47 that have general relevance to any transaction are reporting errors (such as printer 28 inoperable 78 or cash machine module 32 inoperable 79), the Welcome Screen 201 will provide notice 202 of these errors on the touchscreen device 21 (FIG. 3A) before a transaction process is initiated by the customer. At initiation 203, which may be activated by a touch of the touchscreen 21 by a customer or the scanning of a customer loyalty card or equivalent action, the system 10 directs the user interface module 20 via one or more device actor(s) 47 to capture a digital photograph 87 of the customer by one or more of the onboard cameras 23, which is sent via the local computer 41 to the client 56 and stored at the database server 42. Initiation 203 causes the customer interface to display the Display Aisle Selection Screen 204 on the touchscreen device 21 (FIG. 3B). The Display Aisle Selection Screen 204 is generated by the client 56 based on information of available inventory 120 stored at the database server 42 and sent to the local computer 41 for display to the customer.

Figure 3C:
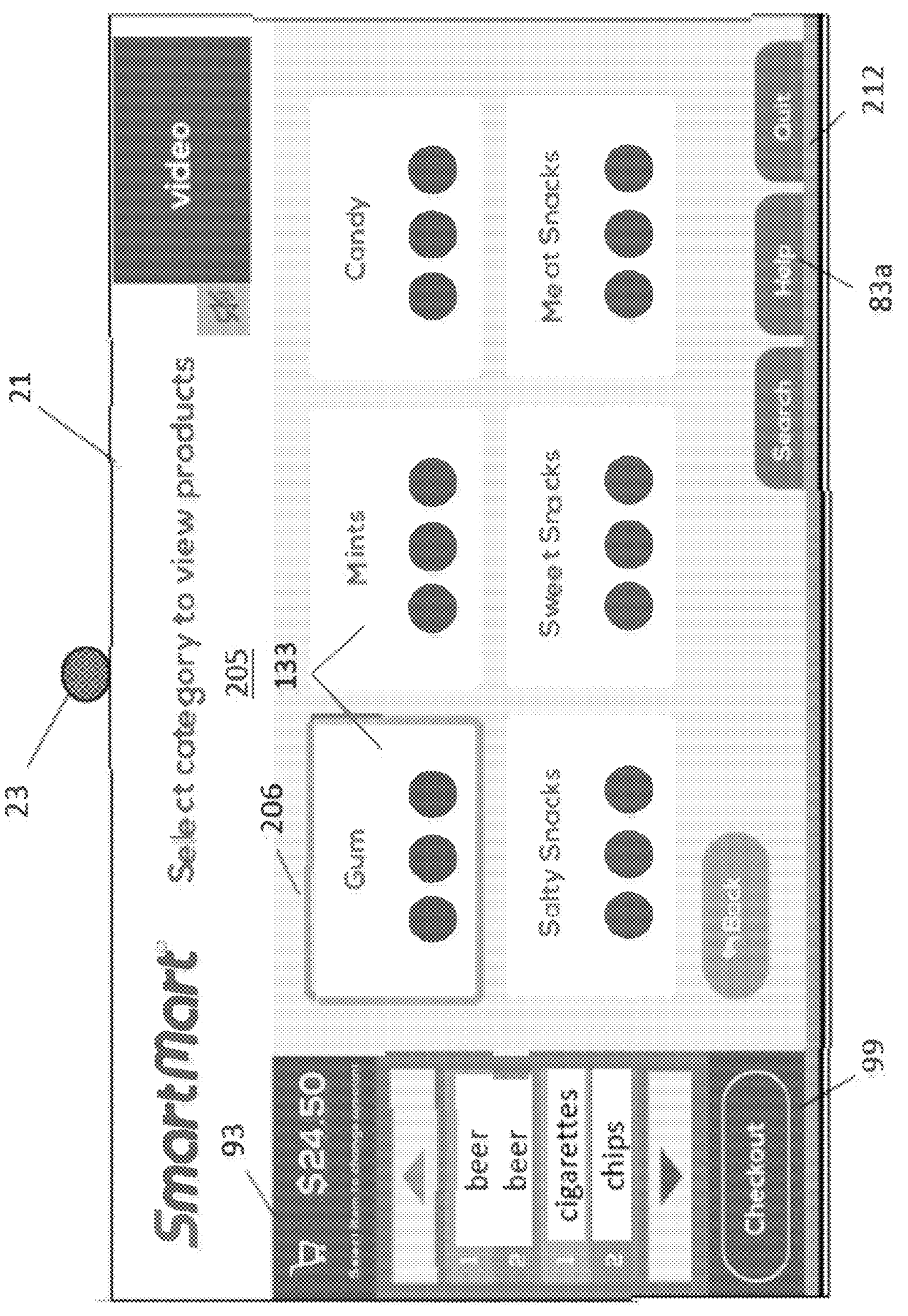
Figure 3D:
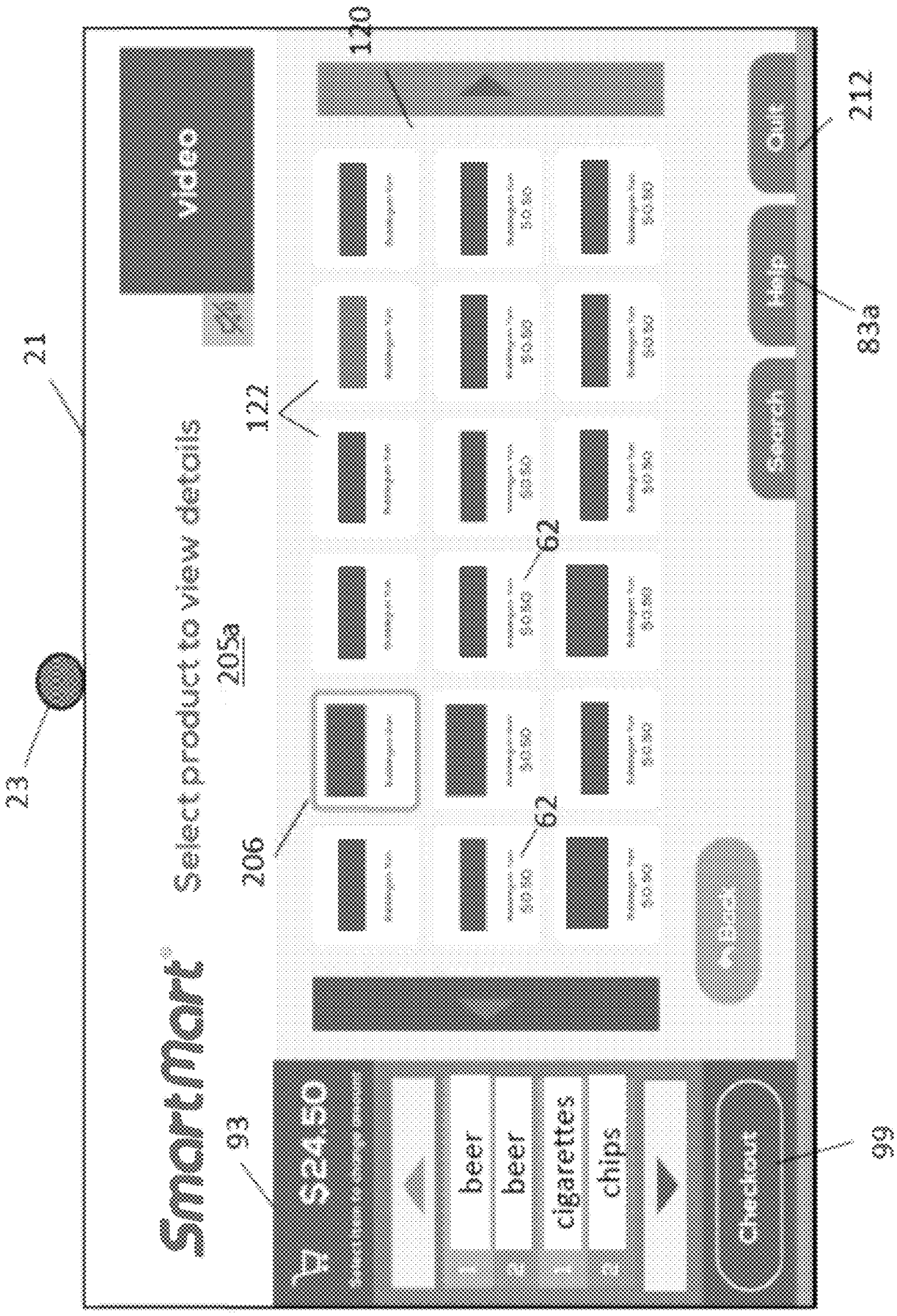
Figure 3E:
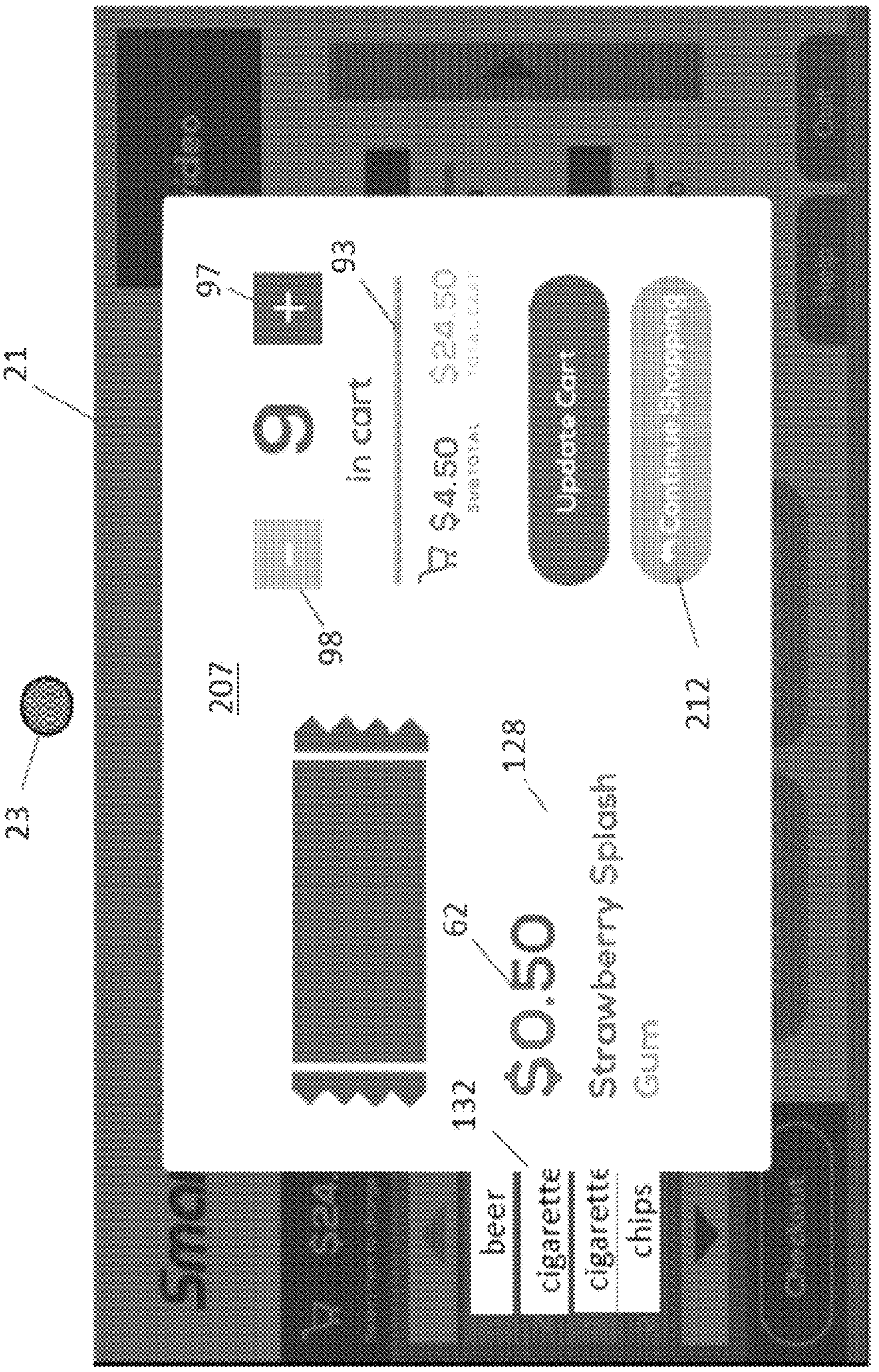

The customer is prompted on the Display Aisle Selection Screen 204 to select an aisle 72. Once an aisle is selected 89, the system 10 generates at the client 56 an appropriate single page app based on information of available inventory 120 for the aisle chosen by the customer, which is stored at the database server 42. This single page app is sent to the local computer 41 for display on the touchscreen device 21 as the Aisle Detail Screen 205 (FIG. 3C). Optionally, a supplemental Aisle Detail Screen 205*a* (FIG. 3D) may be populated with all products 122 of a particular type (such as "gum" selected from within a "snacks" aisle). Once the Aisle Detail Screen 205 is displayed, the customer may select an individual displayed product button 206 to prompt the system 10 to display on the touchscreen device 21 a Product Detail Screen 207 for that selected product (FIG. 3E). As each screen/page before, the information of the selection input is sent via the local computer 41 to the client 56 at the cloud server 43 level, where an appropriate single page app is generated, in this case as the Product Detail Screen 207 for the chosen product 128. The Product Detail Screen 207 will display information 62 about the selected product 128 provided by the database server 42 and stored thereon. Such displayed information 62 on the Product Detail Screen 207 may include a photograph or other representation of the selected product 128, the price per unit information, the product's label, the quantity available for purchase at the facility unit, the expiration information, a discount, a customer loyalty discount, a targeted marketing message for a competing product and/or based on past purchasing history of the customer, or other information. It should be appreciated that the amount of information 62 displayed on the Product Detail Screen 207 is controlled by a supervisor operator 58 of the system 10, which may also be based on programmed trigger events stored in the database server 42, such as selection of a particular product, manufacturers' specials, nutritional information, past purchasing behavior, and other criteria well-known in the retail field.

Figure 3F:
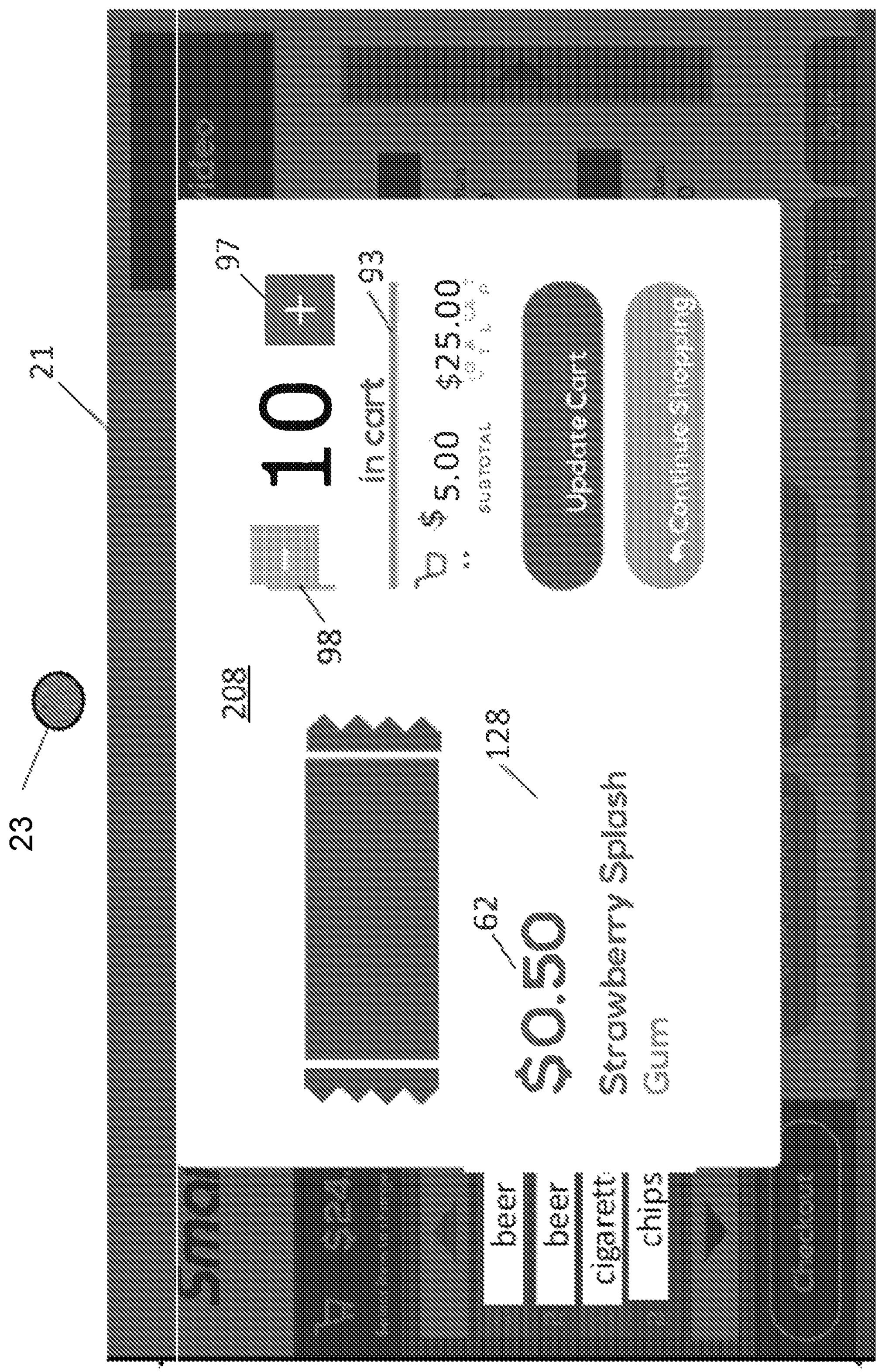

The Product Detail Screen 207 also provides a customer with the prompt/opportunity to add the selected product 128 to the customer's virtual cart 93. If a product 122 is then added to the customer's virtual cart 93 by providing the appropriate input from the customer, the system 10 generates at the client 56 an appropriate single page app showing that the selected product 128 has been added to the customer's virtual cart 93. The "updated" Product Detail Screen 208 is (see FIG. 3F) then sent to the local computer 41 for display via the customer interface module 20. The inventory data 60 for the selected product 128 is updated in the database server 42 to note the pending sale of one of the selected product 128 at the automated retail facility unit 1. This pending sale data 95 may be used to prevent another port 17 at the automated retail facility unit 1 from dispensing the selected product 128 without conserving at least the number required to satisfy the pending sale 96. The customer may then continue to add 97 or subtract 98 the selected product 128 from the customer's virtual cart 93 by an appropriate input received from the customer on the touchscreen 21. Each such input information will be sent to the client 56 (and database server 42) for generating appropriate "updated" Product Detail Screens 208 based on the input and the data available at the database server 42 for the selected product 128, which are then instantly sent back to the local computer 41 for display via the customer interface module 20 showing the revised quantity of selected product 128.

Figure 3G:
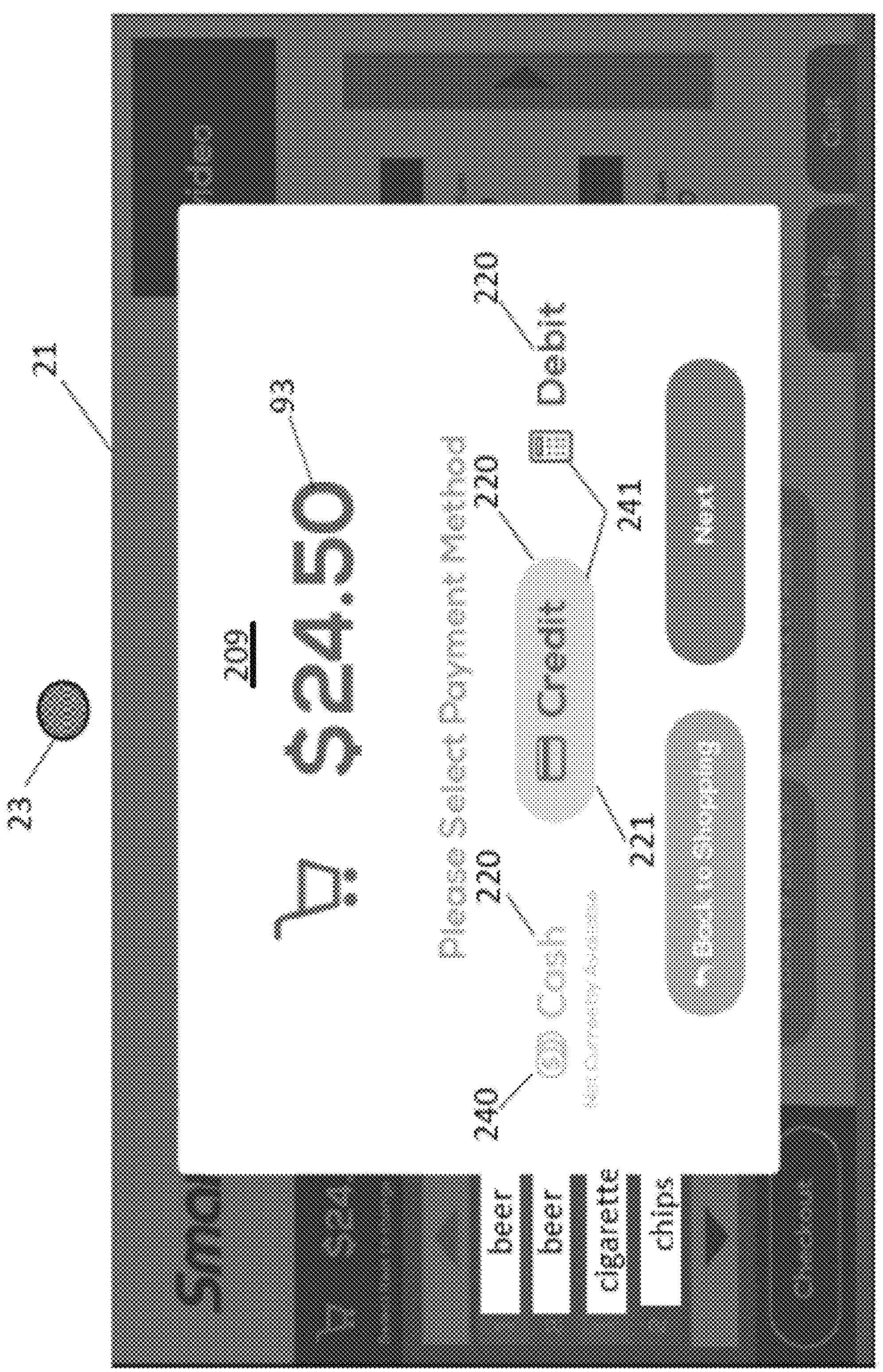

If a customer's virtual cart 93 includes at least one product 122, the updated Product Detail Screen 208 (which may go through many iterations) also provides a customer with the prompt/opportunity to checkout and complete the transaction. If the touchscreen 21 receives from the customer an input for checkout 99, the input information is sent via the local computer 41 to the client 56, which then contacts the database server 42 for generating 145 a single page app for a Method of Payment Screen 209 that is then sent to the local computer 41 for display via the customer interface module 20 (FIG. 3G). Based on the information stored on the database server 42 for which methods of payment 220 are available to the customer at the port 17 in use by the customer (if one of the payment method devices is not working the option will be disabled or if cash/change is low this option will be disabled), the Method of Payment Screen 209 (see FIG. 3G) will display the appropriate information to the customer. At this point the customer may select the desired method of payment 220, and the selection input is then relayed via the local computer 41 to the client 56, which then contacts the database server 42, and a single page app for the selected form of payment 221 is generated by the client 56.

Figure 3H:
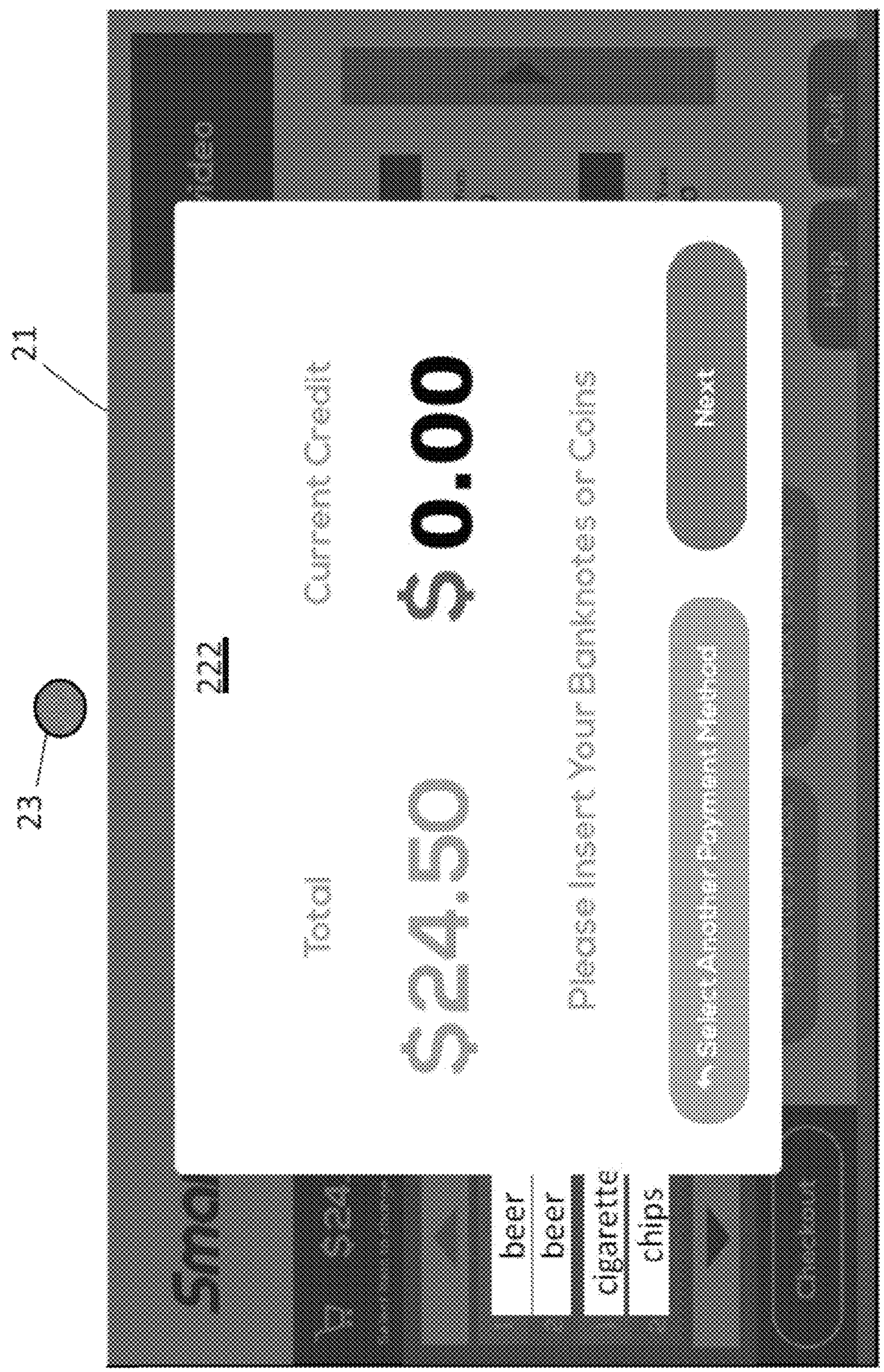
Figure 3I:
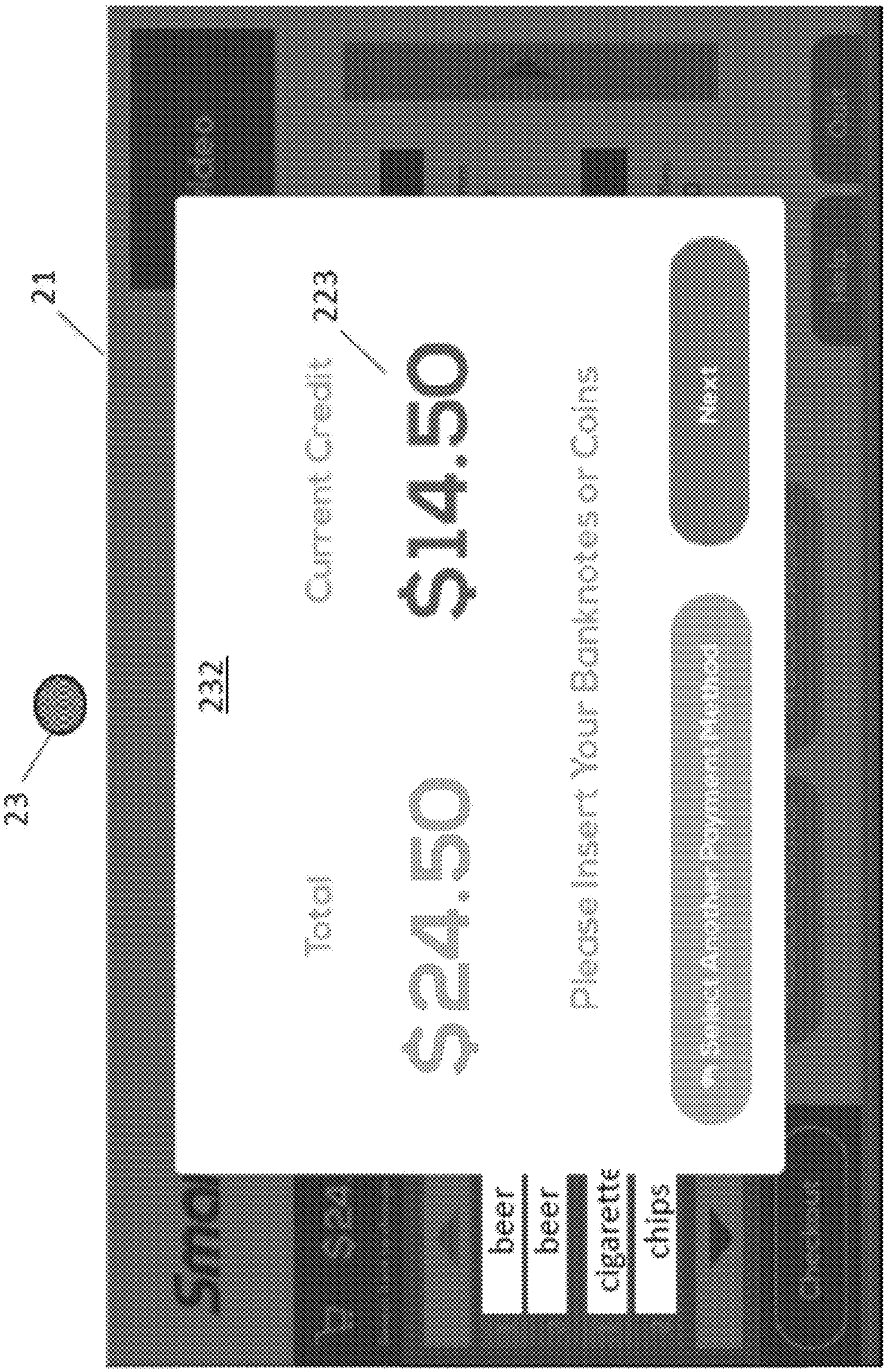
Figure 3J:
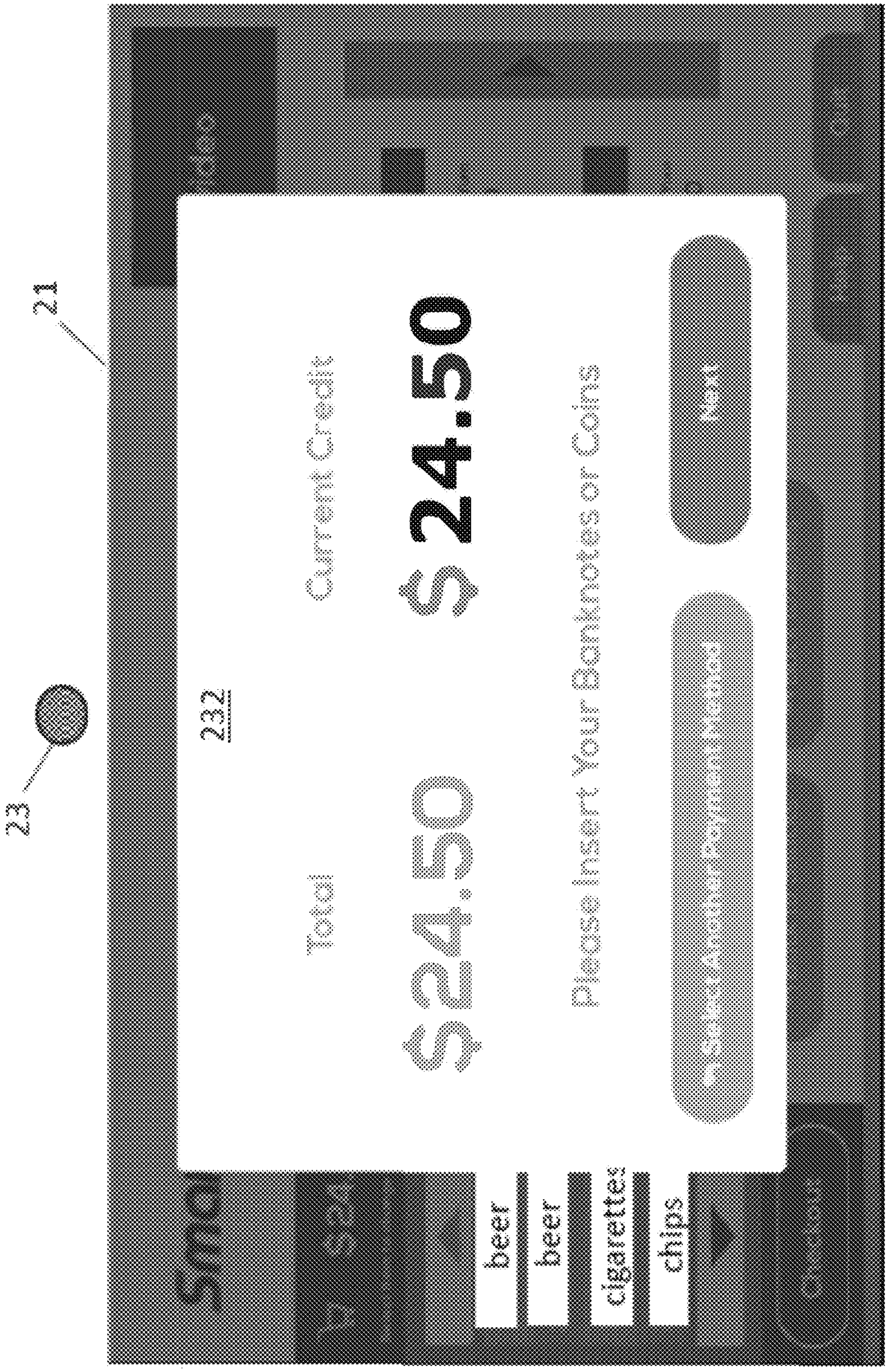
Figure 3K:
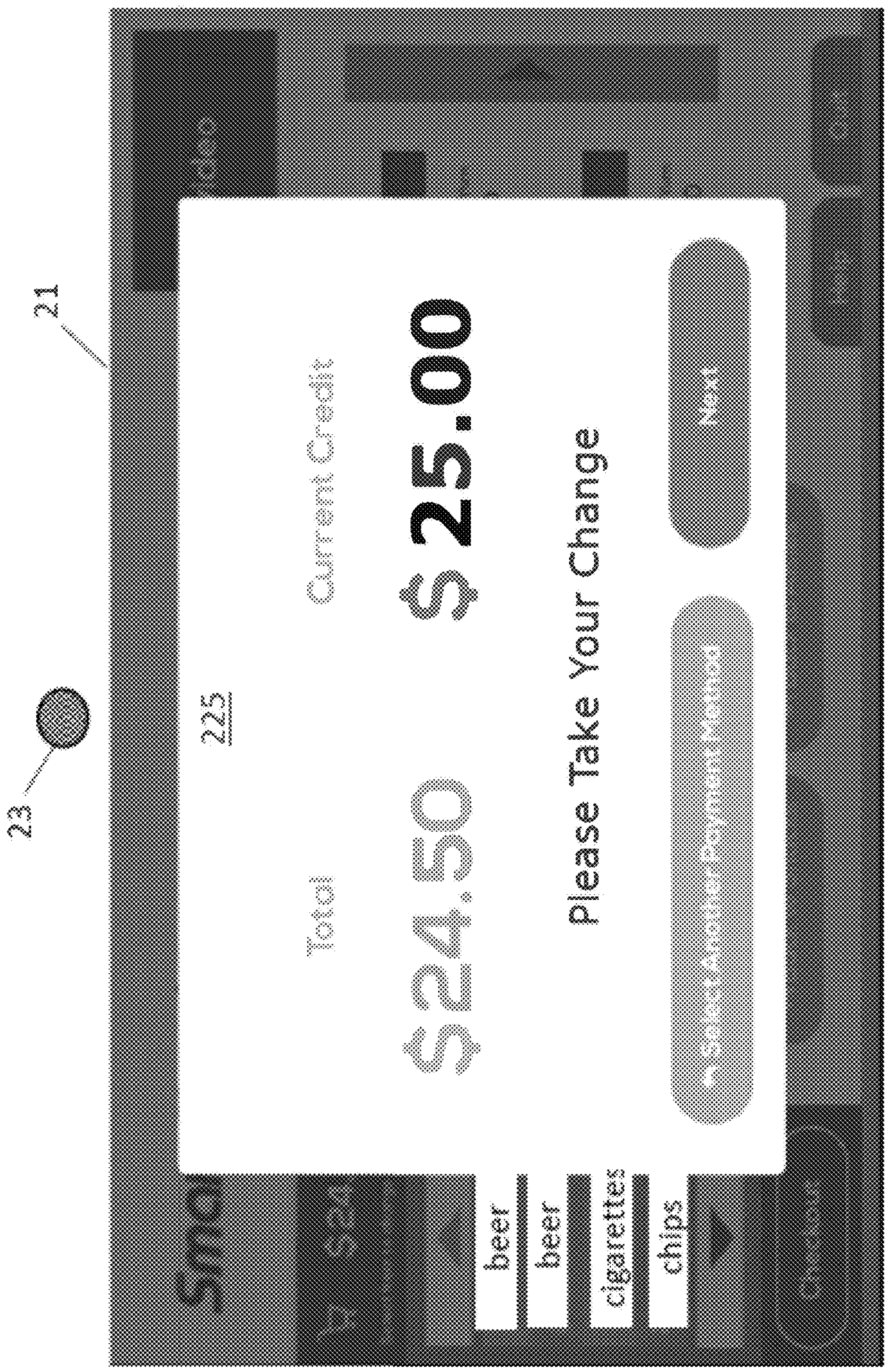

If the input for a cash payment is received by the system 10, the client 56 generates a Cash Payment Screen 222 (FIG. 3H) providing the total sales amount and instructions/prompts for the customer to insert cash into the cash machine 32. The client 56 also activates the device actor 47 for the cash machine 32 (which is in bidirectional communication with the cloud server 43 via a direct communication with the local computer 41) with instructions to accept cash (either or both coins and banknote currency) until at least the total sales amount is reached. The cash machine 32 provides messages to the device actor 47 at the local computer 41 for every coin and banknote currency inserted and received. Preferably, the cash machine 32 can detect valid coin and banknote currency, as well as sort and separately store the same based on denomination. The local computer 41 sends the cash received message 223 from the cash machine 32 to the client 56, which also relays this information to the database server 42. The client 56 generates an "updated" Cash Payment Screen 232 (FIG. 3I) based on the information received for each cash received message 223 stating the outstanding amount still needed to be received, if any, by the cash machine 32. Once the total sales amount is achieved or exceeded, the cash machine 32 will receive instructions from the client 56 via its appropriate device actor 47 to halt receiving further coin and banknote currency. The final updated Cash Payment Screen 232 (FIG. 3J) will indicate the amount inserted and if any change is owed based on inserting more cash than the total sales amount. The client 56 will also send instruction message(s) to the appropriate connected device(s) 45 via a PLC 51 to activate the dispensing units 108 to begin dispensing the purchased product(s) 128. If change is owed after the dispensing step (the client 56 will communicate with the database server 42 and know if more money than the total sales price was received by the cash machine 32), the client 56 will send instructions to the device actor 47 for the cash machine 32 to issue the amount owed to the customer. The client 56 generates a Please Take Your Change Screen 225 (FIG. 3K) based on the information received and stored for cash received by the cash machine 32. A process that is essentially the reverse of cash reception begins in which cash refunded messages 74 are sent by the cash machine 32 to the higher level actors and "updated" Please Take Your Change Screen(s) are displayed to the customer at the customer interface module 20 for each coin or banknote currency dispensed.

Figure 3L:
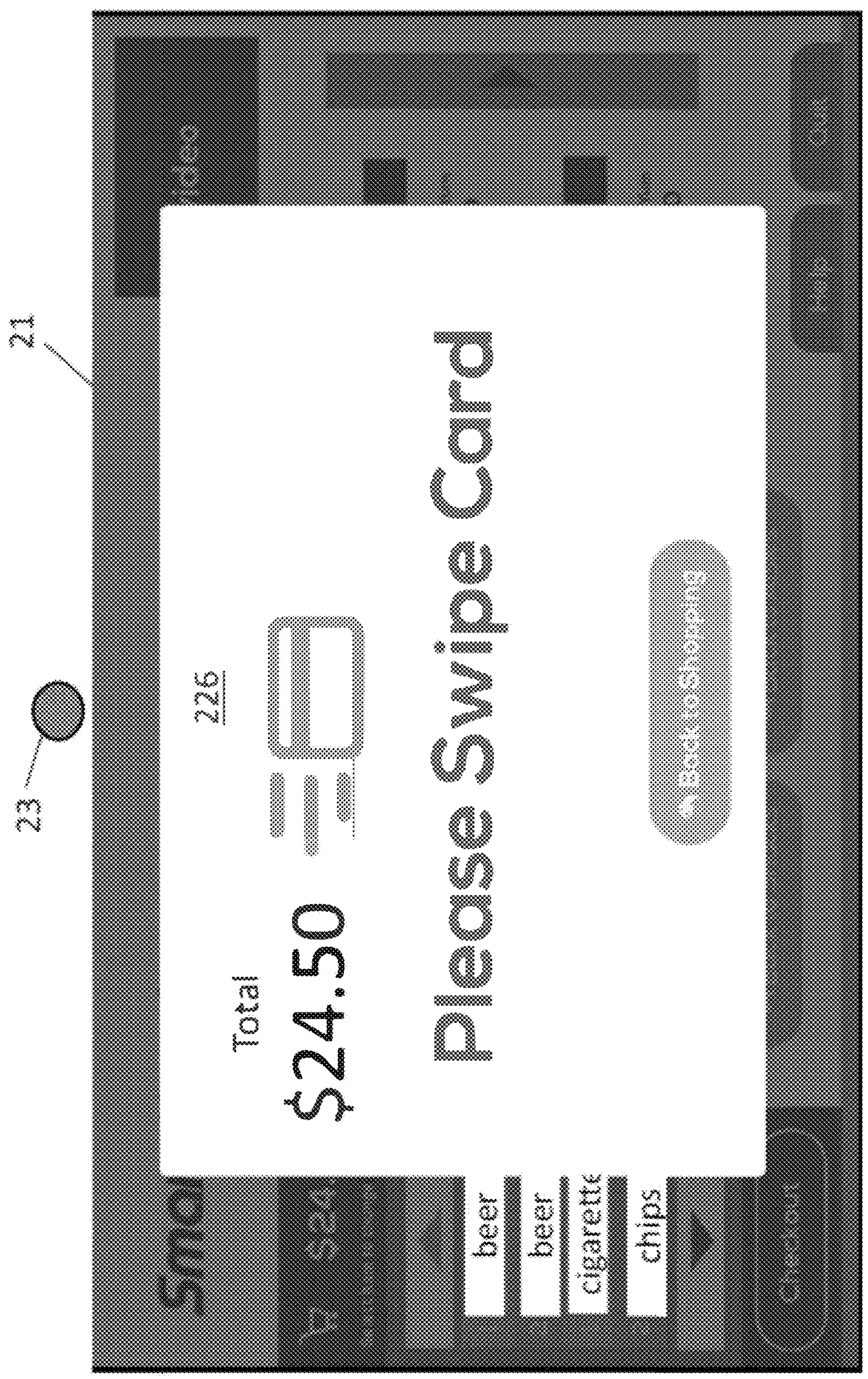
Figure 3M:
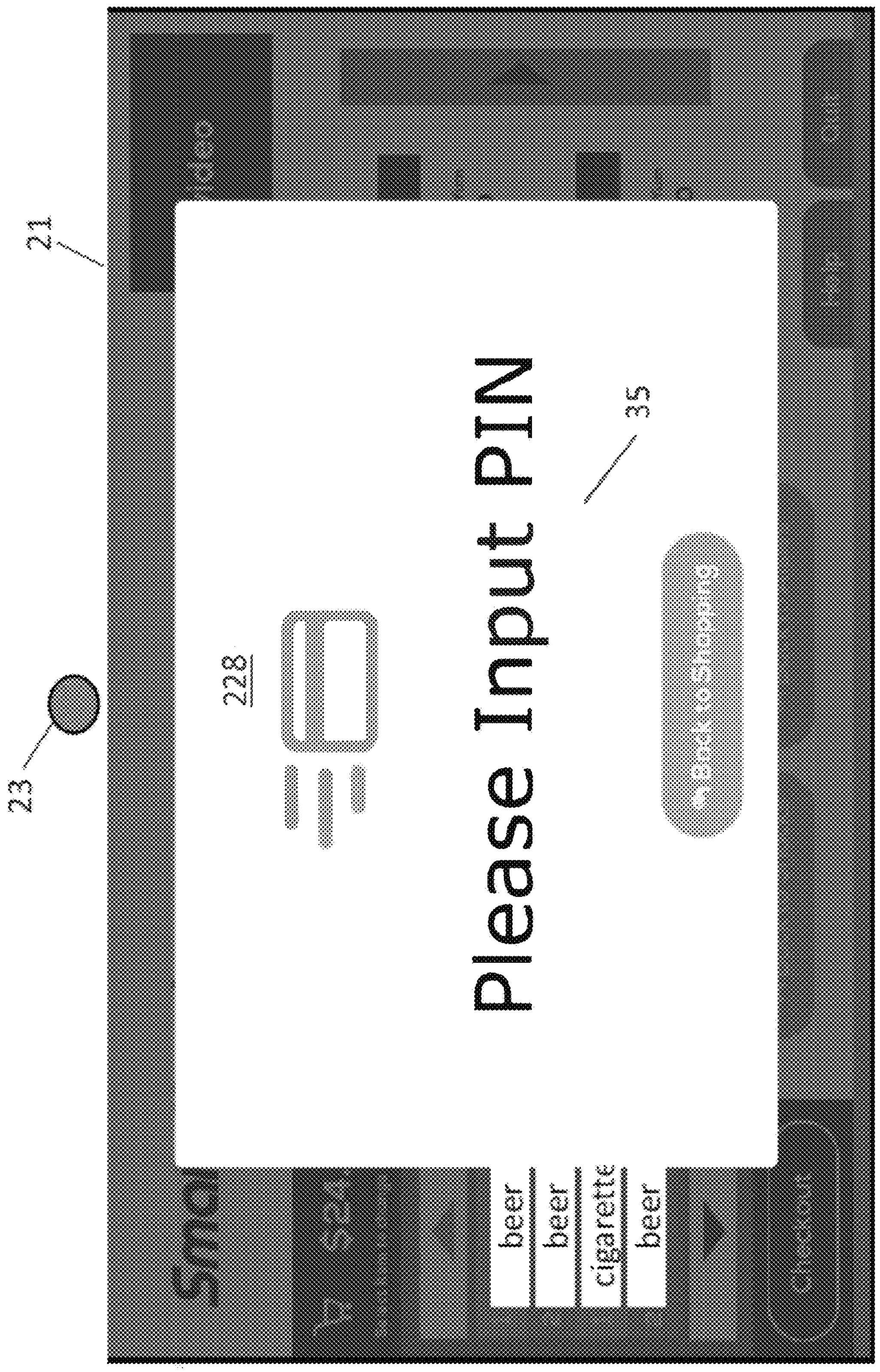

If the input for an electronic payment (including, but not limited to credit/debit card, associated store credit card, customer account tab/balance, vouchers with a readable code or identifying number, customer loyalty program credits, and contactless payment devices (such as RFID, NFC, mobile payment/digital wallet services, etc.)) is received by the system 10, the client 56 generates an appropriate Electronic Payment Screen 226 (FIG. 3L) providing the total sales amount and instructions/prompts for the customer to begin the chosen electronic payment process. For any available method of electronic payment selected by the customer, the client 56 will receive the input selection from the local computer 41 and send the information to the database server 42 for storage. For a credit card payment, debit card payment, or other form of payment requiring a magnetic strip or chip-in-card reader, the client 56 activates the device actor 47 at the local computer 41 for the appropriate card reader device 33 and numeric pad 35, as needed, at the automated payment module 30. For a contactless payment device form of payment, the client 56 activates the device actor 47 at the local computer 41 for the appropriate contactless payment device reader 34 and numeric pad 35, as needed, at the automated payment module 30. For a form of electronic payment that requires an optical reader 36 for a barcode, a matrix/two-dimensional barcode, or other machine-readable optical marking (e.g., customer loyalty account/voucher with a unique bar code or QR CODE®), the client 56 activates the device actor 47 at the local computer 41 for the appropriate optical reader 36 and numeric pad 35, as needed, at the automated payment module 30. In some embodiments, the ID scanner 29 included in the customer interface module 20 will perform the functions of the optical reader 36. For a form of electronic payment that requires direct input of customer account/serial numbers, user names, and/or alphanumeric passwords (e.g., customer loyalty account balances, account tabs, certain vouchers, or coupons), the client 56 generates an appropriate single page app that provides a keyboard for such input on the touchscreen 21. Alternatively, the client 56 may activate the device actor 47 at the local computer 41 for an optional keyboard hardware 25 as a component device of the customer interface module 20. When appropriate for any of the electronic methods of payment, entry of a PIN, billing address zip code, or other validation information/numeric code may be input by the customer at the activated numeric pad 35, or on the touchscreen 21 or the optional keyboard hardware 25. Instructions for such required validation information from a customer will be displayed on an "updated" Electronic Payment Screen 228 (FIG. 3M) generated by the client 56 based on information received and processed by the system 10. If an electronic signature is needed, preferably the touchscreen 21 can accept a signature of the customer on an updated Electronic Payment Screen 228 generated by the client 56 based on information received and processed by the system 10. If necessary, an optional electronic signature pad hardware 38 may be installed with the automated payment module 30, and it will be activated by a device actor 47, as needed.

The validation process for a credit card/debit card payment will be discussed in detail, but it should be understood that the other forms of electronic payment discussed above may have the same, similar, or different validation steps, and all of which is within the scope of the disclosed invention. As mentioned above for a credit card/debit card form of electronic payment, the client 56 activates the device actor 47 at the local computer 41 for the appropriate card reader device 33 and numeric pad 35, as needed, at the automated payment module 30. An Electronic Payment Screen 227 generated by the client 56 provides prompts/instructions to the customer to insert a card into a card reader 33 (e.g., magnetic strip reader or chip-in-card/EMV reader). If a validation number 35*a* is required (e.g., PIN, zip code of billing address, etc.), the prompts/instructions may appear on the card reader 33 at the automated payment module 30. Preferably, the card reader 33 sends a request to the system 10 (via the local computer 41 to the client 56) to generate a single page app with the prompts/instructions on the customer interface module 20. The card reader 33 is in direct communication with the local computer 41 via a device actor 47 and, once the card information 33*a* and any validation number 35*a* is received by card reader 33, card reader 33 sends the card information 33*a* to the local computer 41 in an encrypted form. The local computer 41 in turn sends the encrypted card information 33*a* to the cloud server 43 level, which will send the secured message 230 to the payment processor (payment gateway) 75 for contacting the merchant payment authority 76 for the card. The payment gateway 75 will communicate securely with the merchant payment authority 76 (such as a credit card association 76*a*), which will communicate with the issuing bank or other financial institution 77 for the card. The payment gateway 75 sends back the information message 231 from the merchant payment authority 76 to the cloud server 43 level for a successful payment acceptance or any error that has occurred. At each step, as appropriate, the client 56 will generate an "updated" Electronic Payment Screen 228 (FIG. 3M) for display at the customer interface module 20 (such as Enter the PIN code, Incorrect PIN, PIN accepted, Enter Zip Code, Transaction Error, Transaction Approved, etc.). It should be noted that the above discussion is but one exemplary embodiment of the credit card/debit card payment, and others, such as the local computer communicating directly with the payment gateway 75, exist within the scope of the present invention.

The client 56 will then send instruction message(s) to the appropriate PLC 51 connected device(s) 45 to activate the dispensing units 108 to begin dispensing the purchased product(s) 128. If change is owed after the dispensing step (the client 56 will communicate with the database server 42 and know if more money than the total sales price was received, such as a debit card cash back transaction), the client 56 will send instructions to the device actor 47 for the cash machine 32 to issue the amount owed to the customer. The client 56 also generates a Please Take Your Change Screen 225 (FIG. 3K) based on the information received and stored for the transaction and any change provided.

If a refund is owed after the dispensing step due to an error in dispensing that cannot be corrected by the system 10 (discussed above), either cash change can be remitted for a cash form of payment 240 or a message can be securely communicated through the payment gateway 75 to the appropriate merchant payment authority 76 for the electronic form of payment 241 that a certain amount is being refunded.

Figure 3N:
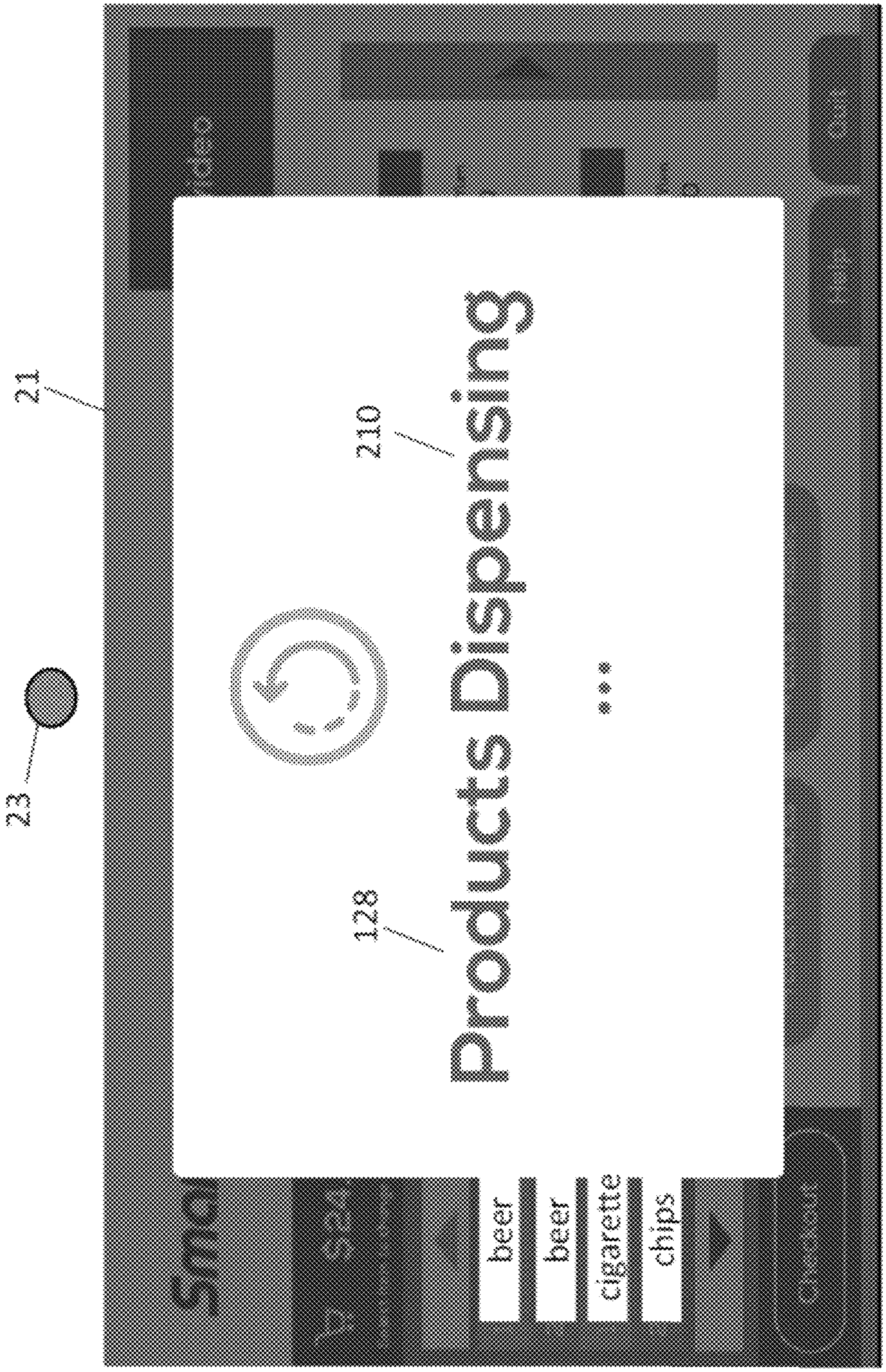
Figure 30:
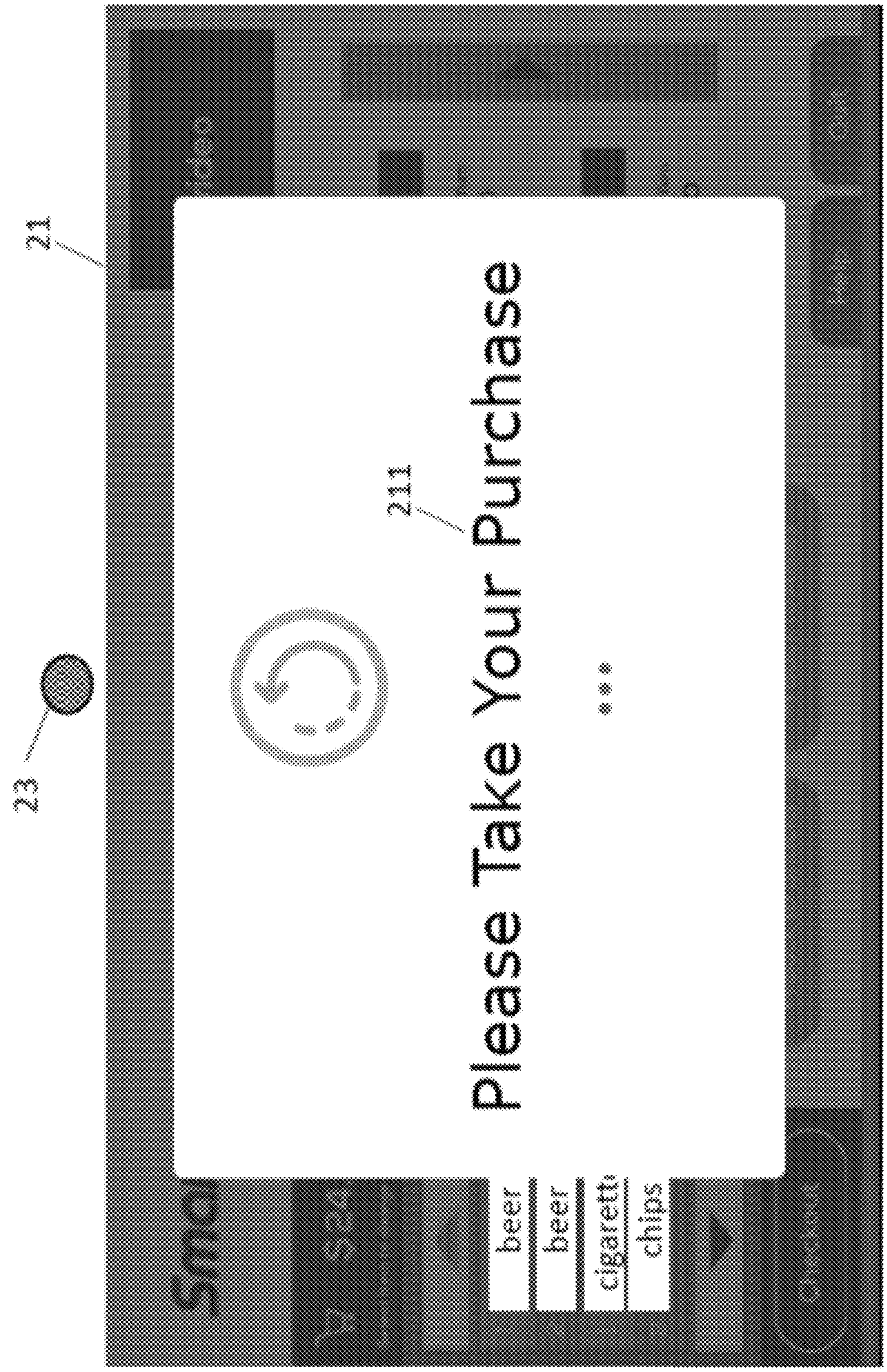
Figure 3P:
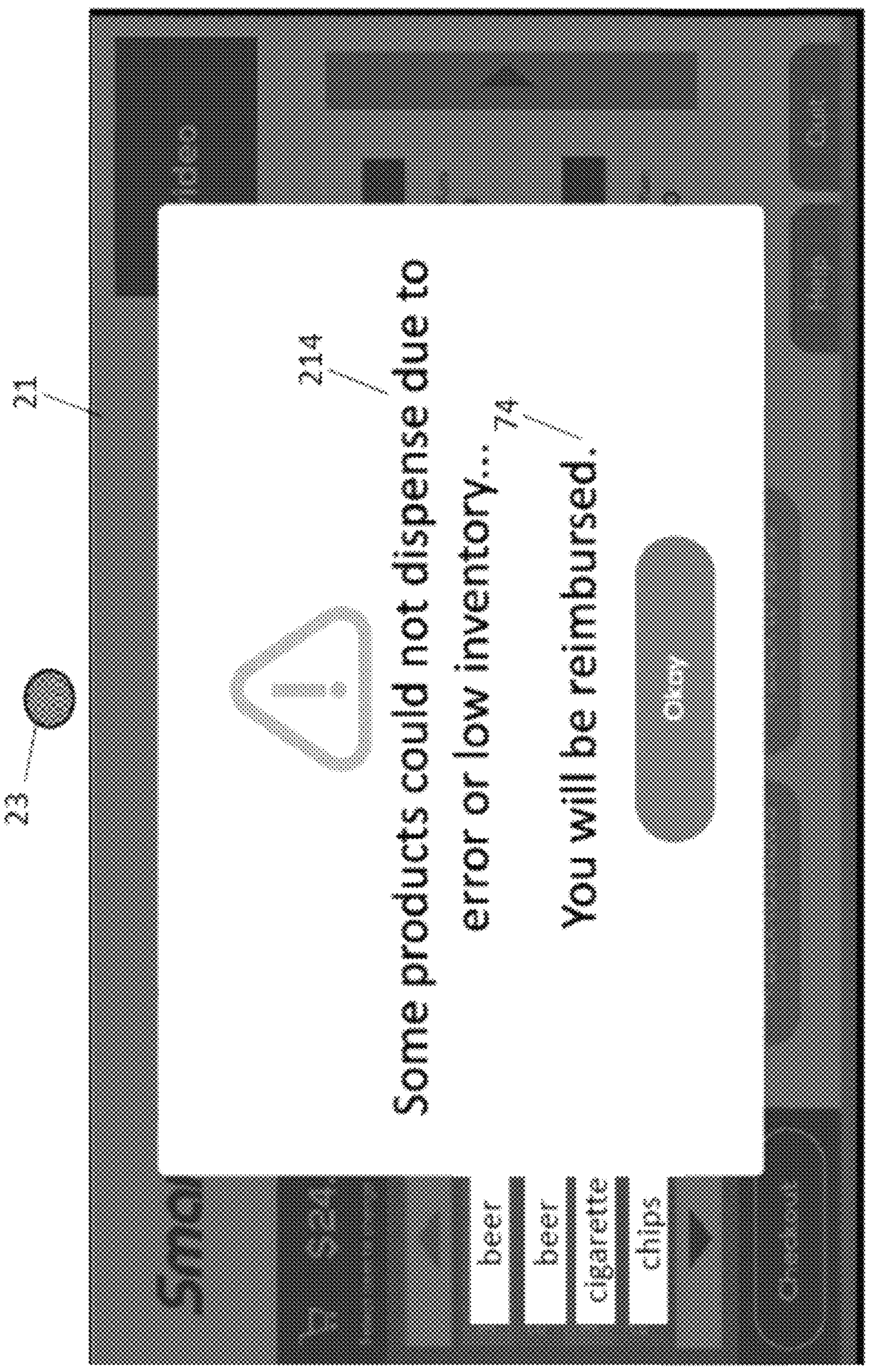

In some embodiments, the system 10 can accept more than one method of payment sequentially until the total sales amount is satisfied. Once payment is accepted, the purchased product(s) 128 are dispensed 210 by the unit 1 following instructions from the system 10. The system 10 will alert the customer that products are being dispensed 210 (see FIG. 3N). The manner and order of dispensing of purchased products 128 is important. The system 10 stores the selected products at each step in the database server 42 for the pending transaction, adding and/or subtracting as the customer makes selections and the input information is received by the system 10. For example, if a customer has purchased a loaf of bread 134, a case of 12 ounce canned beverages 137, a bag of chips, and a pack of gum 133, the system 10 at the client 56 will process the purchased goods list based on a scale of fragility factors (e.g., weight, size, rigidity, able to be mashed or broken, and relative ease/difficulty of being mashed or broken, etc.) stored in the system 10 at the database server 42. The client 56 will then send activation instructions to the appropriate PLC 51 in order of the least fragile to the most fragile purchased product 128. The activation of each PLC 51 is sequential and one at a time. By the use of proper function/error message and sensors, the system 10 will monitor product dispensing progress and/or location of each dispensed good 129. See the disclosure above for the process of activating a PLC 51 and dispensing units 108. Assuming no errors in dispensing occur (see above for automatic error correction process), the case of 12 ounce canned beverages will be dispensed first and moved by the conveyor belt 169 to the dispensing chute 140, which preferably remains closed until all purchased products 128 are delivered. For large orders or purchases of more than one large or bulky good 129, the dispensing chute 140 may be opened periodically during dispensation. Because the bread, gum, and chips are not likely to cause harm to each other as each is placed in the dispensing chute 140, these may be then dispensed in any order and moved by the conveyor belt 169 to the dispensing chute 140. Alternatively, a predetermined dispensing flow 250 of products 122 in inventory 120 can be stored at the database server 42 and dispensing will then follow this predetermined dispensing flow 250 based on the list of purchased products 128 stored in the database server 42 for the transaction. In either case, the client 56 processes the information to determine or set the order of dispensing. The stored fragility factors, their relative weight, and/or the stored predetermined dispensing flow 250 can be revised or updated in administrative operations via the administrative client (data input in the administrative interface 81 and/or the handheld inventory management device 84). Once all purchased product(s) 128 are dispensed, the client 56 will send an instruction to the local computer 41 to activate the device actor 47 for the printer 28 to prepare a receipt for the transaction. Alternatively, the client 56 may generate 251 a single page app prompting the customer to input a selection for a paper or an electronic receipt. The input information is sent by the local computer 41 to the higher level components 46. If paper is selected, the client 56 will send an instruction to the local computer 41 to activate the device actor 47 for the printer 28 to prepare a receipt for the transaction, as above. If electronic is selected, the client 56 will generate 252 a single page app prompting the customer to input an email address (or confirm an email address associated with the customer stored in the database server 42). The email address will be sent by the local computer 41 to the client 56, which will generate and send an electronic receipt to the email address provided. The email address provided may also be stored in the database server 42 to be associated with the customer in a future transaction based on electronic payment information, initiation photograph and facial recognition, customer loyalty program identifying name/number, etc.). In some embodiments, information associated with a particular customer, including past shopping history, may be stored as a non-temporary file in the database server 42, and stored information may be used for marketing purposes (especially targeted marketing based on past behavior and analytics). The customer is then prompted 211 to take the purchase in the dispensing chute 140 and the paper receipt, if appropriate, via the customer interface 20 by a final screen generated by the client 56 (FIG. 3O).

At any point from 203 to 209, the process 200 can be reversed by a customer selecting a "back" operation 212 or even terminated by a "cancel" or "quit" operation 213 via input onto the customer interface 20. By receiving a cancel operation 213 on any of the transaction screens during a pending transaction, the local computer 41 will communicate the cancel operation 213 to the client 56. The client 56 will instruct the database server 42 to purge the pending transaction data stored thereon, and the client 56 will send the Welcome Screen 201 FIG. 3A to the local computer 41 for display on the customer interface 20. This operation also effectively restarts the process 200. By receiving a back operation 212 on any of the transaction screens during a pending transaction, the local computer 41 will communicate the back operation 212 to the client 56. The client 56 will generate the previous transaction screen for display on the customer interface 20. Preferably, each transaction screen is temporarily saved as a "map" of the pending transaction at the database server 42, and the client 56 will instruct the database server 42 to send the appropriate transaction screen to be sent to the local computer 41 for display on the customer interface 20. Alternatively, the back operation may be displayed to the customer as a choice to select a different aisle (e.g., when on the Aisle Screen 205 FIG. 3C) or return to an aisle (e.g., when on a Product Screen 207 FIG. 3E). Other navigational input selections may be similarly incorporated as appropriate for a given configuration of the system 10 within the scope of the disclosed invention.

If an error 214 occurs during the operation process 200, the system 10 will attempt to correct the error by automated low level (PLC 51 and/or device actors 47, as appropriate to the error) retries and then by higher level automatic remote manipulation or virtual intervention by a supervisor operator 57 via the supervisor operator interface 71, as described above. The customer may also initiate at any time a supervisor operation process 300 by inputting a selection 301 of the "HELP" activator/operation or inputting a selection 311 for a "restricted sale" product 130 (i.e., alcohol and tobacco products). The HELP activator 83*a* may be a dedicated, physical hardware device in the form of an input key located at the user interface module 20 that is active for receiving an input during any pending transaction. Preferably, the HELP activator 83*a* is a displayed input selection on the touchscreen 21 as shown on, for example, the Product Detail Screen 207 (FIG. 3E). The supervisor operator client 58 is notified 302 of the help request by an action required notice 260 on the supervisor operator interface 71. An available supervisor operator then accepts 303 the request via the supervisor operator interface 71. If necessary, the videoconference function may be activated 304 by the supervisor operator or automatically (both achieved by the client 56 sending an instruction to the device actors 47 at the local computer 41 for activating the camera 23, audio speakers 26, and microphone 27). Once the help request is resolved, the supervisor operator terminates the help request in the supervisor operator interface 71, and the customer is returned 305 to the in-person operation 200. However, it should be noted that the customer is never removed from the shopping web app page during a help operation. Preferably, the single page web app from which the help request was generated remains and is then reconfigured to include a video area of the supervisor operator on the operation side of the transaction. Optionally, only audio of the supervisor operator is provided to assist the customer. The supervisor operator may input information regarding the help request in the supervisor operator interface 71 for storage in the database server 42, which may be shared directly or indirectly with the administrative client 59 for a repair/maintenance action at the automated retail facility unit 1. Also, the customer may continue the shopping experience by browsing and/or selecting other products 122 during a HELP operation.

Figure 3Q:
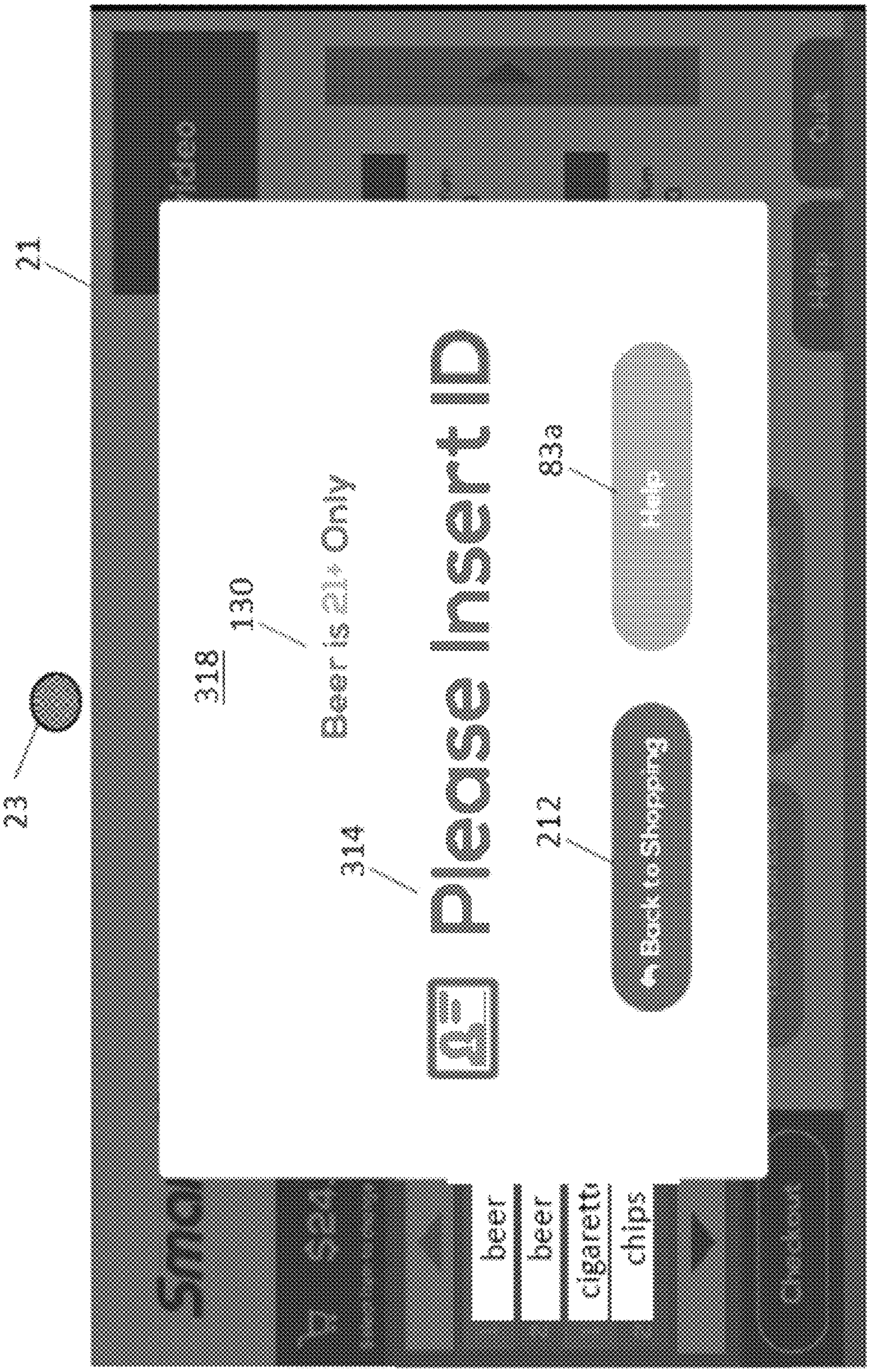
Figure 3R:
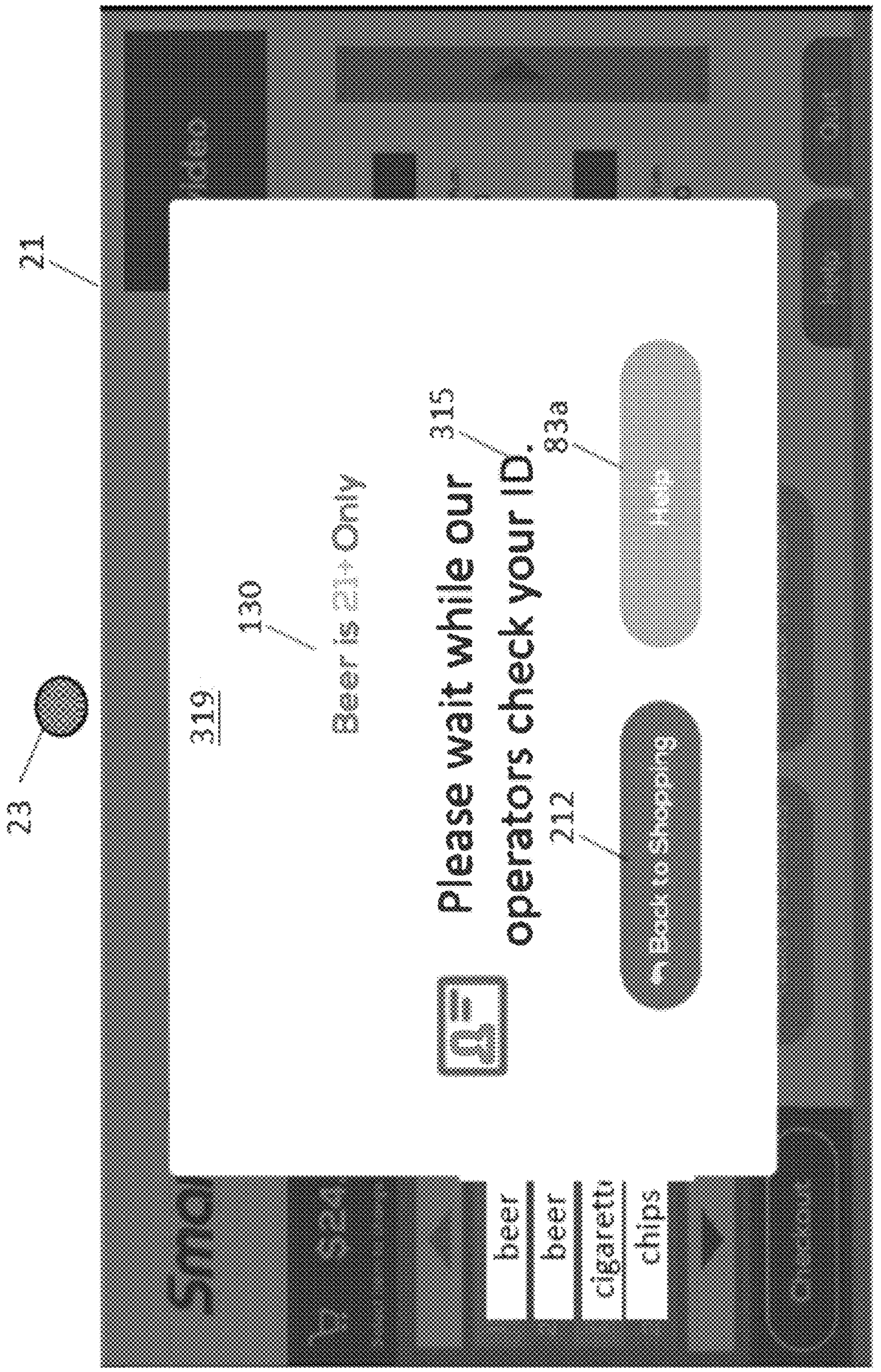

For a restricted sale product 130 operation (see FIGS. 3Q & 3R), the customer is preferably automatically and immediately notified on the screen 21 after selecting an age-restricted product 130 that a driver's license or other photograph ID must be scanned at the scanner port 39. The local client 41 prompts 314 the customer to insert a government-issued photographic ID into the scanner port 39 of the user interface module 20, such as on the Restricted Sale Prompt Screen 318 (FIG. 3Q). Preferably, the scanner port 39 is a commercially available device with associated software for detecting a forged photographic ID. The scanned ID is sent 315 to the supervisor operator interface 71 for comparison with the video feed (activation of the cameras 23 by a device actor 47) of the customer and the photograph taken of the customer at initiation 203, and the customer is provided with an updated screen 319 during the ID check process (FIG. 3R). The supervisor operator 57 is notified 312 of the restricted item 130 selection by an action required notice 260 on the supervisor operator interface 71 after the customer's ID has been scanned. In a preferred embodiment, the customer may continue with the shopping experience without interruption by the system for the ID and age-restriction sale authentication process. Thus, a customer may continue to browse and place other items, including other age-restricted products 130 in the virtual shopping cart 93. Only if the authentication is denied or if the authentication has not been completed before the payment screen is activated will there be any interruption in the normal flow of shopping and customer experience. An available supervisor operator then accepts 313 the request. If the restricted sale is denied by the supervisor operator, the selected restricted sale product is automatically removed from the customer's virtual cart 93 by client 56 and stored in the database server 42 in the file for the pending transaction, and further restricted sale selections requiring the same or a greater age limitation are automatically denied. If the restricted item selection is resolved, the supervisor operator terminates the request in the supervisor operator interface 71, and the customer is returned 317 to the in-person operation 200. Importantly, the supervisor authentication process described above adds a heightened level of accountability by linking every age-restricted product 130 sale to a given supervisor/administrator operator. Therefore, all restricted transactions are stored in memory of the database server 42 with a copy of the photo/video of the customer taken at the initiation of the transaction, during the authentication process, and the scanned government-issued photographic ID. Unlike a sale of an age-restricted product 130 at a convenient store, the system 10 can identify and retrieve all relevant information for each and every age-restricted product 130 sale.

Figure 5B:
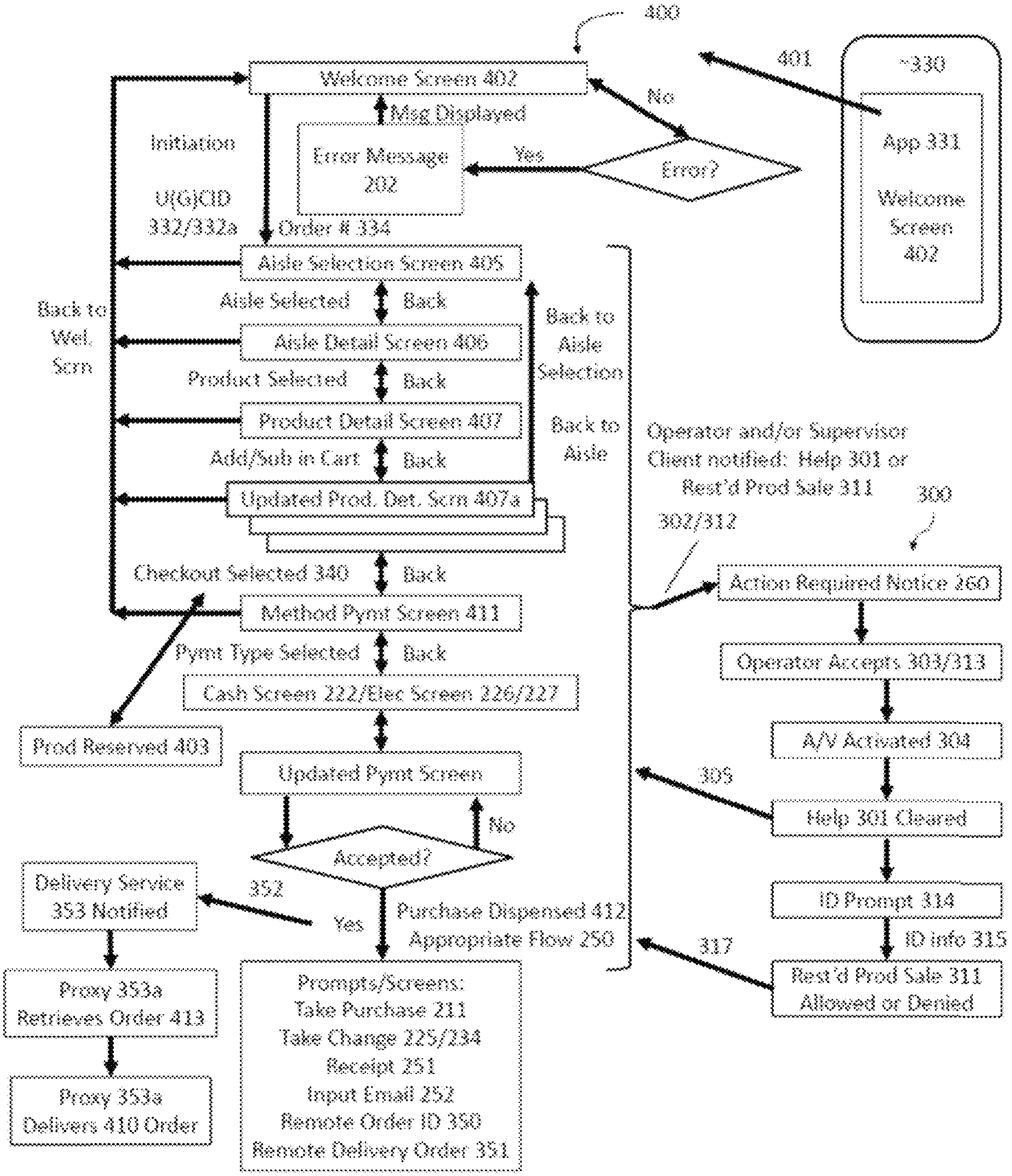
FIG. 5B is a flow chart depicting a remote operation of an exemplary embodiment of an automated retail facility of the present invention.

FIG. 5B is a flow chart depicting a remote operation 400 of an exemplary embodiment of an automated retail facility system 10 of the present invention. The remote operation 400 can be performed from any computing device 330, including, but not limited to, a personal computer, a tablet, a smartphone or other handheld computing devices, each having a user interface, a user input means (e.g., voice, hardware keyboard, virtual touchscreen keyboard, etc.), a processer, a modem or other device for connecting to a remote network (e.g., wired data port, such as USB, coaxial, and Ethernet, and related hardware and wireless network hardware including transceiver for WiFi, cellular, BLU- ETOOTH, or other electromagnetic signals) for establishing a network connection, preferably a secure network connection, with the system 10. The computing device 330 may establish the network connection either via a dedicated application, such as a smartphone app 331, or a web-based application accessible from within a web browser. For brevity, the following disclosure will focus on an exemplary smartphone app 331 with established secure network connection with the system 10; however, it should be understood that other forms of connection and access are contemplated to be within the full scope of the present invention.

The smartphone app 331 establishes a secure network connection 401 with the system 10 via the cloud server 43. The remote operation order 400 begins with a remote Welcome Screen 402 similar to that shown in FIG. 3A displayed on the touchscreen of the smartphone 330. It should be appreciated that error messages for a particular unit 1 will not be shown on the remote Welcome Screen 402, unless a unit 1 has been selected, saved, or default populated as a "favorite." Each "screen" or "page" displayed to or seen by a remote customer is preferably a single page app generated by the client 56 based on information available to the client 56 that is stored at the database server 42. Other configurations, such as a plurality of display template pages may be embedded in the smartphone app 331 for efficient rendering at the smartphone 330. The smartphone app 331 will preferably have a stored user name for the remote customer, but an option is available for entering a user name or customer loyalty identifying number at the Welcome Screen 402 (see FIG. 5B) that is associated with the remote operation order 400. In either case, the unique customer identifier (UCID) 332 is transmitted to the client 56 by the smartphone app 331 to be stored in memory at the database server 42. A remote customer may proceed as a "guest," in which the client 56 generates a unique guest customer identifier (UGCID) 332*a* for the remote operation order 400 and stored in memory at the database server 42. The client 56 also generates a unique remote order number 334 that is linked to the pending remote order and stored in the memory of the database server 42. Once the system 10 has a unique customer identifier 332 or unique guest customer identifier 332*a* stored at database server 42 for the pending remote operation order 400, the smartphone app 331 provides the remote customer with an option to select a specific, preferred automated retail facility unit 1 for the remote operation order 400 or provides a list of the closest automated retail facility units 1 for selection. The latter may be based on an input location, such as zip code, address, or automatically processed via accessing the smartphone location services on the smartphone 330 (e.g., GPS, cell tower connectivity, and/or BLUETOOTH). Choosing an automated retail facility unit 1 for the remote operation order 400 allows the client 56 to access the inventory 120 available for purchase stored in the database server 42, which also allows storing the remote operation order 400 in the database server 42 as a hold on the selected products 128 to ensure that the selected products 122 are in inventory 120 when the selected products 128 are to be dispensed 403. As the remote operation order 400 progresses, the database server 42 file for the remote operation order 400 is updated. If the selected automated retail facility unit 1 is offline or otherwise unavailable, the remote customer can be notified and prompted to select another location.

Once an automated retail facility unit 1 is selected, the smartphone app 331 displays the Display Aisle Selection Screen 405 similar to that shown in FIG. 3B on the touchscreen of the smartphone 330. The Display Aisle Selection Screen 405 is generated by the client 56 based on information of available inventory 120 stored at the database server 42 and sent to the smartphone app 331. The process of navigation of virtual aisles and individual products in inventory on the smartphone app 331 is essentially the same as for the in-person operation 200, described in detail above. As in that process 200, each input by the remote customer in the remote operation 400 is transmitted to the client 56 and relevant information is stored at the database server 42. In response to these input(s) and data stored at the database server 42, the client 56 then generates an appropriate screen/page for display to the remote customer, including an Aisle Detail Screen 406 similar to that shown in FIG. 3C and Product Detail Screen 407 similar to that shown in FIG. 3E. The Product Detail Screen 407 will display information about the selected product 128 provided by the database server 42 and stored thereon, as well as a prompt/opportunity to add the product 122 to the remote customer's virtual cart 93, as described above. If a product 122 is then added to the remote customer's virtual cart 93 by providing the appropriate input from the customer, the system 10 generates at the client 56 an appropriate "updated" Product Detail Screen 407*a* similar to that shown in FIG. 3F and sent to the smartphone app 331. The inventory data 60 for the product 122 is also updated on the database server 42 to note the pending remote sale of one of the products 122 at the selected automated retail facility unit 1. The remote customer may then continue to add 97 or subtract 98 the product 122 from the remote customer's virtual cart 93 by an appropriate input received from the remote customer on the touchscreen of the smartphone 330. Each such input information will be sent to the client 56 (and database server 42) for generating appropriate updated Product Detail Screens 407*a* based on the input and the data available at the database server 42 for the product 122, which are then instantly sent back to the smartphone app 331 for display showing the updated/revised quantity of product 122.

If a remote customer's virtual cart 93 includes at least one product 122, the Product Detail Screen 407 also provides the remote customer with the prompt/opportunity to checkout and complete the transaction. If the touchscreen of the smartphone 330 receives from the remote customer an input for checkout 340, the input information is sent via the smartphone app 331 to the client 56, which then contacts the database server 42 for generating a single page app for a Method of Payment Screen 411 similar to that shown in FIG. 3G that is then sent to the smartphone app 331 for display. The smartphone app 331 is naturally limited to electronic forms of payment, and these proceed as detailed elsewhere in the instant disclosure, with the exception that information of electronic payment forms (e.g., card numbers and validation information, mobile payment/digital wallet service information, etc.) must be entered manually into the smartphone app 331 or accessed from memory associated with the smartphone app 331 or user and/or stored in the database server 42 rather than activation of a reader device 36. Once electronic payment is confirmed, the client 56 generates an electronic receipt for delivery to the remote customer via email, text message, stored in memory at the smartphone 330 and accessible by the smartphone app 331, and/or other electronic delivery methods. Alternatively, payment may be deferred until the remote customer or a proxy 353*a* arrives at the selected automatic retail facility unit 1 for dispensing 412.

Figure 3S:

The client 56 also transmits the unique remote order identifier 350 to the remote customer via an email, text message, or to the smartphone app 331 for storage in the memory of the smartphone 330 and subsequent retrieval by the remote customer on the smartphone app 331. The unique remote order identifier 350 may be in the form of a number, a letter string, an alphanumeric string (each with or without symbols), an optically readable code (such as a barcode or two-dimensional barcode), a computer readable file that can be transmitted to and within the system 10 via remote network connection or directly via RF transmission (such as RFID, BLUETOOTH, or other known RF transmission methods) to an appropriate receiver or transceiver at the selected automatic retail facility unit 1, picture code, or others. The transmittal of the unique remote order identifier 350 to the remote customer may be performed at any time during the remote order operation. Preferably, the transmittal occurs after completion of the of the pending remote order transaction. More preferably, the transmittal occurs after an electronic payment process is completed. The remote customer or a proxy 353*a* may use the unique remote order identifier 350 to retrieve the remote order 351 from the database server 42 of the system for dispensing 412 or for payment process if payment was deferred. At arrival to the selected automatic retail facility unit 1, the remote customer or a proxy 353*a* initiates an in-person operation 200 as detailed above. On the Display Aisle Selection Screen 204 on the touchscreen device 21 (FIG. 3B), the remote customer or a proxy 353*a* may select a touchscreen button for retrieval of a remote order 351 in lieu of selecting a virtual aisle. In response to the input for retrieval of a remote order 351, the client 56 generates a Remote Order Retrieval Screen 408 and transmits it to the local computer 41 for display on the touchscreen device 21 (FIG. 3S). The Remote Order Retrieval Screen 408 includes a prompt or instruction to input the unique remote order identifier 350 to retrieve the remote order 351 information from the database server 42. If the unique remote order identifier 350 can be input manually, the Remote Order Retrieval Screen 408 (FIG. 3S) includes a data input area on the touchscreen device 21. If the unique remote order identifier 350 can be input by RF transmission, the client 56 also sends instructions to the appropriate device actor 47 at the local computer 41 for activation of the RF signal transceiver device 34 at the customer interface module 20. Alternatively, RF signal transceiver device 34 may also be always active at the automated retail facility unit 1. Alternative methods of inputting identifying information 354 may be selected from any of the following, including, but not limited to, the unique customer identifier 332, unique guest customer identifier 332*a*, a user name, phone number, a customer loyalty card account number, a scanned barcode, a scanned two-dimensional barcode, an email address, a credit card number, scanned credit card, scanned government-issued photo identification, facial recognition, or other identifying information that can be associated with the unique remote order identifier 350 stored in the database server 42. In response to the input, the local computer 41 sends the unique remote order identifier 350 or other identifying information to the client 56, which compares this information with the stored data in the database server 42 to locate and recall the stored remote order 351 associated with the input unique remote order identifier 350 and/or other input identifying information 354. The stored data in the database server 42 is then processed by the client 56 to proceed with dispensing, as described in detail above, including the process for refunding any items that could not be dispensed and the restricted item sale process for any restricted items 130. If the payment was deferred, the client 56 first proceeds with generating the Method of Payment Screen 209 (FIG. 3G) after the restricted item sale process for any restricted items 130 but prior to dispensing.

In some embodiments of the smartphone app 331, a service 124 option is provided for a remote customer to request an option of delivery 352 of the purchased goods 128. Preferably, payment is required at the time of completion of a remote order 400 when the delivery option 352 is selected. If not allowed at deployment setting (location) of the selected automated retail facility unit 1, the sale of restricted items 130 may be blocked if this option is selected during the remote order operation 400. When the delivery option 352 is selected, a particular delivery service provider 353, if more than one is available, must be selected. Such delivery service provider 353 is preferably selected from UBER EATS, SEEMLESS WEB, GRUBHUB, and similar services, but any local delivery service with network ordering capabilities may be used within the scope of the disclosed invention. A delivery fee, which may be dependent on the selected delivery service provider 353, is also charged to the remote order 400. At completion 400 of the remote order 400, the unique remote order identifier 350 is sent to the selected delivery service provider 353 who assigns the delivery to a proxy 353*a*. The proxy 353*a* then follows the steps outlined above for dispensing a remote order 400 at the selected automated retail facility unit 1, and then delivers 410 the dispensed goods 129 to the remote customer.

The inventory access ports 11, as described above, can be opened to gain access to the various inventory dispensing modules 101 and/or 102 within the facility unit body 2. To facilitate restocking, as well as physical audits of inventory 120, the inventory dispensing modules 101 and/or 102 are preferably configured for sliding engagement with their frame member connections 3*k*.

Mobile Inventory Management Handheld Device

A further improvement of inventory management is a mobile inventory management handheld device 84, which is remotely connected via the network to the administrative client 59 of the system 10. An inventory manager operates the mobile inventory management handheld device 84 while servicing an automated retail facility unit 1. The mobile inventory management handheld device 84 (see FIG. 10A-10D) can be any handheld computing device 84*a*, including, but not limited to, a tablet, a smartphone, or other known handheld computing devices, each having a user interface, a user input means (e.g., voice, hardware keyboard, virtual touchscreen keyboard, etc.), a processer, a modem or other device for connecting to a remote network (e.g., wired data port, such as USB, coaxial, and Ethernet, and related hardware and/or wireless network hardware including transceiver for WiFi, cellular, BLUETOOTH, or other electromagnetic signals) for establishing a network connection, preferably a secure network connection, with the system 10. Preferably, the mobile inventory management handheld device 84 is a dedicated handheld computing device 84*a* for only running the mobile inventory management app 85. The mobile inventory management app 85 provides the inventory manager with all of the features and capabilities of the administrative interface 81, such as inventory control (see FIG. 10A), unit control (see FIG. 10B), item control (see FIG. 10C), and unit mechanical monitoring and control (see FIG. 10D). It should be understood that the functions shown in FIGS. 10A-10D are representative functions shown for example only, and that other functions may be made available to an inventory manager by the mobile inventory management handheld device 84 and the inventory management app 85. The inventory management app 85 is connected remotely to the system 10 at the cloud server 43 via a wireless network connection (such as cellular system, BLUETOOTH, or WiFi). The unit 1 may include a BLUETOOTH, WiFi, or other wireless RF transceiver 34 for secure remote network access for the mobile inventory management handheld device 84 to the system 10. The inventory manager can advantageously run a report onsite for any connected device 45 at the low level component 44 that has generated an error message 63 to the system 10, which is/are stored in the database server 42. The inventory management app 85 may also automatically alert the inventory manager of any low level component 44 that has generated an error message 63 to the system 10 upon arrival to or logging into the system 10 at the unit 1. The inventory manager may check, repair, or replace any such connected device 45 in need of service. The inventory manager (may also perform maintenance/troubleshooting operations via the inventory management app 85 on any or all of the connected devices 45, even if no error message 63 indicating a need of service has been generated and stored in the database server 42. While onsite, the inventory manager will log in to the inventory management app 85 and update, add, and/or delete the inventory 120 for each product 122 stored in the database server 42 as each inventory dispensing modules 101 and/or 102 is inspected and/or restocked. The UPC code on each product can be entered into the inventory database portal via the keyboard or scanned and populated automatically by using the integrated optical code scanner. The updated inventory information 60*a* is transmitted by the inventory management app 85 to the administrative client 59 at the cloud server 43. The administrative client 59 sends the updated inventory information 60*a* to the database server 42 to be stored and accessed by the system 10. Temperature and humidity readings within the automated retail facility unit 1 are also available by the inventory management app 85 (see FIG. 10D).

Inventory Management Vehicle

Figure 9A:
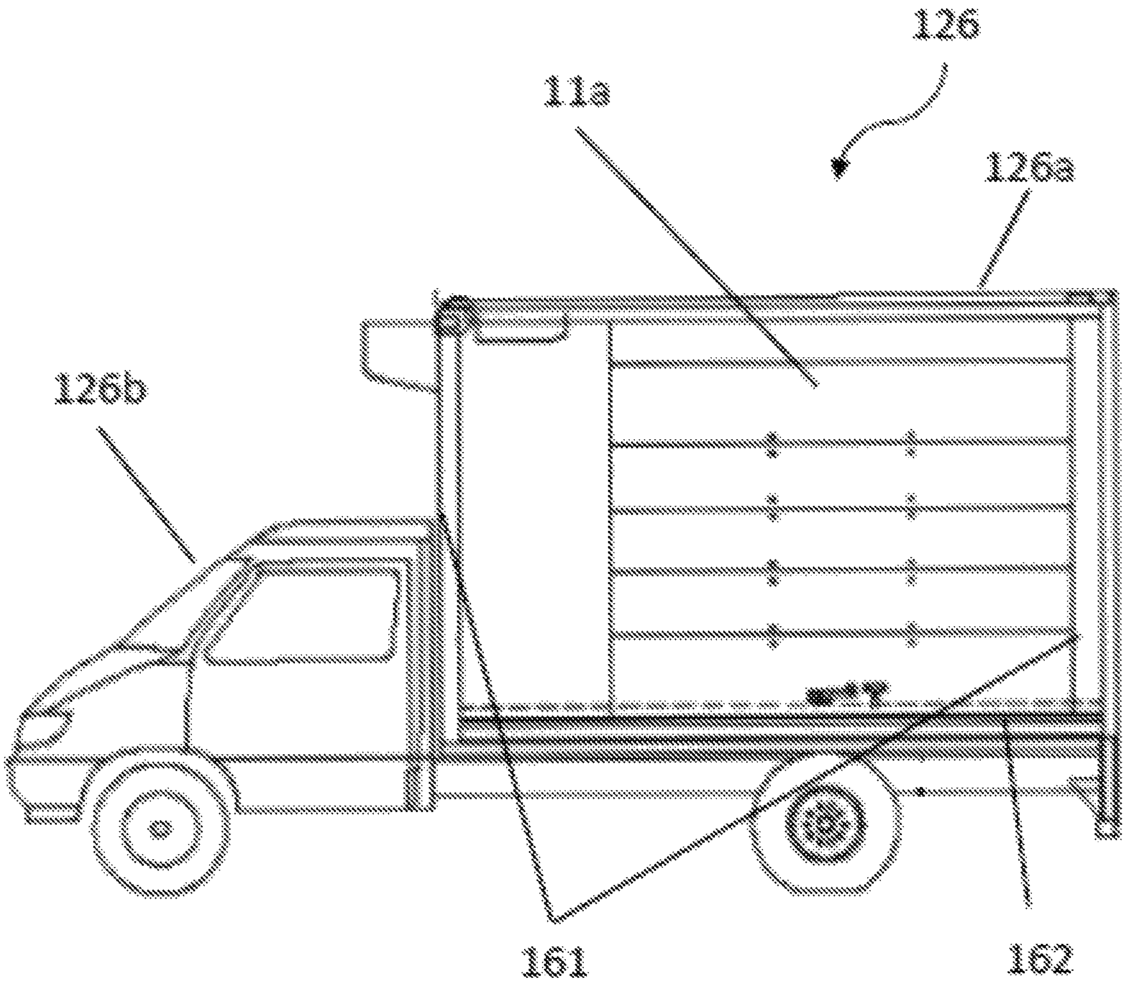
FIGS. 9A-9C depict an inventory management vehicle for use as an inventory distribution and restocking platform of the present invention in closed mode (FIG. 9A) and in restocking mode that allows the vehicle to pull up next to the store for restocking in a temperature controlled and secure environment (FIG. 9B).
Figure 9B:
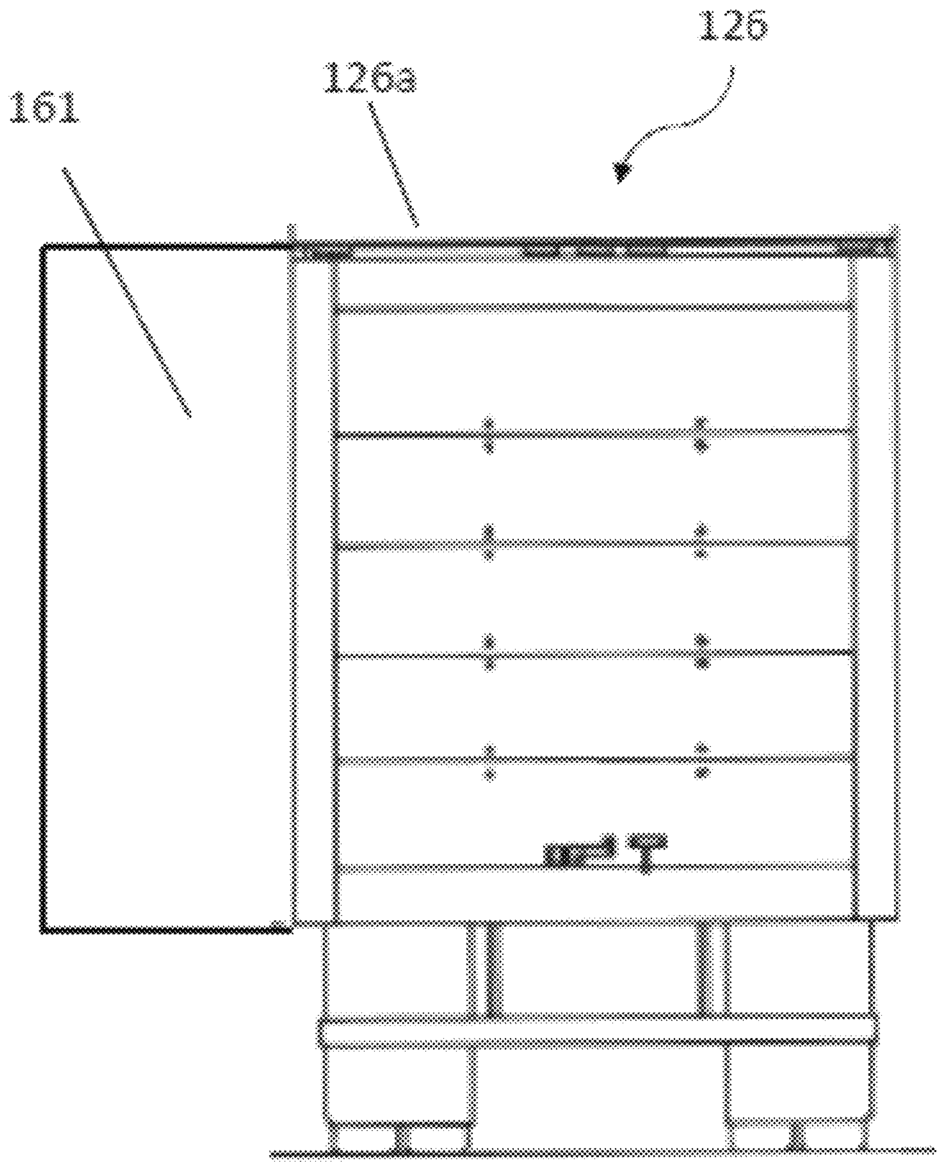
Figure 9C:
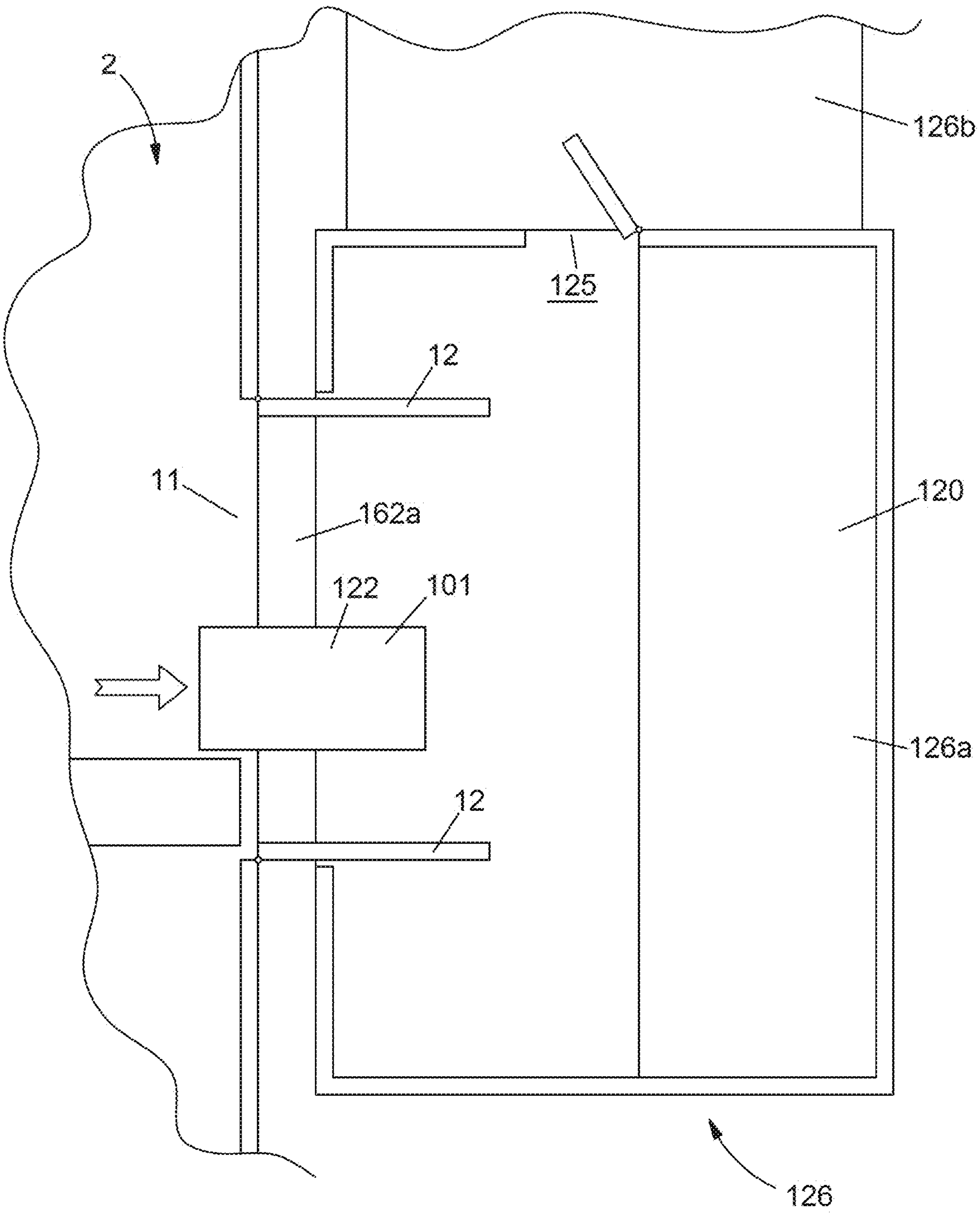

A still further improvement of inventory management is shown in FIGS. 9A-9C. During stocking of inventory, a stocker is vulnerable to theft of inventory, which potentially could result in bodily harm to the stocker. Additionally, it is desirable to maintain inventory in a climate controlled condition, particularly in warm or weather. An inventory management vehicle 126, such as a specially configured truck, provides for convenient and secure inspection and restocking of inventory in the automated retail facility unit 1. In some embodiments, the inventory management vehicle 126 can be a specially configured truck, such as the flatbed truck shown in FIGS. 9A-9B, or a separate semi-trailer. The inventory management vehicle 126 is a self-sufficient inventory restocking and management platform that contains an inventory supply and restocking portion 126*a* and a driving cab portion 126*b*. Depending on the inventory being transported, the inventory supply and restocking portion 126*a* may be climate controlled. The inventory manager can safely exit the driving cab portion 126*b* within the inventory management vehicle 126 by directly entering the inventory supply and restocking portion 126*a*. Thus, the inventory manager does not need to leave the inventory management vehicle 126 during restocking and inspection. The inventory management vehicle 126 is configured to be positioned next to one side of the automated retail facility unit 1 for accessing the access ports 11. Once positioned, the inventory manager can extend side shields 161 to provide further security and privacy before opening the side inventory door(s) 11*a*, located on one or both sides of the inventory management vehicle 126. Once the appropriate side inventory door 11*a* is opened, the access ports 11 of the facility unit body 2 may be accessed securely. The inventory management vehicle 126 further comprises a raised platform 162 that allows convenient access to both high and low positioned inventory dispensing modules 101 and/or 102.

FIG. 9C provides a top cutaway view of one embodiment of an inventory management vehicle 126 in which the restocking portion 126*a* is configured to receive opened inventory doors 12 of the access ports 11 of the facility unit body 2 of an automated retail facility 1. As indicated in FIG. 9C, a stocker parks the inventory management vehicle 126 about 1 foot (30 cm) from the facility unit body 2, adjacent to a selected access port 11. Thus situated, the inventory management vehicle 126 provides a secure platform for use by the stocker in selectively accessing the inventory access ports 11 for secure inspection and stocking of the inventory dispensing units 101, 102 with products 120, The stocker moves from the driving cab portion 126*b* to the inventory supply and stocking portion 126*a*, preferably via the safety opening 125 so as to minimize exposure to potential theft. Thus situated, the stocker can safely open an inventory side door 11*a* of the inventory management vehicle 126, such as a roll-up door of the type shown in FIG. 9A to provide access to the access ports 11 of the facility unit body 2. As shown in FIG. 9C, the stocker then unlocks one or both of the access port doors 12 of the facility unit body 2. Due to the configuration of the vehicle 126, the doors 12 swing open into the inventory supply and restocking portion 126*a*, where the doors 12 can be secured against the vehicle 126 to provide a secure barrier between the vehicle 126 and the access port 11. Additionally, the inventory management vehicle may be provided with a platform tray 162*a* that is configured to fold or slide into the opening between the vehicle 126 and the facility unit body 2 to secure the opening, support the weight of the stocker during stocking, and assist with temperature control. Optionally, an upper tray (not shown) may be provided that is configured to fold or slide into the opening between the top of the vehicle 126 and the facility unit body 2 to secure the upper opening, protect the stocker from weather elements such as rain, and assist with temperature control.

Once the access doors 12 are situated in the open position, the stocker uses the secure platform of the inventory management vehicle 126 to inspect inventory in the inventory dispensing modules 101, 102. The stocker then selects products from the inventory 120 of the inventory supply and restocking portion of the vehicle 126*a* and puts the inventory into the inventory dispensing modules 101, 102. The raised platform 162 and other aspects and arrangements of the facility management vehicle 126 facilitate inspection and restocking. Stocking of rolling rack dispensers 102 is accomplished simply by inserting products into the stocking end of the rolling rack dispenser 102. As discussed above, the stocker can withdraw a selected goods dispensing tray 101 through the access port, whereby upon withdrawal a stocking end of the tray 101 is suspended below a dispensing end. This orientation facilities inspection and restocking of the goods dispensing trays 101. When the stocking operation is complete, the stocker uses the secure platform of the inventory management vehicle 126 to reinsert the tray 101 into the facility unit body 2. Because the system is designed for stocking in real time while the store remains in operation, the system preferably automatically takes a goods dispensing tray 101 out of service as soon as it is withdrawn, such that a purchaser cannot select or purchase goods from the tray. Once the goods dispensing tray 101 is reinserted into the facility unit body 2, it automatically goes back online for selection and purchase of goods from the tray 101. When inspection and stocking of the selected access port 11 is complete, the stocker uses the secure platform of the inventory management vehicle 126 for locking the inventory access port 11 to thereby secure the products 122 in the facility unit body 2.

Automated Package Distribution

Figure 10:
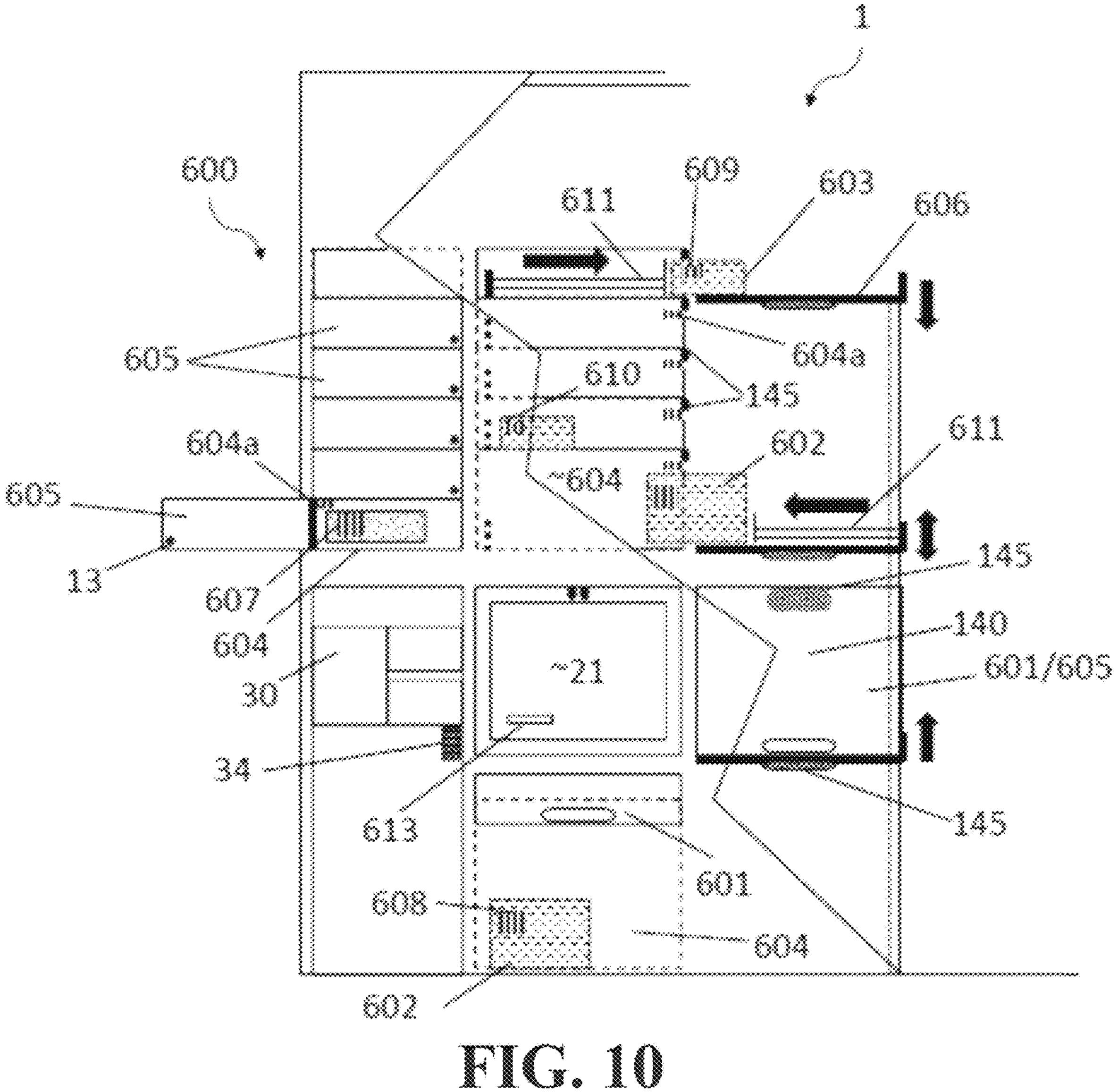
FIG. 10 depicts a schematic representation of an exemplary embodiment of an automatic package receiver/distributor service module integrated with the automated retail facility.

In some embodiments, the automated retail facility unit 1 may also include an automatic package receiver/distributor service module 600 (see FIG. 10). An exemplary standalone automatic package receiver/distributor service apparatus is disclosed in U.S. Pat. No. 6,690,997 to Rivalto (see also U.S. Patent Application Publications US2003/0050732 A1, US20040158351 A1, and US20060020489 A1; each of these four documents are incorporated herein by reference in their entirety). The automatic package receiver/distributor service module 600 comprises at least one public receiving port 601 for receiving a package (drop-off packages 602) from a customer for courier pick-up delivery, such as FEDEX, UPS, USPS, or other postal or courier service. As with all other modules of the automated retail facility unit 1, the automatic package receiver/distributor service module 600 and each of its constituent components are in direct communication with local computer 41, and therefore indirect communication with the other system higher level components 46. In one embodiment, the drop-off packages 602 are stored in a drop-off package storage bin 604 that is only accessible by an authorized agent of the contracting courier service. Other embodiments may include receiving the drop-off packages 602 via an externally accessible individual drop-off port 605 and/or via internal storage in a uniquely numbered 604*a* bin 604. Access to these storage bins/ports are discussed in more detail below in the context of picking up and/or retrieving a package 603. The automatic package receiver/distributor service module 600 also comprises at least one courier drop-off port 605 for receiving a delivery package (drop-off delivery packages 603) from a courier service agent for customer pick-up. The drop-off packages 602 and/or drop-off delivery packages 603 may be limited by size and/or weight, depending on capacity and physical capabilities for the automated retail facility unit 1. In some embodiments, the automatic package receiver/distributor service module 600 receives a drop-off delivery package 603 from a courier service via the at least one courier drop-off port 605. A moveable platform 606 is located inside the at least one courier drop-off port 605, and the drop-off delivery packages 603 are placed on this moveable platform 606 for receiving into the automatic package receiver/distributor service module 600. The courier service provides to the system 10 identifying information 607 (tracking number, code, weight, size, etc.) for the drop-off delivery package 603 that the cloud server 43 sends to the database server 42 for storage and later retrieval. The automatic package receiver/distributor service module 600 scans a printed/fixed label 608 with an optically readable code 609 that is associated with the identifying information 607 for the drop-off delivery package 603 as it is received. The automatic package receiver/distributor service module 600 may optionally determine the drop-off delivery package 603 for size (light curtain scanning, for example) and/or weight (integrated scale in the moveable platform 606, for example), which will be sent to and stored in the database server 42. The local computer 41 sends this scanned information to the cloud server 43 which sends it to the database server 42 for storage in association with the identifying information 607. The courier service then contacts the customer to notify that a drop-off delivery package 603 has been set for pick-up at the automated retail facility unit 1. Alternatively, the system 10 may send an email or other appropriate electronic message to the customer notifying them of the same. In either case, the customer will be provided with a tracking number 610 and/or other identifying information 607 that will be required for pick-up of the drop-off delivery package 603.

An additional alternative for use of the automatic package receiver/distributor service module 600 includes an employee or agent of a retail store associated with the unit 1 "stepping into the shoes" of the courier service. Therefore, it should be understood that all disclosures discussing the courier service dropping off a package 603 for drop-off delivery are applicable to this associated retail store system and method of use. In an exemplary embodiment of this use, a customer orders or requests to pick-up a product 122, such as an online order for store pick-up; a special order for store pick-up; a filled or refilled prescription drug, device, or consumable; or a replacement rewards card or other identification as non-limiting examples. As such, the associated retail store loads the product 122 into a bin 604 of the automatic package receiver/distributor service module 600 as provided herein for a courier service. A customer is likewise contacted to notify of the availability of the product 122 for pick-up. Similarly, the automatic package receiver/distributor service module 600 can function as an automated product return drop-off station for a product 122 purchased in the associated brick and mortar store or its online commerce site. Here, the customer would access the returns service via selecting an appropriate function key via the customer user interface 20. After inputting any required information for storage in the database server 42, the system 10 will associate the customer user with the received returns drop-off package 602 and assign an available port 605 or internal bin 604 for storage. This process allows for security of date and time-stamped data entries and photographs of the customer user and/or the returned items.

The automatic package receiver/distributor service module 600 internalizes the drop-off delivery package 603 into an assigned, individual storage bin 604. The cloud server 43, based on information stored in the database server 42, assigns an available and appropriately sized bin for the drop-off delivery package 603 and sends this information to the local computer 41 as instructions for the automatic package receiver/distributor service module 600 to internalize the drop-off delivery package 603 into the assigned, individual storage bin 604, each with its own unique bin number 604*a*. The client 56 sends instructions to the local computer 41 to activate the device actor 47 or PLC 51 for the moveable platform 606 so that it moves to the assigned, individual storage bin 604. It should also be understood that storage bins 604 may also have a stored spatial location information that is retrieved by the system 10 and service module 600 for sending instructions to the moveable platform 606. Once at the assigned, individual storage bin 604, a pusher 611 moves the drop-off delivery package 603 from the moveable platform 606 into the bin 604. A sensor 145 (e.g., weight scale and/or light curtain sensors) on the moveable platform 606 and/or in the bin 604 will then send a successful bin delivery message to the local computer 41, which is sent to the higher level components 46 for processing and storage. The bin number 604*a* is associated with the stored identifying information 607 for the received drop-off delivery package 603. In some embodiments, the drop-off delivery package 603 is retrieved by the customer by the automatic package receiver/distributor service module 600 physically retrieving the drop-off delivery package 603 from the assigned, individual storage bin 604 and presenting it to the customer at the at least one courier drop-off port 605. In still other embodiments, the drop-off delivery package 603 is retrieved by the customer by the automatic package receiver/distributor service module 600 physically retrieving the drop-off delivery package 603 from the assigned, individual storage bin 604 and dispensing it onto the conveyor belt system 170, which delivers it to the dispensing chute 140 for presenting it to the customer. In a particularly advantageous embodiment, the dispensing chute 140 is at a height/level that is convenient for all customers, whether in a walk-up setting or a drive-thru setting, and is compliant with disabled persons laws and regulations, such as ADA compliancy. It is also important to note that the dispensing chute 140 has a security panel that prevents access into the unit 1 via the open dispensing chute 140. In still further embodiments, the automatic package receiver/distributor service module 600 comprises a plurality of courier drop-off ports 605, and each one is individually accessible by the courier service for drop-off and the customer for pick-up. Each of the plurality of courier drop-off ports 605 has a bin number 604*a* for storage in the database server 42 in association with the stored identifying information 607 for the received drop-off delivery package 603. In embodiments, using internal storage in bins 604 accessible to and retrieval by the dispensing chute 140, the dispensing chute 140 may also function as the courier drop-off port 605 where the storage process is essentially the opposite of the retrieval process described above. It should be understood that a courier service can integrate or otherwise use its handheld package delivery management device operations to interface with the automatic package receiver/distributor service module 600 to enter drop-off delivery package 603 information directly into the system 10 and for storage in the database server 42. Also, the courier service may access the system 10 via the user interface module 20 with appropriate access security features that are pre-arranged with a given courier service.

Figure 3T:

For an in-person operation of the automatic package receiver/distributor service module 600, the customer initiates a drop-off delivery package 603 pickup operation 612 via the customer user interface 20 by touching the Welcome Screen 201. For example, the Display Aisle Selection Screen 204 on the touchscreen device 21 (FIG. 3B) is equipped with an optional touchscreen button 613 for pick-up of a drop-off delivery package 603 in lieu of selecting a virtual aisle. In response to the input for pick-up of a drop-off delivery package 603, the client 56 generates a Package Pick-Up Screen 501 (FIG. 3T) and transmits it to the local computer 41 for display on the touchscreen device 21. The Package Pick-Up Screen 501 includes a prompt or instruction to input the tracking number 610 and/or other identifying information 607 required for pick-up of the drop-off delivery package 603. If the tracking number 610 can be input manually, the Package Pick-Up Screen 501 includes a data input area on the touchscreen device 21. If the tracking number 610 can be input by RF transmission, the client 56 also sends instructions to the appropriate device actor 47 at the local computer 41 for activation of the RF signal transceiver device 34 at the customer interface module 20. Alternative methods of inputting the tracking number 610 and/or other identifying information 607 may be selected from any of the following, including, but not limited to, a user name, phone number, a courier service account number, a scanned barcode, a scanned two-dimensional barcode, an email address, a credit card number, scanned credit card, scanned government-issued photo identification, facial recognition, or other identifying information that can be associated with the identifying information 607 provided by the courier service and stored in the database server 42. In response to the input, the local computer 41 sends the tracking number 610 and/or other identifying information 607 to the client 56, which compares this information with the stored identifying information 607 in the database server 42 to locate and recall the bin number 604*a* associated with the input tracking number 610 and/or other input identifying information 607. The stored data in the database server 42 is then processed by the client 56 to proceed with the presentation of the drop-off delivery package 603 by activating the appropriate device actor 47 and/or PLC 51 for retrieval processes. For embodiments with a plurality of courier drop-off ports 605 that are individually accessible, the client 56 will instruct the device actor 47 or PLC 51 for the appropriate courier drop-off port 605 having the bin number 604*a* associated with the stored identifying information 607 in the database server 42 to be made accessible. The device actor 47 or PLC 51 will then electronically unlock the appropriate courier drop-off port 605. The courier drop-off port 605 will communicate back to the device actor 47 or PLC 51 that the unlocking action was successful or if an error occurred. This message is sent up to the higher level components 46 for processing and storage. For embodiments with package retrieval at the at least one courier drop-off port 605, the client 56 will instruct the device actor 47 or PLC 51 for the appropriate bin 604 associated with the stored identifying information 607 in the database server 42 to activate and move the drop-off delivery package 603 onto the moveable platform 606 once the device actor 47 or PLC 51 for the moveable platform 606 has successfully moved it to the appropriate bin 604. When the drop-off delivery package 603 is successfully moved onto the moveable platform 606, the client 56 will instruct the device actor 47 or PLC 51 for the moveable platform 606 to return to the at least one courier drop-off port 605. The moveable platform 606 then returns to the at least one courier drop-off port 605. Another device actor 47 or PLC 51 will then electronically unlock the at least one courier drop-off port 605. The at least one courier drop-off port 605 will communicate back to its device actor 47 or PLC 51 that the unlocking action was successful or if an error occurred. This message is sent up to the higher level components 46 for processing and storage. For embodiments with package dispensing at the dispenser chute 140, the client 56 will instruct the device actor(s) 47 and/or PLC(s) 51 for the appropriate bin 604 associated with the stored identifying information 607 in the database server 42 to activate and move (e.g., by a pusher 611) the drop-off delivery package 603 onto the conveyor belt system 170. Alternatively, especially for fragile or potentially fragile drop-off delivery package 603, the drop-off delivery package 603 may be moved back to the moveable platform 606 and it is moved onto the conveyor belt system 170 from an appropriate height. When the drop-off delivery package 603 is successfully moved onto the conveyor belt system 170, the client 56 will instruct the device actor 47 or PLC 51 for the conveyor belt system 170 to deliver the drop-off delivery package 603 to the dispensing chute 140. When the drop-off delivery package 603 is successfully moved into the dispensing chute 140, the client 56 will instruct the device actor 47 or PLC 51 for the dispensing chute 140 to be unlocked for customer access. While these embodiments are discussed in relative isolation, it should be understood that a combination of one or more of these three or other configurations can be employed in a single automatic package receiver/distributor service module 600. It should also be understood that a proxy 353*a* with the proper tracking number 610 and/or other identifying information 607 may pick-up the drop-off delivery package 603 for or instead of the customer.

Figure 3U:

Upon successful port unlocking, port retrieval, or dispensing chute delivery, the client 56 generates an updated Package Pick-Up Screen 502 and transmits it to the local computer 41 for display on the touchscreen device 21 with instructions for the customer to retrieve the drop-off delivery package from the appropriate location on the automated retail facility unit 1 (FIG. 3U). A successful pick-up message is stored in the database server 42, and the client 56 sends a message to the courier service that the package was successfully delivered.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

What is claimed is:

1. A method of delivering packages to a customer for pick-up comprising:

receiving an order from a customer, preparing a package containing the order, the package having package specific identifying information;

delivering the package into a facility unit body, the facility unit body providing a secure internal storage for an automatic package receiver and distributor service module, the service module comprising:

at least one package receiving port for receiving a plurality of individual packages into the facility unit body, the package receiving port accessible from an exterior of the facility unit, a package storage area for securely storing the packages in the facility unit body, a package discharge access point accessible from the exterior of the facility unit body, and a package delivery mechanism in the facility unit body for moving packages between the at least one package receiving port, the package storage area and the package discharge access point, the package delivery mechanism including a conveyor belt apparatus, the conveyor belt apparatus configured to transport selected individual packages between the package storage area and the package access discharge port, the conveyor belt apparatus comprising a a dual cantilevered conveyor belt bed configured to create a V-track space between opposing cantilevered bed portions, and a belt component having a V-belt member on a lower side thereof, wherein the V-belt member is configured to run in the V-track space between the opposing cantilevered bed portions;

the service module in two-way communication with higher level components, the higher level components including a cloud server and an external database, transmitting the package specific identifying information to the external database via the cloud server for storage of the package specific identifying information in the external database, receiving an input for delivery of the package from the facility unit body, retrieving package specific identifying information for the package from the external database via the cloud server, using the retrieved package specific identifying information for the selected individual package to retrieve the selected individual package from the package storage area, and releasing the selected individual package to the package discharge access point for pick-up by or delivery to a customer.

2. The method of claim 1, wherein the V-belt member and corresponding V-track space maintain the belt member in alignment in the conveyor belt apparatus.

3. The method of claim 1, wherein the cantilevered bed portions have a spring-like resilience for cushioning products dropped onto the belt component.

4. The method of claim 1, wherein the V-belt member is comprised of a single tooth having a wide end positioned at the lower belt member surface and a narrow end positioned to enter the V-track space.

5. The method of claim 1, wherein the V-belt member is configured to be engaged by a motor for operating the belt member in either direction.

6. The method of claim 5, further comprising notifying an interested party via the higher level components that the individual package has been dropped off at the facility unit body for pick-up and recording information about the drop-off in the external database via the cloud server.

7. The method of claim 6, wherein the interested party is a customer, a courier, an Internet retailer, or a local brick-and-mortar retailer.

8. The method of claim 1, further comprising notifying an interested party via the higher level components that the individual package has been picked up and recording information about the pick-up in the external database via the cloud server.

9. The method of claim 8, wherein the interested party is a customer, a courier, an Internet retailer, or a local brick-and-mortar retailer.

10. The method of claim 1, wherein the package delivery mechanism includes a movable platform.

11. The method of claim 10, wherein the package delivery mechanism includes a pusher for selectively delivering packages to the movable platform.

12. The method of claim 11, wherein a sensor on the movable platform sends a successful delivery message to the higher level components for processing and storage on the external database.

13. The method of claim 1, wherein the service module records date and time-stamped entries and photographs of the package, an individual who delivered the package, and an individual who picked up the package.

14. The method of claim 1, wherein upon pickup of an individual package, a sensor associated with the package access discharge point sends a successful delivery message to the higher level components for processing and storage on the external database.

15. The method of claim 1, further comprising the cloud server unlocking the package discharge access point based upon identifying information of the customer of the particular individual package, the identifying information of the customer obtained via the higher level components.

16. The method of claim 1, wherein the package receiving port is a public receiving port for receiving a drop-off package by a customer for pick up by a courier service.

17. The method of claim 1, wherein delivering of the package to the facility unit body is performed by a courier service.

18. The method of claim 1, further comprising picking up the package from the access point, the picking up performed by an interested party.

19. The method of claim 1, wherein the interested party is a courier service or the customer.

* * * * *